United States Patent
Wahlbin et al.

(10) Patent No.: US 7,672,860 B2
(45) Date of Patent: Mar. 2, 2010

(54) COMPUTERIZED METHOD AND SYSTEM FOR DETERMINING THE CONTRIBUTION OF DEFENSES TO PREMISES LIABILITY FOR AN ACCIDENT

(75) Inventors: Stefan Wahlbin, Austin, TX (US); Gilda Reynolds, Austin, TX (US)

(73) Assignee: Computer Sciences Corporation, El Segundo, CA (US)

( * ) Notice: Subject to any disclaimer, the term of this patent is extended or adjusted under 35 U.S.C. 154(b) by 1319 days.

(21) Appl. No.: 10/238,981

(22) Filed: Sep. 9, 2002

(65) Prior Publication Data

US 2004/0054559 A1 Mar. 18, 2004

(51) Int. Cl.
*G06Q 10/00* (2006.01)
(52) U.S. Cl. .................... 705/4; 705/2; 705/3
(58) Field of Classification Search .......... 705/2–4
See application file for complete search history.

(56) References Cited

U.S. PATENT DOCUMENTS 4,638,289 A 1/1987 Zottnik
4,656,585 A 4/1987 Stephenson (Continued)

FOREIGN PATENT DOCUMENTS

EP 0 280 773 9/1988

(Continued)

OTHER PUBLICATIONS

"Car Accident Statistics," available at www.onlinbelaywersource.com/personal_injury/car/statistics.html (accessed on Feb. 7, 2007).*

(Continued)

*Primary Examiner*—Vivek D Koppikar
(74) *Attorney, Agent, or Firm*—Meyertons, Hood, Kivlin, Kowert & Goetzel, P.C.; Eric B. Meyertons

(57) ABSTRACT

A computer-implemented method and system for estimating a contribution of a defense to premises liability is provided. In one embodiment, a set of characteristics of an accident may be provided to a computer system. A contribution of the defense may be determined from at least one of the characteristics of the accident. In one embodiment, a characteristic may include a location of the accident. The defense may selected from a group of one or more defenses.

69 Claims, 14 Drawing Sheets

U.S. PATENT DOCUMENTS

| | | | |
|---|---|---|---|
| 4,839,822 A | 6/1989 | Dormond et al. | |
| 4,878,167 A | 10/1989 | Kapulka et al. | |
| 4,931,793 A | 6/1990 | Fuhrmann et al. | |
| 5,099,422 A | 3/1992 | Foresman et al. | |
| 5,128,859 A * | 7/1992 | Carbone et al. | 705/4 |
| 5,172,281 A | 12/1992 | Ardis et al. | |
| 5,180,309 A | 1/1993 | Egnor | |
| 5,191,522 A | 3/1993 | Bosco et al. | |
| 5,201,044 A | 4/1993 | Frey, Jr. et al. | |
| 5,233,513 A | 8/1993 | Doyle | |
| 5,243,524 A | 9/1993 | Ishida et al. | |
| 5,317,503 A | 5/1994 | Inoue | |
| 5,386,566 A | 1/1995 | Hamanaka et al. | |
| 5,394,555 A | 2/1995 | Hunter et al. | |
| 5,434,994 A | 7/1995 | Shaheen et al. | |
| 5,446,659 A | 8/1995 | Yamawaki | |
| 5,455,947 A | 10/1995 | Suzuki et al. | |
| 5,483,442 A | 1/1996 | Black et al. | |
| 5,483,632 A | 1/1996 | Kuwamoto et al. | |
| 5,499,330 A | 3/1996 | Lucas et al. | |
| 5,504,674 A | 4/1996 | Chen et al. | |
| 5,523,942 A | 6/1996 | Tyler et al. | |
| 5,524,489 A | 6/1996 | Twigg | |
| 5,550,976 A | 8/1996 | Henderson et al. | |
| 5,557,515 A | 9/1996 | Abbruzzese et al. | |
| 5,585,798 A | 12/1996 | Yoshioka et al. | |
| 5,586,310 A | 12/1996 | Sharman | |
| 5,638,508 A | 6/1997 | Kanai et al. | |
| 5,689,706 A | 11/1997 | Rao et al. | |
| 5,696,705 A | 12/1997 | Zykan | |
| 5,710,578 A | 1/1998 | Beauregard et al. | |
| 5,717,391 A | 2/1998 | Rodriguez | |
| 5,745,901 A | 4/1998 | Entner et al. | |
| 5,768,505 A | 6/1998 | Gilchrist et al. | |
| 5,768,506 A | 6/1998 | Randell | |
| 5,787,269 A | 7/1998 | Hyodo | |
| 5,787,429 A | 7/1998 | Nikolin | |
| 5,797,134 A | 8/1998 | McMillan et al. | |
| 5,798,949 A | 8/1998 | Kaub | |
| 5,815,093 A | 9/1998 | Kikinis | |
| 5,832,481 A | 11/1998 | Sheffield | |
| 5,862,500 A | 1/1999 | Goodwin | |
| 5,870,711 A | 2/1999 | Huffman | |
| 5,873,066 A | 2/1999 | Underwood et al. | |
| 5,877,707 A | 3/1999 | Kowalick | |
| 5,907,848 A | 5/1999 | Zaiken et al. | |
| 5,909,683 A | 6/1999 | Miginiac et al. | |
| 5,930,759 A | 7/1999 | Moore et al. | |
| 5,933,816 A | 8/1999 | Zeanah et al. | |
| 5,937,189 A | 8/1999 | Branson et al. | |
| 5,948,035 A | 9/1999 | Tomita | |
| 5,950,169 A | 9/1999 | Borghesi et al. | |
| 5,956,687 A | 9/1999 | Wamsley | |
| 5,987,434 A | 11/1999 | Libman | |
| 5,991,733 A | 11/1999 | Aleia et al. | |
| 6,009,402 A | 12/1999 | Whitworth | |
| 6,037,860 A | 3/2000 | Zander et al. | |
| 6,038,393 A | 3/2000 | Iyengar et al. | |
| 6,043,813 A | 3/2000 | Stickney et al. | |
| 6,049,665 A | 4/2000 | Branson et al. | |
| 6,064,983 A | 5/2000 | Koehler | |
| 6,076,026 A | 6/2000 | Jambhekar et al. | |
| 6,081,832 A | 6/2000 | Gilchrist et al. | |
| 6,092,049 A | 7/2000 | Chislenko et al. | |
| 6,098,070 A | 8/2000 | Maxwell | |
| 6,105,007 A | 8/2000 | Norris | |
| 6,115,690 A | 9/2000 | Wong | |
| 6,134,582 A | 10/2000 | Kennedy | |
| 6,141,015 A | 10/2000 | Tanaka | |
| 6,141,611 A | 10/2000 | Mackey et al. | |
| 6,161,071 A | 12/2000 | Shuman et al. | |
| 6,163,770 A | 12/2000 | Gamble et al. | |
| 6,173,284 B1 | 1/2001 | Brown | |
| 6,184,782 B1 | 2/2001 | Oda et al. | |
| 6,185,490 B1 | 2/2001 | Ferguson | |
| 6,185,540 B1 | 2/2001 | Schreitmueller et al. | |
| 6,223,125 B1 * | 4/2001 | Hall | 701/301 |
| 6,226,623 B1 | 5/2001 | Schein et al. | |
| 6,236,975 B1 | 5/2001 | Boe et al. | |
| 6,246,933 B1 | 6/2001 | Bague | |
| 6,254,127 B1 | 7/2001 | Breed et al. | |
| 6,268,804 B1 | 7/2001 | Janky et al. | |
| 6,308,187 B1 | 10/2001 | DeStefano | |
| 6,336,096 B1 * | 1/2002 | Jernberg | 705/4 |
| 6,351,893 B1 | 3/2002 | St. Pierre | |
| 6,363,360 B1 | 3/2002 | Madden | |
| 6,381,561 B1 * | 4/2002 | Bomar et al. | 703/8 |
| 6,397,334 B1 | 5/2002 | Chainer et al. | |
| 6,405,132 B1 | 6/2002 | Breed et al. | |
| 6,408,304 B1 | 6/2002 | Kumhyr | |
| 6,446,086 B1 | 9/2002 | Bartlett et al. | |
| 6,473,084 B1 | 10/2002 | Phillips et al. | |
| 6,493,650 B1 | 12/2002 | Rodgers et al. | |
| 6,525,672 B2 | 2/2003 | Chainer et al. | |
| 6,532,459 B1 | 3/2003 | Berson | |
| 6,570,609 B1 * | 5/2003 | Heien | 348/148 |
| 6,604,080 B1 | 8/2003 | Kern | |
| 6,675,074 B2 | 1/2004 | Hathout et al. | |
| 6,696,929 B2 | 2/2004 | Igaki et al. | |
| 6,832,205 B1 | 12/2004 | Aragones et al. | |
| 6,850,843 B2 * | 2/2005 | Smith et al. | 701/213 |
| 6,925,468 B1 | 8/2005 | Doughty et al. | |
| 6,938,029 B1 | 8/2005 | Tien | |
| 6,952,741 B1 | 10/2005 | Bartlett et al. | |
| 6,961,708 B1 | 11/2005 | Bierenbaum | |
| 6,970,844 B1 | 11/2005 | Bierenbaum | |
| 7,013,284 B2 | 3/2006 | Guyan | |
| 7,024,418 B1 | 4/2006 | Childress et al. | |
| 7,051,046 B2 | 5/2006 | Virag et al. | |
| 7,095,426 B1 | 8/2006 | Childress | |
| 7,197,444 B2 | 3/2007 | Bomar, Jr. et al. | |
| 7,343,307 B1 | 3/2008 | Childress | |
| 7,353,196 B1 | 4/2008 | Doughty et al. | |
| 7,356,541 B1 | 4/2008 | Doughty | |
| 7,359,863 B1 | 4/2008 | Evenshaug et al. | |
| 7,363,264 B1 | 4/2008 | Doughty et al. | |
| 7,398,219 B1 | 7/2008 | Wolfe | |
| 7,418,400 B1 | 8/2008 | Lorenz | |
| 7,430,514 B1 | 9/2008 | Childress et al. | |
| 7,430,515 B1 | 9/2008 | Wolfe et al. | |
| 2001/0037223 A1 | 11/2001 | Beery et al. | |
| 2001/0041993 A1 | 11/2001 | Campbell | |
| 2001/0044735 A1 | 11/2001 | Colburn et al. | |
| 2002/0004729 A1 | 1/2002 | Zak et al. | |
| 2002/0007289 A1 | 1/2002 | Malin et al. | |
| 2002/0030587 A1 | 3/2002 | Jackson | |
| 2002/0035488 A1 | 3/2002 | Aquila et al. | |
| 2002/0049619 A1 | 4/2002 | Wahlbin et al. | |
| 2002/0055860 A1 | 5/2002 | Wahlbin et al. | |
| 2002/0055861 A1 | 5/2002 | King et al. | |
| 2002/0059083 A1 | 5/2002 | Wahlbin et al. | |
| 2002/0059084 A1 | 5/2002 | Wahlbin et al. | |
| 2002/0059085 A1 | 5/2002 | Wahlbin et al. | |
| 2002/0059086 A1 | 5/2002 | Wahlbin et al. | |
| 2002/0059087 A1 | 5/2002 | Wahlbin et al. | |
| 2002/0059097 A1 | 5/2002 | Wahlbin et al. | |
| 2002/0062232 A1 | 5/2002 | Wahlbin et al. | |
| 2002/0062233 A1 | 5/2002 | Wahlbin et al. | |
| 2002/0062234 A1 | 5/2002 | Wahlbin et al. | |
| 2002/0062235 A1 | 5/2002 | Wahlbin et al. | |
| 2002/0069091 A1 | 6/2002 | Wahlbin et al. | |
| 2002/0069092 A1 | 6/2002 | Wahlbin et al. | |
| 2002/0082873 A1 | 6/2002 | Wahlbin et al. | |
| 2002/0087363 A1 | 7/2002 | Wahlbin et al. | |

| | | |
|---|---|---|
| 2002/0091504 A1 | 7/2002 | Wahlbin et al. |
| 2002/0128881 A1 | 9/2002 | Wahlbin et al. |
| 2002/0133362 A1 | 9/2002 | Karathanasis et al. |
| 2002/0145666 A1 | 10/2002 | Scaman et al. |
| 2002/0161597 A1 | 10/2002 | Klibaner |
| 2003/0114972 A1 | 6/2003 | Takafuji et al. |
| 2003/0125991 A1 | 7/2003 | Logan |
| 2003/0200123 A1 | 10/2003 | Burge et al. |
| 2004/0030587 A1 | 2/2004 | Danico |
| 2004/0049409 A1 | 3/2004 | Wahlbin et al. |
| 2004/0054556 A1 | 3/2004 | Wahlbin et al. |
| 2004/0054557 A1 | 3/2004 | Wahlbin et al. |
| 2004/0054558 A1 | 3/2004 | Wahlbin et al. |
| 2004/0102984 A1 | 5/2004 | Wahlbin et al. |
| 2004/0102985 A1 | 5/2004 | Wahlbin et al. |
| 2004/0103004 A1 | 5/2004 | Wahlbin et al. |
| 2004/0103005 A1 | 5/2004 | Wahlbin et al. |
| 2004/0103006 A1 | 5/2004 | Wahlbin et al. |
| 2004/0103007 A1 | 5/2004 | Wahlbin et al. |
| 2004/0103008 A1 | 5/2004 | Wahlbin et al. |
| 2004/0103009 A1 | 5/2004 | Wahlbin et al. |
| 2004/0103010 A1 | 5/2004 | Wahlbin et al. |
| 2004/0111301 A1 | 6/2004 | Wahlbin et al. |
| 2004/0205562 A1 | 10/2004 | Rozek et al. |
| 2005/0060205 A1 | 3/2005 | Woods et al. |
| 2005/0192850 A1 | 9/2005 | Lorenz |
| 2005/0198154 A1 | 9/2005 | Xie et al. |
| 2006/0031103 A1 | 2/2006 | Henry |
| 2007/0214020 A1 | 9/2007 | Srinivasan et al. |

FOREIGN PATENT DOCUMENTS

| | | |
|---|---|---|
| EP | 0 465 018 | 1/1992 |
| EP | 0 926 608 | 6/1999 |
| JP | 10197285 | 7/1998 |
| JP | 10214283 | 8/1998 |
| JP | 111611711 | 6/1999 |
| WO | 9506884 | 3/1995 |

OTHER PUBLICATIONS

Kahn, The premise behind premises liability, Feb. 1994, Security Management, vol. 38, Iss. 2, pp. 61-63.*
The 'Open and Obvious' Defense is No Longer a Complete Bar to Plaintiff Recovery by Sara Falkinham—published in the Mississippi Law Journal (Fall 1994) p. 241 (64 Miss L.J. 241).*
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, Vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994,19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995,16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
Connections, Computer Sciences Corporation, Mar./Apr. 2001, 58 pages.
Connections, Computer Sciences Corporation, Jun. 2001, 44 pages.
Connections, Computer Sciences Corporation, Oct. 2001, 39 pages.
Connections, Computer Sciences Corporation, Dec. 2001, 39 pages.
Connections, Computer Sciences Corporation, Apr. 2002, 35 pages.
CSC's Property and Casualty Claims Solutions, Computer Sciences Corporation, Nov. 2002, 2 pages.
International search report application No. PCT/US 01/30822, mailed Jan. 22, 2002, 5 pages.
U.S. Patent and Trademark Office, "Communication" for U.S. Appl. No. 09/969,024 mailed Jan. 31, 2006, available in PAIR.
U.S. Patent and Trademark Office, "Communication" for U.S. Appl. No. 09/969,024 mailed Jun. 1, 2006, available in PAIR.

U.S. Patent and Trademark Office, "Communication" for U.S. Appl. No. 09/969,018 mailed Jan. 26, 2006, available in PAIR.
U.S. Patent and Trademark Office, "Communication" for U.S. Appl. No. 09/969,018 mailed Jun. 2, 2006, available in PAIR.
U.S. Patent and Trademark Office, "Communication" for U.S. Appl. No. 09/969,545 mailed Mar. 23, 2006, available in PAIR.
U.S. Patent and Trademark Office, "Communication" for U.S. Appl. No. 09/969,018 mailed Dec. 4, 2006, available in PAIR.
U.S. Patent and Trademark Office, "Communication" for U.S. Appl. No. 09/969,534 mailed May 30, 2007 available in PAIR.
U.S. Patent and Trademark Office, "Communication" for U.S. Appl. No. 09/969,024 mailed May 23, 2007 available in PAIR.
U.S. Patent and Trademark Office, "Communication" for U.S. Appl. No. 10/306,623 mailed Mar. 7, 2007 available in PAIR.
U.S. Patent and Trademark Office, "Communication" for U.S. Appl. No. 10/306,873 mailed Sep. 20, 2007, available in PAIR.
U.S. Patent and Trademark Office, "Communication" for U.S. Appl. No. 10/306,804 mailed Oct. 3, 2007 available in PAIR.
U.S. Patent and Trademark Office, "Communication" for U.S. Appl. No. 10/306,909 mailed Oct. 5, 2007 available in PAIR.
U.S. Patent and Trademark Office, "Communication" for U.S. Appl. No. 09/969,018 mailed Jun. 21, 2007 available in PAIR.
U.S. Patent and Trademark Office, "Communication" for U.S. Appl. No. 10/306,803 mailed Oct. 5, 2007 available in PAIR.
U.S. Patent and Trademark Office, "Communication" for U.S. Appl. No. 10/306,908 mailed Oct. 5, 2007 available in PAIR.
U.S. Patent and Trademark Office, "Communication" for U.S. Appl. No. 10/306,864 mailed Oct. 4, 2007 available in PAIR.
Harts, "Reel to Real: Should You believe What You See?" Defense Counsel Journal, Oct. 1999, vol. 66. p. 514 from the Dialog File ABI/Inform Global.
Malloy, "'Big Time' Match Frame May Be Small, but It has No Problems Working With the Big Boys", San Antonio Business Journal, vol. 5 No. 11, s1, p. aa, Mar. 15, 1999. Dialog ID No. 0205483 from Dialog File 635 (Business Dateline .RTM.).
U.S. Patent and Trademark Office, "Communication" for U.S. Appl. No. 09/969,545 mailed Oct. 18, 2007 available in PAIR.
U.S. Patent and Trademark Office, "Communication" for U.S. Appl. No. 10/306,628 mailed Oct. 10, 2007 available in PAIR.
U.S. Patent and Trademark Office, "Communication" for U.S. Appl. No. 10/239,029 mailed Jun. 29, 2007 available in PAIR.
Kahn, "The Premise Behind Premises Liability" Feb. 1994, Security Management, vol. 38, Iss. 2 pp. 61-63.
Cigna P&C Opens National Premises Liability Center, Mar. 1999, PR Newswire, p. 1.
U.S. Patent and Trademark Office, "Communication" for U.S. Appl. No. 09/969,516 mailed Nov. 14, 2007, available in PAIR.
Blodgett, "Corporate Ethics Codes: A Practical Application of Liability Prevention", Journal of Business Ethics, vol. 16, Nos. 12-23, pp. 1363-1369, 1997.
U.S. Patent and Trademark Office, "Communication" for U.S. Appl. No. 10/306,858 mailed Dec. 13, 2007, available in PAIR.
U.S. Patent and Trademark Office, "Communication" for U.S. Appl. No. 10/306,623 mailed Jan. 25, 2008, available in PAIR.
U.S. Patent and Trademark Office, "Communication" for U.S. Appl. No. 10/238,029 mailed Dec. 13, 2007, available in PAIR.
U.S. Patent and Trademark Office, "Communication" for U.S. Appl. No. 09/969,020 mailed Jan. 24, 2008, available in PAIR.
U.S. Patent and Trademark Office, "Communication" for U.S. Appl. No. 09/969,021 mailed Jan. 8, 2008, available in PAIR.
U.S. Patent and Trademark Office, "Communication" for U.S. Appl. No. 09/969,027 mailed Jan. 11, 2008, available in PAIR.
U.S. Patent and Trademark Office, "Communication" for U.S. Appl. No. 10/238,019 mailed Jan. 11, 2008, available in PAIR.
Property and Casualty Solutions: CSC's Property & Casualty Claims Solutions, Computer Sciences Corporation, pp. 2, 2003. (g51).
U.S. Patent and Trademark Office, "Communication" for U.S. Appl. No. 09/969,017 mailed Apr. 16, 2008, available in PAIR.
U.S. Patent and Trademark Office, "Communication" for U.S. Appl. No. 09/969,016 mailed Mar. 17, 2008, available in PAIR.
U.S. Patent and Trademark Office, "Communication" for U.S. Appl. No. 09/969,534 mailed Apr. 15, 2008, available in PAIR.
U.S. Patent and Trademark Office, "Communication" for U.S. Appl. No. 09/969,019 mailed Feb. 27, 2008, available in PAIR.
U.S. Patent and Trademark Office, "Communication" for U.S. Appl. No. 09/969,019 mailed Apr. 28, 2008, available in PAIR.
U.S. Patent and Trademark Office, "Communication" for U.S. Appl. No. 09/969,146 mailed Sep. 22, 2006, available in PAIR.
U.S. Patent and Trademark Office, "Communication" for U.S. Appl. No. 09/969,146 mailed Oct. 5, 2007, available in PAIR.
U.S. Patent and Trademark Office, "Communication" for U.S. Appl. No. 10/238,025 mailed Jan. 9, 2008, available in PAIR.
U.S. Patent and Trademark Office, "Communication" for U.S. Appl. No. 10/238,029 mailed Dec. 13, 2007, available in PAIR.
U.S. Patent and Trademark Office, "Communication" for U.S. Appl. No. 10/238,029 mailed May 12, 2008, available in PAIR.
U.S. Patent and Trademark Office, "Communication" for U.S. Appl. No. 10/306,864 mailed Mar. 27, 2008, available in PAIR.
U.S. Patent and Trademark Office, "Communication" for U.S. Appl. No. 10/306,908 mailed Mar. 21, 2008, available in PAIR.
U.S. Patent and Trademark Office, "Communication" for U.S. Appl. No. 10/306,804 mailed Mar. 21, 2008, available in PAIR.
U.S. Patent and Trademark Office, "Communication" for U.S. Appl. No. 10/306,866 mailed May 5, 2008, available in PAIR.
U.S. Patent and Trademark Office, "Communication" for U.S. Appl. No. 10/306,628 mailed Mar. 27, 2008, available in PAIR.
U.S. Patent and Trademark Office, "Communication" for U.S. Appl. No. 10/306,873 mailed May 21, 2008, available in PAIR.
U.S. Patent and Trademark Office, "Communication" for U.S. Appl. No. 10/306,909 mailed May 14, 2008 available in PAIR.
U.S. Patent and Trademark Office, "Communication" for U.S. Appl. No. 10/306,803 mailed May 29, 2008, available in PAIR.
U.S. Patent and Trademark Office, "Communication" for U.S. Appl. No. 09/969,018 mailed Jul. 21, 2008, available in PAIR.
U.S. Patent and Trademark Office, "Communication" for U.S. Appl. No. 09/969,027 mailed Jul. 10, 2008 available in PAIR.
U.S. Patent and Trademark Office, "Communication" for U.S. Appl. No. 09/969,020 mailed Jul. 7, 2008, available in PAIR.
U.S. Patent and Trademark Office, "Communication" for U.S. Appl. No. 10/238,025 mailed Jun. 27, 2008, available in PAIR.
U.S. Patent and Trademark Office, "Communication" for U.S. Appl. No. 10/237,547 mailed Jun. 30, 2008, available in PAIR.
U.S. Patent and Trademark Office, "Communication" for U.S. Appl. No. 10/306,858 mailed Jul. 18, 2008, available in PAIR.
U.S. Patent and Trademark Office, "Communication" for U.S. Appl. No. 10/790,632 mailed Jul. 2, 2008, available in PAIR.
U.S. Patent and Trademark Office, "Communication" for U.S. Appl. No. 09/969,021 mailed Sep. 4, 2008, available in PAIR.
U.S. Patent and Trademark Office, "Communication" for U.S. Appl. No. 10/238,019 mailed Sep. 23, 2008, available in PAIR.
U.S. Patent and Trademark Office, "Communication" for U.S. Appl. No. 10/306,864 mailed Aug. 22, 2008, available in PAIR.
U.S. Patent and Trademark Office, "Communication" for U.S. Appl. No. 10/306,873 mailed Sep. 23, 2008, available in PAIR.
U.S. Patent and Trademark Office, "Communication" for U.S. Appl. No. 10/306,804 mailed Sep. 2, 2008, available in PAIR.
U.S. Patent and Trademark Office, "Communication" for U.S. Appl. No. 10/306,628 mailed Aug. 22, 2008, available in PAIR.
U.S. Patent and Trademark Office, "Communication" for U.S. Appl. No. 09/969,516 mailed Oct. 14, 2008, available in PAIR.
U.S. Patent and Trademark Office, "Communication" for U.S. Appl. No. 09/969,016 mailed Oct. 28, 2008, available in PAIR.
U.S. Patent and Trademark Office, "Communication" for U.S. Appl. No. 10/790,632 mailed Dec. 23, 2008, available in PAIR.
U.S. Patent and Trademark Office, "Communication" for U.S. Appl. No. 10/790,626 mailed Jan. 22, 2009, available in PAIR.
U.S. Patent and Trademark Office, "Communication" for U.S. Appl. No. 09/969,017 mailed Dec. 11, 2008, available in PAIR.
U.S. Patent and Trademark Office, "Communication" for U.S. Appl. No. 09/969,545 mailed Dec. 9, 2008, available in PAIR.
U.S. Patent and Trademark Office, "Communication" for U.S. Appl. No. 09/969,015 mailed Dec. 9, 2008, available in PAIR.
U.S. Patent and Trademark Office, "Communication" for U.S. Appl. No. 09/969,022 mailed Dec. 9, 2008, available in PAIR.

U.S. Patent and Trademark Office, "Communication" for U.S. Appl. No. 09/969,536 mailed Dec. 4, 2008, available in PAIR.
U.S. Patent and Trademark Office, "Communication" for U.S. Appl. No. 09/969,534 mailed Dec. 9, 2008, available in PAIR.
U.S. Patent and Trademark Office, "Communication" for U.S. Appl. No. 09/969,019 mailed Dec. 9, 2008, available in PAIR.
U.S. Patent and Trademark Office, "Communication" for U.S. Appl. No. 09/970,161 mailed Dec. 9, 2008, available in PAIR.
U.S. Patent and Trademark Office, "Communication" for U.S. Appl. No. 09/969,039 mailed Dec. 9, 2008, available in PAIR.
U.S. Patent and Trademark Office, "Communication" for U.S. Appl. No. 10/238,029 mailed Dec. 5, 2008, available in PAIR.
U.S. Patent and Trademark Office, "Communication" for U.S. Appl. No. 10/306,909 mailed Dec. 15, 2008, available in PAIR.
U.S. Patent and Trademark Office, "Communication" for U.S. Appl. No. 10/306,803 mailed Dec. 12, 2008, available in PAIR.
U.S. Patent and Trademark Office, "Communication" for U.S. Appl. No. 10/306,908 mailed Dec. 9, 2008, available in PAIR.
U.S. Patent and Trademark Office, "Communication" for U.S. Appl. No. 10/306,866 mailed Dec. 9, 2008, available in PAIR.
U.S. Patent and Trademark Office, "Communication" for U.S. Appl. No. 10/306,864 mailed Jan. 8, 2009, available in PAIR.
U.S. Patent and Trademark Office, "Notice of Allowance" for U.S. Appl. No. 09/969,546 mailed Jun. 22, 2009, available in PAIR.
U.S. Patent and Trademark Office, "Office Action" for U.S. Appl. No. 09/969,015 mailed Apr. 28, 2009, available in PAIR.
U.S. Patent and Trademark Office, "Office Action" for U.S. Appl. No. 09/969,022 mailed Apr. 28, 2009, available in PAIR.
U.S. Patent and Trademark Office, "Advisory Action" for U.S. Appl. No. 09/969,534 mailed Apr. 29, 2009, available in PAIR.
U.S. Patent and Trademark Office, "Notice of Allowance" for U.S. Appl. No. 09/969,018 mailed Jun. 29, 2009, available in PAIR.
U.S. Patent and Trademark Office, "Office Action" for U.S. Appl. No. 09/969,019 mailed Apr. 28, 2009, available in PAIR.
U.S. Patent and Trademark Office, "Office Action" for U.S. Appl. No. 09/970,161 mailed Apr. 28, 2009, available in PAIR.
U.S. Patent and Trademark Office, "Examiner's Answer" for U.S. Appl. No. 09/969,027 mailed Jun. 8, 2009 available in PAIR.
U.S. Patent and Trademark Office, "Office Action" for U.S. Appl. No. 10/238,029 mailed Apr. 10, 2009 available in PAIR.
U.S. Patent and Trademark Office, "Office Action" for U.S. Appl. No. 10/238,019 mailed Jun. 26, 2009, available in PAIR.
U.S. Patent and Trademark Office, "Office Action" for U.S. Appl. No. 10/306,864 mailed Jun. 26, 2009 available in PAIR.
U.S. Patent and Trademark Office, "Final Office Action" for U.S. Appl. No. 10/306,909 mailed Apr. 29, 2009, available in PAIR.
U.S. Patent and Trademark Office, "Final Office Action" for U.S. Appl. No. 10/306,803 mailed Apr. 29, 2009, available in PAIR.
U.S. Patent and Trademark Office, "Office Action" for U.S. Appl. No. 10/306,804 mailed May 26, 2009, available in PAIR.
U.S. Patent and Trademark Office, "Final Office Action" for U.S. Appl. No. 10/306,866 mailed Apr. 16, 2009, available in PAIR.
U.S. Patent and Trademark Office, "Final Office Action" for U.S. Appl. No. 10/306,858 mailed Apr. 2, 2009, available in PAIR.
U.S. Patent and Trademark Office, "Final Office Action" for U.S. Appl. No. 10/306,628 mailed May 7, 2009, available in PAIR.
U.S. Patent and Trademark Office, "Office Action" for U.S. Appl. No. 10/790,632 mailed May 22, 2009, available in PAIR.
U.S. Patent and Trademark Office, "Office Action" for U.S. Appl. No. 10/790,626 mailed Jun. 22, 2009, available in PAIR.
U.S. Patent and Trademark Office, "Office Action" for U.S. Appl. No. 10/912,883 mailed Jun. 25, 2009, available in PAIR.
North Carolina Cooperative Extension Service, "Liability and the North Carolina Landowner." Oct. 9, 1995.
Clark, Walter, "The Investigation and Adjustment of Liability" 1914.
Taanaim, "Babylonian Talmud: Tractate Baba Kamma-47a and 47b" 500CE.
Sayed, "Assault on the Common Law of Premise Liability: What duty of care does an owner or occupier of land owe to a police officer who enters the premises of another by authority of law." Spring 1997, 19 Campbell Law Review 579.
Weidmann, "Technical parameters influencing the severity of injury front-seat, beltprotected car passengers on the impact side in car-rto-car side collisions with the main impact between the front and rear seats (B-pillars)", International Journal of Legal Medicine (Germany); 1992; p. 105(1) p. 11-5, ISSN 0937-9827.
NexGen Ergonomics, Mannequin Pro, Jun. 20, 2002.
U.S. Patent and Trademark Office, "Final Office Action" for U.S. Appl. No. 10/306,908 mailed Mar. 19, 2009, available in PAIR.
Ivanovich, Michael G., "How the Web Works—Part 1." Heating, Piping, and Air Conditioning. Feb. 1997, vol. 69 p. 82.
U.S. Patent and Trademark Office, "Board Decision" for U.S. Appl. No. 09/969,546 mailed Feb. 20, 2009, available in PAIR.
U.S. Patent and Trademark Office, "Examiner's Answer" for U.S. Appl. No. 09/969,018 mailed Mar. 19, 2009, available in PAIR.
U.S Patent and Trademark Office, "Final Office Action" for U.S. Appl. No. 09/969,021 mailed Mar. 17, 2009, available in PAIR.
U.S. Patent and Trademark Office, "Examiner's Answer" for U.S. Appl. No. 09/969,024 mailed Jan. 9, 2008, available in PAIR.
U.S. Patent and Trademark Office, "Final Office Action" for U.S. Appl. No. 10/238,029 mailed Dec. 8, 2008, available in PAIR.
U.S. Patent and Trademark Office, "Examiner's Answer" for U.S. Appl. No. 10/306,623 mailed Jan. 7, 2009, available in PAIR.
U.S. Patent and Trademark Office, "Final Office Action" for U.S. Appl. No. 10/306,908 mailed Mar. 19, 2009, available in PAIR.
U.S. Patent and Trademark Office, "Office Action" for U.S. Appl. No. 09/969,019 mailed Feb. 27, 2008, available in PAIR.
U.S. Patent and Trademark Office, "Supplemental Notice of Allowance" for U.S. Appl. NO. 09/969,018 mailed Jul. 30, 2009, available in PAIR.
U.S. Patent and Trademark Office, "Decision on Appeal" for U.S. Appl. No. 09/969,039 dated Jun. 10, 2009, available in PAIR.
U.S. Patent and Trademark Office, "Notice of Allowability" for U.S. Appl. No. 10/306,908 mailed Jul. 27, 2009, available in PAIR.
U.S. Patent and Trademark Office, "Office Action" for U.S. Appl. No. 10/306,866 mailed Aug. 14, 2009, available in PAIR.
U.S. Patent and Trademark Office, "Final Office Action" for U.S. Appl. No. 10/306,873 mailed Jul. 21, 2009, available in PAIR.
U.S. Patent and Trademark Office, "Communication" for U.S. Appl. No. 09/969,017 mailed May 9, 2007 available in PAIR.
U.S. Patent and Trademark Office, "Communication" for U.S. Appl. No. 09/969,016 mailed Mar. 3, 2007 available in PAIR.
U.S. Patent and Trademark Office, "Communication" for U.S. Appl. No. 09/969,534 mailed May 30, 2007 available in PAIR.
U.S. Patent and Trademark Office, "Communication" for U.S. Appl. No. 09/969,027 mailed Jun. 20, 2007 available in PAIR.
U.S. Patent and Trademark Office, "Communication" for U.S. Appl. No. 10/306,866 mailed Jun. 21, 2007 available in PAIR.
U.S. Patent and Trademark Office, "Communication" for U.S. Appl. No. 10/306,858 mailed Jun. 29, 2007 available in PAIR.
U.S. Patent and Trademark Office, "Communication" for U.S. Appl. No. 09/969,021 mailed Mar. 8, 2007, available in PAIR.
U.S. Patent and Trademark Office, "Communication" for U.S. Appl. No. 09/969,020 mailed Jul. 5, 2007, available in PAIR.
Walrand, J., et al., High-Performance Communication Networks, "Economics," Chapter 8 through 8.2.1, p. 361-369, 1996. (f8).
Microsoft Component Services: Server Operating System A Technology Overview, Microsoft Corp., p. 1-7, Aug. 15, 1998. (f38).
Holding State in Objects with Microsoft Transaction Server, Microsoft Corp., pp. 2, Jun. 1997. (f37).
Straight Through Processing: Migration Assessment for Series II Clients Computer Sciences Corporation, pp. 6, 2003. (g50).
Property and Casualty Solutions: CSC's Property & Casualty Claims Solutions, Computer Sciences Corporation, pp. 2, 2003. (g51).
@Fault: Improve Claims Practices Through Greater consistency in Fault Assessment, Computer Sciences corporation, pp. 2, 2004. (g53).
Utzaeider, James, "Microsoft Transaction Server and Internet Information Server: Technology for the Web," Microsoft Corp., p. 1-5, Feb. 6, 1998. (f44).
Howarth, Brad, "Outsourcing: Technology on tap," Information Economy, BRW, vol. 21, No. 47, p. 1-5, Dec. 3, 1999. (f28).
Baker, "Don't Throw Your Adjusters to the Lions" Apr. 1995, Best's Review, vol. 95 No. 12, pp. 66-69.
CSC website, "Fault Evaluator,"www.csc.com, accesCSC website, "Fault Evaluator,"www.csc.com, accessed on Feb. 8, 2006.

"CSC Files Suit to protect Intellectual Property", PR Newswire, New York: Jan. 12, 2000, p. 1.
David, "Knowledge on the Beat," Jul. 1999, Knowledge Management Magazine, www.destinationkm.com.
Ditek@http://www.archive.org/web/20000301124742/www.ditec.com, last viewed on Nov. 28, 2005.
Esters, "Computers Can Help Settle Auto Claims" Apr. 28, 1997, National Underwriter. vol. 101, Iss. 17, p. 10.
ISO Liability Adivsor, www.iso.com, accessed on Feb. 8, 2006.
"ISO to Acquire Claims Outcome Advisor from Computer Sciences and MYND," Dec. 21, 2000, accessed at www.swampfox.ws.
Laser Technology, Inc. "Crash/Crime Scene Mapping" @ http://www.lasertech.com/accidentcsinv.html. Copyright 1999.
Laser Technology, Inc. "QuickMap 3D" http://web.archive.org/web/200003011511/222.lasertech.com/laserproducts/qm3d.html, last view on Nov. 28, 2005.
Naim, "IT and Crime Resolution, It's elementary, Holmes helps UK police solve crimes,"Jan. 3, 1997, Financial Times (London, UK), p. 17.
Nicolle, "Elementary, dear Holmes," Jan. 22, 1997, The Times (London, UK, p. Interfa).
"Policy Management Systems Corporation Announces Pilot Licensing of Claims Outcome Advisor™ to Blue Ridge Insurance Co.," PR Newswire. New York; Aug. 24, 1999, p. 1.
Ross, "Settled Out of Court" Copyright 1980. Aldine Degruyter.
Meckbach, "U.S. universities pic up Ditek's CAD application" Feb. 26, 1999. Computing Canada. vol. 25, Iss. 8 p. 14.
Spice, "Police use lasers, computers to map scenes Town of Pewaukee's new system boost accuracy of reconstructions, users say" Sep. 29, 1998. Milwaukee Journal Sentinel. p. 2.
Trademark for @Fault, accessed from uspto.gov on Feb. 8, 2006.
Traynor, "The Effects of Varying Safety Conditions on the External Costs of Driving," Winter, 1994 Eastern Economic journal, vol. 20 No. 1 pp. 45-60.
Lindberg, Gunnar, "Calculating Transport Accident Costs: Final report of the Expert Advisors to the high Level group on Infrastructure charging (Working Group 3)." Borlaenge, Sweden. Apr. 27, 1999, 53 pages.
U.S. Patent and Trademark Office, "Communication" for U.S. Appl. No. 09/969,017 mailed Oct. 11, 2006, available in PAIR.
U.S. Patent and Trademark Office, "Communication" for U.S. Appl. No. 09/969,017 mailed Mar. 1, 2006, available in PAIR.
U.S. Patent and Trademark Office, "Communication" for U.S. Appl. No. 09/969,020 mailed Dec. 21, 2006 available in PAIR.
U.S. Patent and Trademark Office, "Communication" for U.S. Appl. No. 09/969,020 mailed Jan. 26, 2006, available in PAIR.
U.S. Patent and Trademark Office, "Communication" for U.S. Appl. No. 09/969,020 mailed Jul. 5, 2006, available in PAIR.
U.S. Patent and Trademark Office, "Communication" for U.S. Appl. No. 09/969,019 mailed Jun. 1, 2006, available in PAIR.
U.S. Patent and Trademark Office, "Communication" for U.S. Appl. No. 09/969,536 mailed Mar. 24, 2006, available in PAIR.
U.S. Patent and Trademark Office, "Communication" for U.S. Appl. No. 09/969,534 mailed Feb. 17, 2006, available in PAIR.
U.S. Patent and Trademark Office, "Communication" for U.S. Appl. No. 09/969,021 mailed Feb. 27, 2006, available in PAIR.
U.S. Patent and Trademark Office, "Communication" for U.S. Appl. No. 09/969,027 mailed Mar. 3, 2006, available in PAIR.
U.S. Patent and Trademark Office, "Communication" for U.S. Appl. No. 09/969,022 mailed Apr. 6, 2006, available in PAIR.
U.S. Patent and Trademark Office, "Communication" for U.S. Appl. No. 09/969,015 mailed Jun. 1, 2006, available in PAIR.
U.S. Patent and Trademark Office, "Communication" for U.S. Appl. No. 09/970,161 mailed Mar. 23, 2006, available in PAIR.
U.S. Patent and Trademark Office, "Communication" for U.S. Appl. No. 09/969,146 mailed Feb. 28, 2006, available in PAIR.
U.S. Patent and Trademark Office, "Communication" for U.S. Appl. No. 09/969,546 mailed Mar. 21, 2006, available in PAIR.
U.S. Patent and Trademark Office, "Communication" for U.S. Appl. No. 09/969,016 mailed Mar. 21, 2006, available in PAIR.
U.S. Patent and Trademark Office, "Communication" for U.S. Appl. No. 09/969,516 mailed Aug. 10, 2006, available in PAIR.
U.S. Patent and Trademark Office, "Communication" for U.S. Appl. No. 09/969,545 mailed Mar. 23, 2006, available in PAIR.
Juhl, Randy P., "The OTC Revolution;" Drugtopics.com; Mar. 3, 1997, pp. 1-9.
McHenry, Brian G., "The Algorithms of Crash," Southwest Coast Collision Conference, Aug. 2001, pp. 1-34.
Mead, Jay, "Technical Communication," Aug. 1998, V. 45, N. 3, pp. 353-380.
Merlin, Jr., William F., "Collision Course With the Colossus Program: How to Deal With It," The Merlin Law Group May 2000, Tampa, FL, pp. 1-17.
Merlin, Jr., William F., "Colossus: What We Know Today," The Merlin Law Group, Aug. 2000, Tampa, FL, pp. 1-8.
Merlin, Jr., William F., "Overcoming Allstate's Trade Secrets and Work-Product Objections," The Merlin Law Group Mar. 2000, Tampa, FL, pp. 1-31.
Scopus and Entrust Technologies to Deliver World's First Secure Customer Care Solution for the Financial; Services Market; PR Newswire dated Nov. 5, 1997.
Scopus and Entrust: Call Center Sales Center is Unveiled; American Banker, Nov. 10, 1997, vol. 162, Issue 217.
"@ Fault a Commitment to Consistency," Computer Sciences Corporation, Copyright 2000, pp. 1-2.
"Accident Reconstruction Software Maine Computer Group," Maine Computer Group, Copyright 2001, pp. 1-2.
"ADP CSG: Integrated Medical Solutions," ADP Claims Solutions Group, Copyright 2001, p. 1.
"CSC Expands Cost Containment Solutions for Claims and Legal Expenses," Computer Sciences Corporation, Jun. 27, 2001, El Segundo, CA, pp. 1-2.
"CSC Introduces Liability Assessment Tool to Improve Claims Consistency," Computer Sciences Corporation, Oct. 31, 2001, pp. 1-2.
"CSC: Solutions Search," Computer Sciences Corporation, Copyright 2001, p. 1.
"IMS ICE," ADP Integrated Medical Solutions, Copyright 2001, Rockville, MD, pp. 1-6.
"Insurance Services Office Strengthens Claims Handling Team," ISO Properties, Inc., Copyright 1996, 2001, Jersey City, NJ, pp. 1-2.
"ISO Claims Outcome Advisor," ISO Properties Inc., Copyright 1996, 2001, Jersey City, NJ, pp. 1-2.
"REC-TEC Accident Reconstruction and Analysis Computer Software," George M. Bonnett, Nov. 2001, Rockledge, FL, pp. 1-5.
"REC-TEC Accident Reconstruction Software," George M. Bonnett, Sep. 2001, Rockledge, FL, pp. 1-10.
Borland, Russel, "Running Microsoft Outlook 97," Microsoft Press, 1997.
Frey, Joe, "p. 2: Putting a price on auto injuries: How software called Colossus evaluates your pain—Allstate under colossal pressure," Insure.com, Oct. 26, 2000, pp. 1-3.
Frey, Joe, "Putting a price on auto injuries: How software called Colossus evaluates your pain," Insure.com, Oct. 26, 2000, pp. 1-5.

* cited by examiner

COMPUTERIZED METHOD AND SYSTEM FOR DETERMINING THE CONTRIBUTION OF DEFENSES TO PREMISES LIABILITY FOR AN ACCIDENT

BACKGROUND OF THE INVENTION

1. Field of the Invention

The present invention generally relates to processing transactions in the insurance industry. More particularly, the present invention relates to computer implemented systems and methods for estimation of liability for an accident on a premises.

2. Description of the Related Art

A typical premises accident claims organization may face a number of challenges in processing claims. Some of these challenges may include assessment of liability, threat of litigation, and experience level of claims adjusters. A premises accident claims organization may add value to the liability assessment process in a number of ways that represent an opportunity to produce a solution that enhances the liability assessment process and the effectiveness of the adjuster.

Assessment of liability is one important challenge facing a claims organization. It is believed that a large percentage of premises accident claims may be assessed at 100% liability against the insured when the claimant may actually share in the fault. While it may be difficult to pinpoint exact reasons for this practice among claims adjusters, several likely factors influencing the tendency to assess 100% liability against the insured include: ineffective negotiation, large case loads, inadequate time to effectively assess liability, and a desire to settle claims quickly to avoid litigation.

In general, claimants tend to have a litigious nature. In addition, claimant counsel may typically be present during negotiations. Therefore, claims adjusters may need to rigorously investigate the characteristics of the premises accident scene, the duties of the insured, and the contributing actions of the claimant before assessing liability.

The experience level of claims adjusters is typically low due to a lack of longevity in the position. Over the years, a dramatic shortening of the training regimen for most new claims adjusters has tended to make the claims adjuster less effective than his or her predecessor. In addition, the lack of experienced claims adjusters to advise and teach the newcomers worsens the situation. New claims adjusters may not be as knowledgeable in claims adjusting practices and the laws of their jurisdiction as are the senior claims adjusters. Consequently, claims adjusters may make "best guess" assessments. A lack of trained and experienced claims adjusters may tend to produce an inadequate and/or inequitable assessment process.

SUMMARY OF THE INVENTION

Described herein are various embodiments of a computer implemented method for estimating liability in an accident. In one embodiment, a computer-implemented method of estimating liability for an accident on a premises may include providing to a computer system a set of characteristics relating to an accident. The negligence of an insured may be determined from at least one of the characteristics. A contribution of one or more defenses to the liability may be determined from at least one of the characteristics. The applicability of one or more bars to liability may be determined from at least one of the characteristics.

In certain embodiments, negligence of an insured may be determined from claimant status, duties of an insured to a claimant, breach of duty, and causation. Claimant status, duties of an insured to a claimant, breach of duty, and causation may be determined from at least one of the characteristics relating to the accident. A value of liability may be estimated, which is based on the breach of duty, the causation, the defenses, and the bars.

One embodiment of a method of determining claimant status may include providing to a computer system a set of characteristics relating to an accident. The characteristics of the accident may then be evaluated. The claimant status may be determined from the characteristics of the accident.

In one embodiment, a method of determining breach of duty may include providing a set of characteristics to a computer system relating to an accident. One or more questions may be evaluated using at least one of the characteristics. Breach of duty may be associated with one or more combinations of answers to the one or more questions. Breach of duty may be determined from the evaluated questions.

One embodiment of a method of determining causation of a claimant's harm may include providing to a computer system a set of characteristics relating to an accident. In certain embodiments, determining causation of the claimant's harm may include determining cause in fact and/or proximate cause of an accident from at least one of the characteristics.

In an embodiment, a computer-implemented method of estimating a contribution of a defense to liability for an accident on a premises may include providing to a computer system a set of characteristics relating to the accident. The contribution may be determined from the characteristics of the accident.

BRIEF DESCRIPTION OF THE DRAWINGS

A better understanding of the present invention may be obtained when the following detailed description of the preferred embodiment is considered in conjunction with the following drawings, in which.

Figure 1:
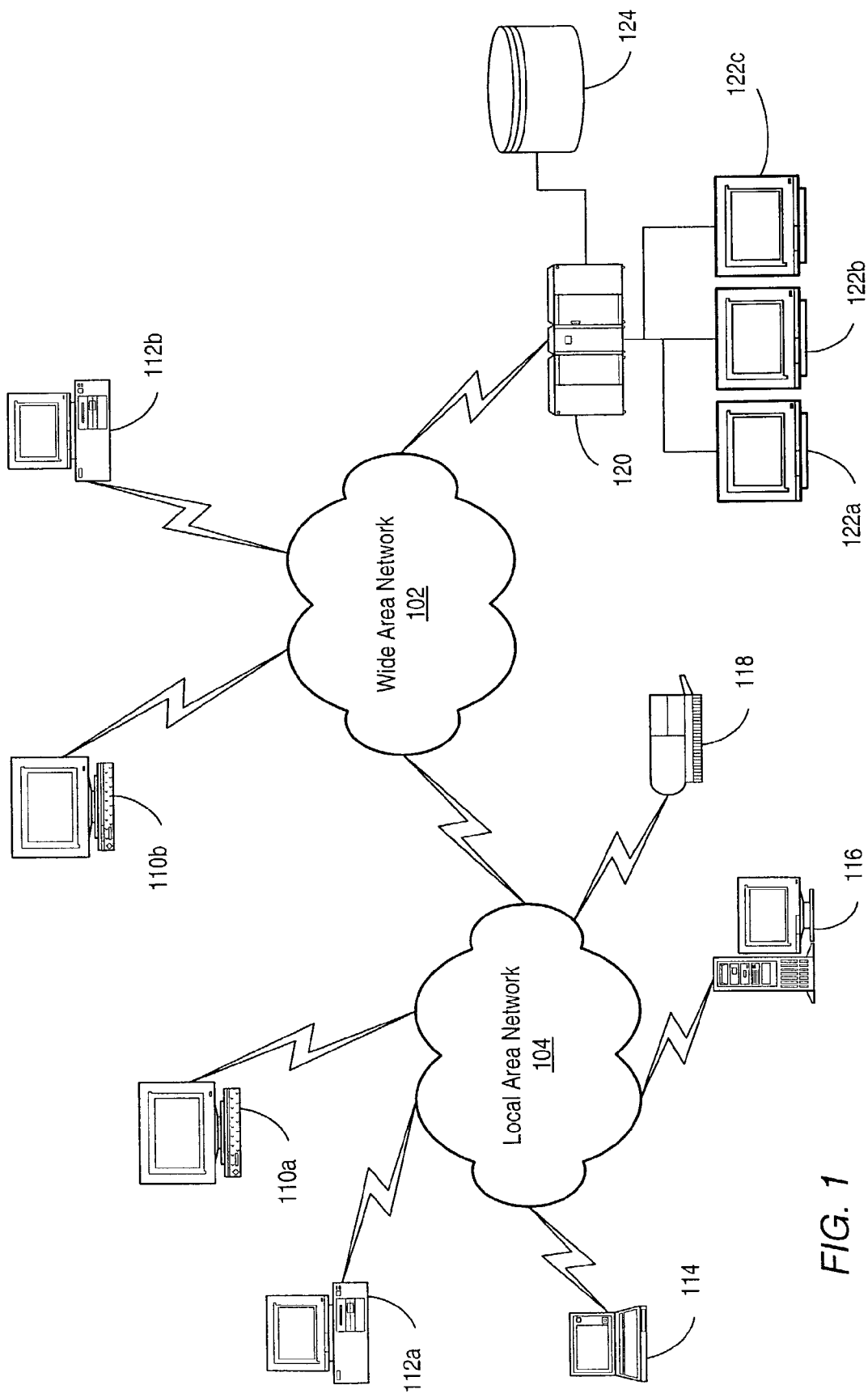
FIG. 1 is a network diagram of a wide area network that is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1 illustrates a wide area network (WAN) according to one embodiment. WAN 102 is a network that spans a relatively large geographical area. The Internet is an example of WAN 102. WAN 102 includes a plurality of computer systems which are interconnected through one or more networks. Although one particular configuration is shown in FIG. 1, WAN 102 may include a variety of heterogeneous computer systems and networks interconnected in a variety of ways, and which run a variety of software applications.

One or more local area networks (LANs) 104 may be coupled to WAN 102. LAN 104 is a network that spans a relatively small area. Typically, LAN 104 may be confined to a single building or group of buildings. Each node (i.e., individual computer system or device) on LAN 104 may have its own CPU with which it executes programs. In addition, each node may be able to access data and devices anywhere on LAN 104. LAN 104, thus, may allow many users to share devices (e.g., printers) and/or data stored on file servers. LAN 104 may be characterized by a variety of types of topology (i.e., the geometric arrangement of devices on the network), of protocols (i.e., the rules and encoding specifications for sending data and whether the network uses a peer-to-peer or client/server architecture), and of media (e.g., twisted-pair wire, coaxial cables, fiber optic cables, radio waves).

Each LAN 104 may include a plurality of interconnected computer systems and optionally one or more other devices such as one or more workstations 110a, one or more personal computers 112a, one or more laptop or notebook computer systems 114, one or more server computer systems 116, and one or more network printers 118. As illustrated in FIG. 1, an example LAN 104 may include computer systems 110a, 112a, 114, and 116, and printer 118. LAN 104 may be coupled to other computer systems and/or other devices and/or other LANs 104 through WAN 102.

One or more mainframe computer systems 120 may be coupled to WAN 102. As shown, mainframe 120 may be coupled to a storage device or file server 124 and mainframe terminals 122a, 122b, and 122c. The mainframe terminals 122a, 122b, and 122c may be configured to access data stored in the storage device or file server 124 coupled to or included in mainframe computer system 120.

WAN 102 may also include computer systems connected to WAN 102 individually and not through LAN 104, such as for purposes of example, workstation 110b and personal computer 112b. For example, WAN 102 may include computer systems that are geographically remote and connected to each other through the Internet.

Figure 2:
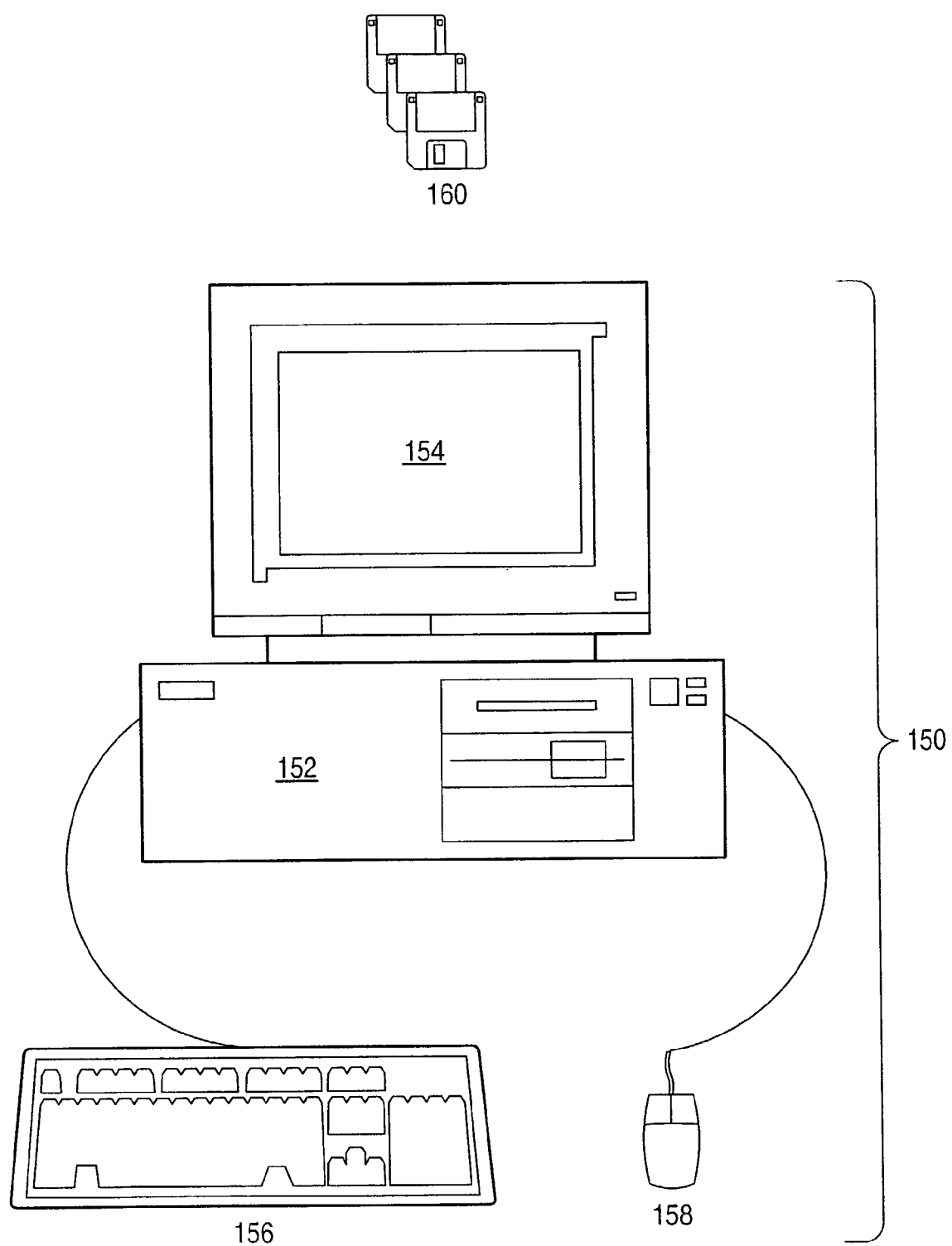
FIG. 2 is an illustration of a typical computer system that is suitable for implementing various embodiments.

FIG. 2 illustrates an embodiment of computer system 150, which may be suitable for implementing various embodiments of a system and method for assessment of premises liability of an accident on a premises by considering the characteristics that describe an accident combined with expert knowledge collected from experienced claims adjusters. Computer system 150 typically includes components such as CPU 152 with an associated memory medium such as floppy disks 160. The memory medium may store program instructions for computer programs. The program instructions may be executable by CPU 152. Computer system 150 may further include a display device such as monitor 154, an alphanumeric input device such as keyboard 156, and a directional input device such as mouse 158. Computer system 150 may be operable to implement assessment of premises liability of an accident on a premises by considering the characteristics that describe an accident combined with expert knowledge collected from experienced claims adjusters.

Computer system 150 may include a memory medium on which computer programs according to various embodiments may be stored. The term "memory medium" generally refers to an installation medium, e.g., CD-ROM or floppy disks 160, a computer system memory such as DRAM, SRAM, EDO RAM, Rambus RAM, etc., or a non-volatile memory such as a magnetic media, e.g., a hard drive or optical storage. The memory medium may also include other types of memory, or combinations thereof. In addition, the memory medium may be located in a first computer in which the programs are executed or may be located in a second different computer, which connects to the first computer over a network. In the latter instance, the second computer may provide the program instructions to the first computer for execution. Also, computer system 150 may take various forms, including a personal computer system, mainframe computer system, workstation, network appliance, Internet appliance, personal digital assistant ("PDA"), television system, or other device. In general, the term "computer system" may be broadly defined to encompass any device having a processor, which executes instructions from a memory medium.

The memory medium may preferably store a software program or programs for assessment of liability in an accident by considering the characteristics that describe such an accident combined with expert knowledge collected from experienced claims adjusters. The software program(s) may be implemented in any of various ways including, but not limited to, procedure-based techniques, component-based techniques, and/or object-oriented techniques. For example, the software program may be implemented using ActiveX controls, C++ objects, JavaBeans, Microsoft Foundation Classes (MFC), browser-based applications (e.g., Java applets), traditional programs, or other technologies or methodologies as desired. A CPU such as host CPU 152 executing code and data from the memory medium may include a means for creating and executing the software program or programs according to the methods and/or flow diagrams as described herein.

As used herein, "premises liability" is tort liability of a landowner or possessor of land to another party for conditions or activities on the premises that caused injury to the party.

As used herein, a "tort" refers to a civil wrong for which a remedy may be obtained, usually in the form of damages.

As used herein, "liability" is defined as an amount for which a person or party is responsible or obligated because of negligence of the person or party. Liability may be expressed in a ratio or percentage (e.g., there is a total of 100% liability that can be attributed to persons, parties, or other factors such as weather, etc.). In another embodiment, liability may be expressed as a dollar amount. In an embodiment, liability may be expressed as a range of percentage liability. Expressing liability as a range of percentage liability may provide a claims adjuster with information that may be useful in negotiating an acceptable settlement to a claim.

As used herein, a "premises" is a tract of land with its component parts, such as buildings. Premises may also refer to a building or part of a building, typically, with its appurtenances such as grounds or easements.

As used herein, a "standard of care," as it relates to the law of negligence, is a degree of care. In states that recognize variations in claimant status, an invitee may be owed the highest degree of care, a reasonable degree of care may be owed to a licensee, and a slight degree of care may be owed to a trespasser.

As used herein, "duty" refers to a legal disadvantage that is owed or due to another and that needs to be satisfied. In tort law, a duty is a legal relationship between an actor and other parties arising from a standard of care. The violation of the standard of care subjects the actor to liability. For example, an insured may owe a certain claimant several duties with respect to the condition of the insured's premises. Each duty has associated with it a standard of care required of the insured.

As used herein, "cause in fact" is a cause without which an event would not have occurred.

As used herein, a "proximate cause" refers to a cause that sets in motion a sequence of events uninterrupted by any superseding causes. A proximate cause results in an effect, typically foreseeable, such as an injury that would not otherwise have occurred. A proximate cause of an accident may be legally sufficient to result in liability.

As used herein, the term "claims adjuster" is an individual employed by a claims organization of an insurance carrier who assesses the liability of each party involved in an accident. Gathering the characteristics relating to an accident may typically be a task completed by a claims adjuster. When the claims adjuster has collected some or all of the information available, the information may be entered into a computer system.

As used herein, an "insured" is a landowner or possessor on whose premises a party claims to have been injured. The insured holds an insurance policy with a claims organization or insurance carrier. The policy obligates the claims organization or insurance carrier to compensate the injured party for the portion of the damages suffered by the injured party that was the fault of the insured.

As used herein, a "jurisdiction" refers to a geographic area within which political or judicial authority may be exercised.

As used herein, the term "claimant" refers to a party alleging injury arising out of an accident that occurred on an insured's leased or owned premises. The claimant seeks compensation for bodily injury and/or property damage from a claims organization or insurance carrier of the insured. The claimant's status may be an invitee, a licensee, a social guest, a trespasser, or a general claimant. As used herein, an "invitee" refers to a claimant that is on the premises primarily for the benefit of the landowner or possessor of the premises. An invitation to enter the premises to an invitee by the landowner or possessor may be express or implied. As used herein, a "licensee" is a claimant on the premises primarily for the benefit of the licensee, or the mutual benefit of the licensee and the landowner or possessor of the premises. As used herein, a "social guest" is a person who is entertained or to whom hospitality is extended. Generally, tort law treats social guests essentially the same as licensees. As used herein, a "trespasser" is a person who is on the premises without permission, express or implied, of the landowner or possessor of the premises. As used herein, a "general claimant" refers to the claimant status in a jurisdiction that does not recognize variations in claimant status.

As used herein, the term "contributory negligence" refers to a claimant's own negligence that played a part in causing the claimant's injury. Under contributory negligence doctrine, a claimant's negligence bars the claimant from recovering damages from the landowner or possessor.

In a "comparative negligence" scheme, a claimant's own negligence proportionally reduces the damages recoverable by the claimant. The negligence of the claimant is not an absolute bar to recovery from the landowner or possessor. Most states have abolished contributory negligence doctrine and have adopted instead the comparative negligence scheme.

An "affirmative defense" is a defense made by a landowner or possessor that does not deny the truth of the allegations against it. An affirmative defense provides some other reason, such as contributory negligence, expiration of a statute of limitations, or insanity, why the landowner or possessor cannot be held liable. The term "defense," as used herein, refers to an affirmative defense.

As used herein, "assumption of risk" is a principle that a person who has taken on the risk of loss, injury, or damage consequently cannot maintain an action against the party having caused the loss. In jurisdictions where it applies, assumption of risk is an affirmative defense. When assumption of risk applies, a claimant cannot receive compensation for injuries from a party that caused the injuries because the claimant freely and knowingly assumed the risk of injury. By assuming the risk of injury, a claimant relieved the party that caused the loss of the obligation to act with reasonable care. However, assumption of risk has been subsumed by the doctrines of contributory or comparative negligence in most jurisdictions.

As used herein, "actual notice" is notice expressly and actually given and brought to a party directly. In addition, actual notice may be presumed to be received personally because the evidence within the party's knowledge is sufficient to put him or her on inquiry.

As used herein, "constructive notice" is notice presumed by law to have been acquired by a person and thus imputed to that person. For example, if a defect has been visible and apparent for a sufficient length of time for employees of a business to have discovered and remedied it, the business may be presumed to have constructive notice.

As used herein, a "defense" is an action by a claimant that shifts some or all of the liability from the landowner or possessor to the claimant.

As used herein, a "bar" is a preventive barrier to or the destruction of a legal action or claim made by a claimant.

As used herein, a "reasonable person" refers to a fictional person with an ordinary degree of reason, prudence, care, foresight, and/or intelligence. A reasonable person's conduct, conclusion, or expectation in relation to a particular circumstance or fact may be used as an objective standard to measure or determine something, such as the existence of negligence.

As used herein, generally, "negligence" refers to the failure to exercise the standard of care in a situation that a reasonably prudent person would have exercised in the same situation. The law of negligence generally requires that three conditions be met for the landowner or possessor to be liable in negligence to a party. The first condition is that the landowner or possessor had a duty to the party. The duties that a landowner or possessor has to a claimant may depend on the claimant status. For example, some jurisdictions (e.g., states) treat each claimant status differently in evaluating premises liability while others do not. Additionally, it may be important to determine whether a duty had been transferred from the landowner or possessor to a third party. For example, a duty may be transferred from a landowner to a renter in a lease agreement. In such a case, the apparent duty of the landowner may actually belong to the renter. The second condition for liability in negligence is that the landowner or possessor breached the duty. The third condition is causation, i.e., the breach must be shown to be the cause in fact and the proximate cause of the party's injury.

If the landowner or possessor is found to be liable in negligence to a party, the liability may be reduced or eliminated by applicable defenses. In addition, liability may be eliminated if any bars to recovery apply.

In one embodiment, a computer-implemented method of estimating premises liability for an accident may include providing to a computer system a set of characteristics relating to an accident on a premises. The computer system may first determine negligence of the insured based on at least one of the characteristics. The contribution of one or more defenses to the liability may then be determined from at least one of the characteristics. In addition, the computer system may determine the applicability of one or more bars to the liability.

Figure 3:
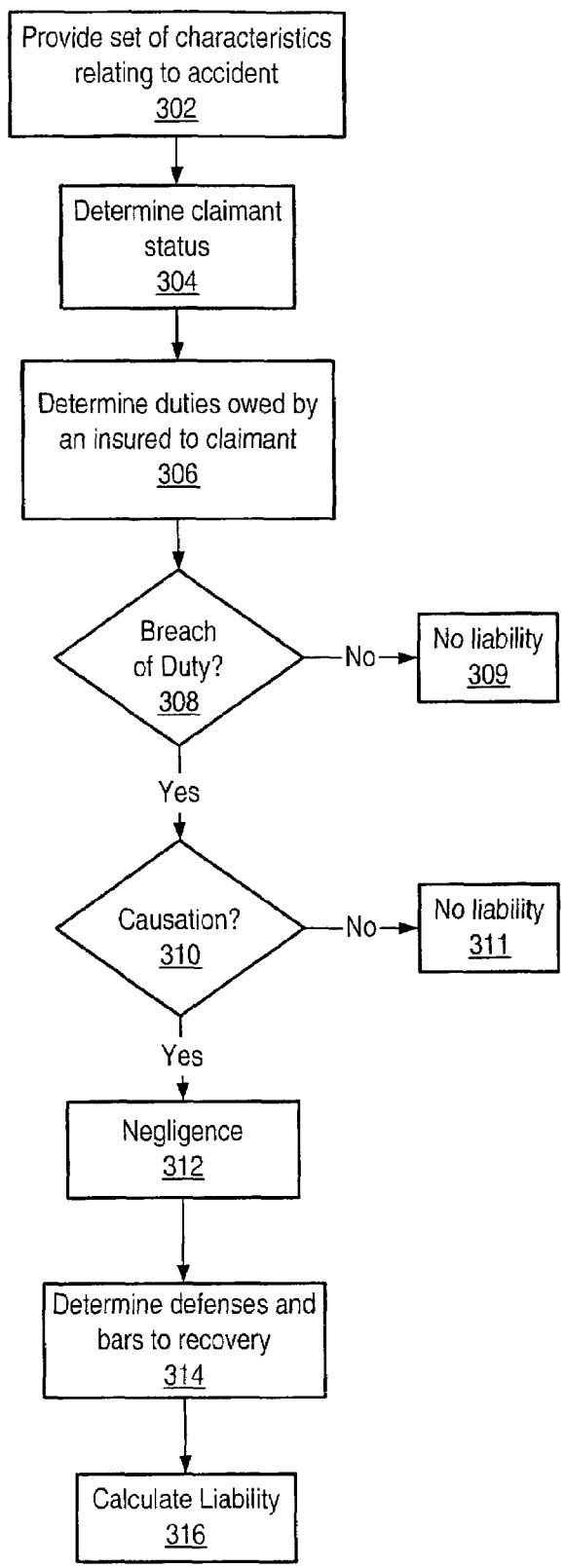
FIG. 3 is a flow chart of a method of premises liability estimation according to one embodiment.

FIG. 3 is a flow chart of premises liability estimation on a computer system according to one embodiment. In step 302, a set of characteristics relating to an accident may be provided to the computer system. The set of characteristics may include details relating to the accident.

Figure 4:
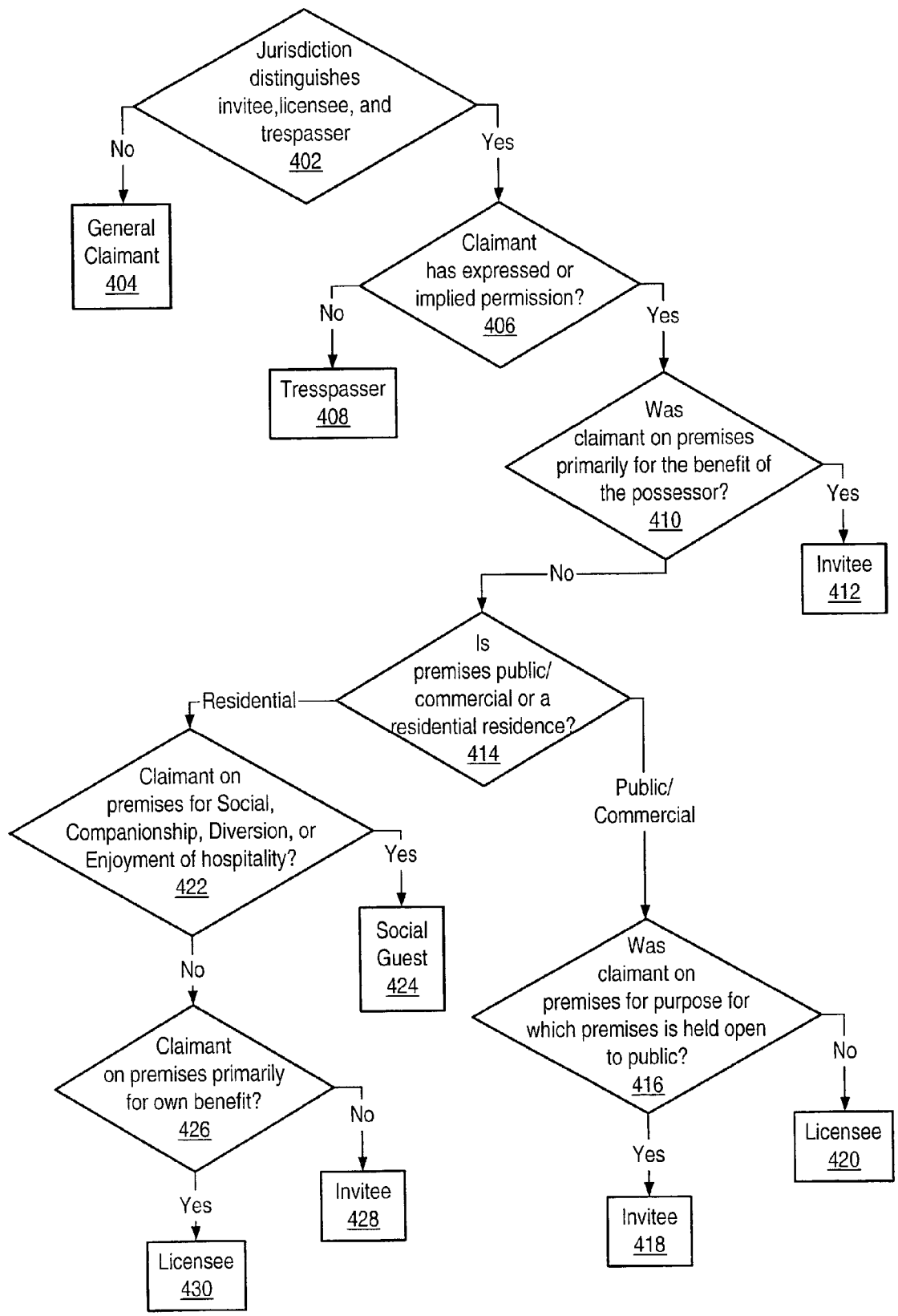
FIG. 4 is a flow chart illustrating determination of claimant status according to one embodiment.

In step 304 of FIG. 3, the claimant status may be determined from at least one of the characteristics. FIG. 4 illustrates one embodiment of determining claimant status. The claimant status may be associated with duties and a standard of care.

In step 306, the duties owed by an insured to a claimant may be determined. Table 5 lists duties that may be owed by an insured to a claimant for different claimant status and two jurisdictions.

Figure 5:
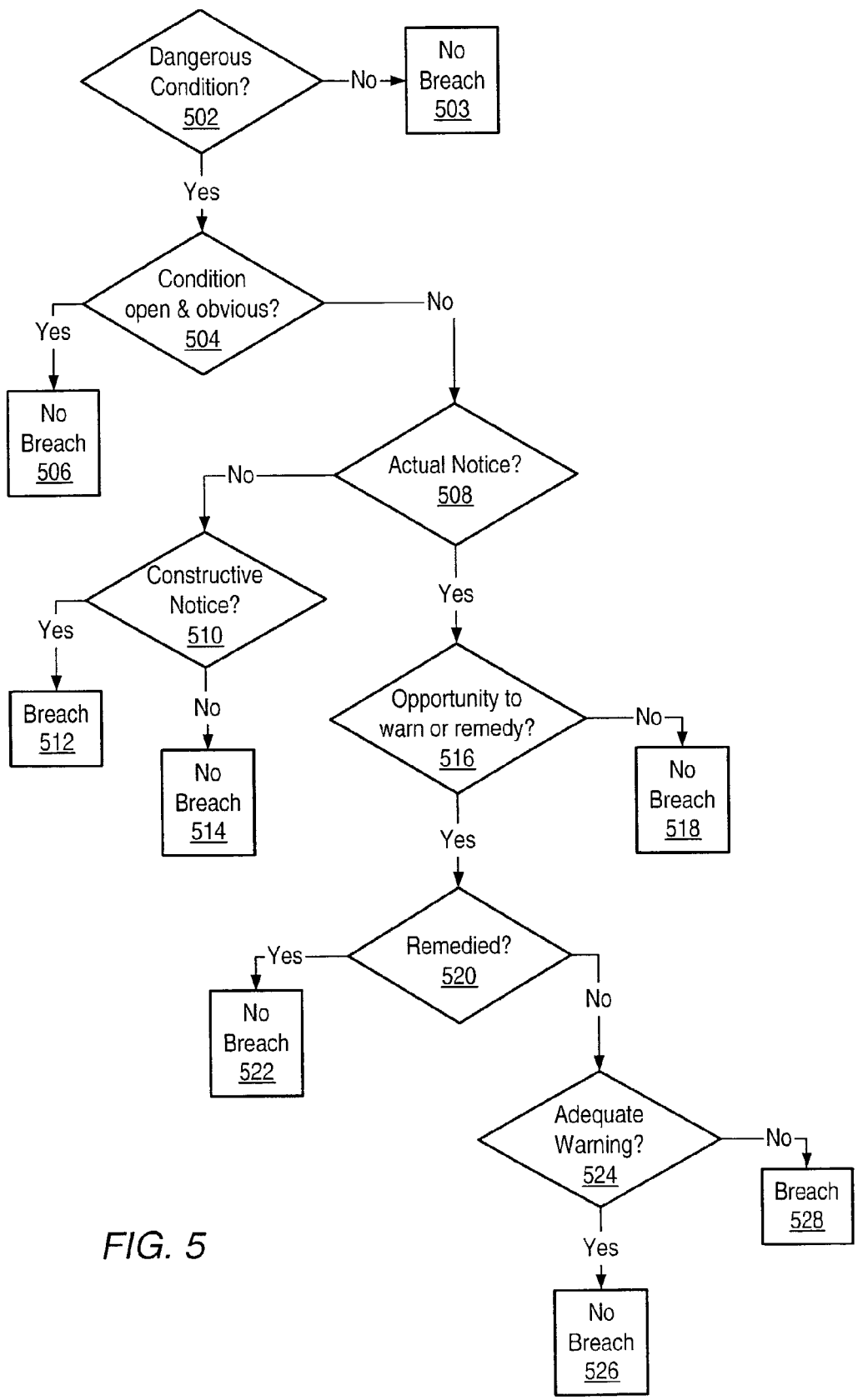
FIG. 5 is a flow chart illustrating determination of breach of duty for an invitee according to one embodiment.
Figure 6:
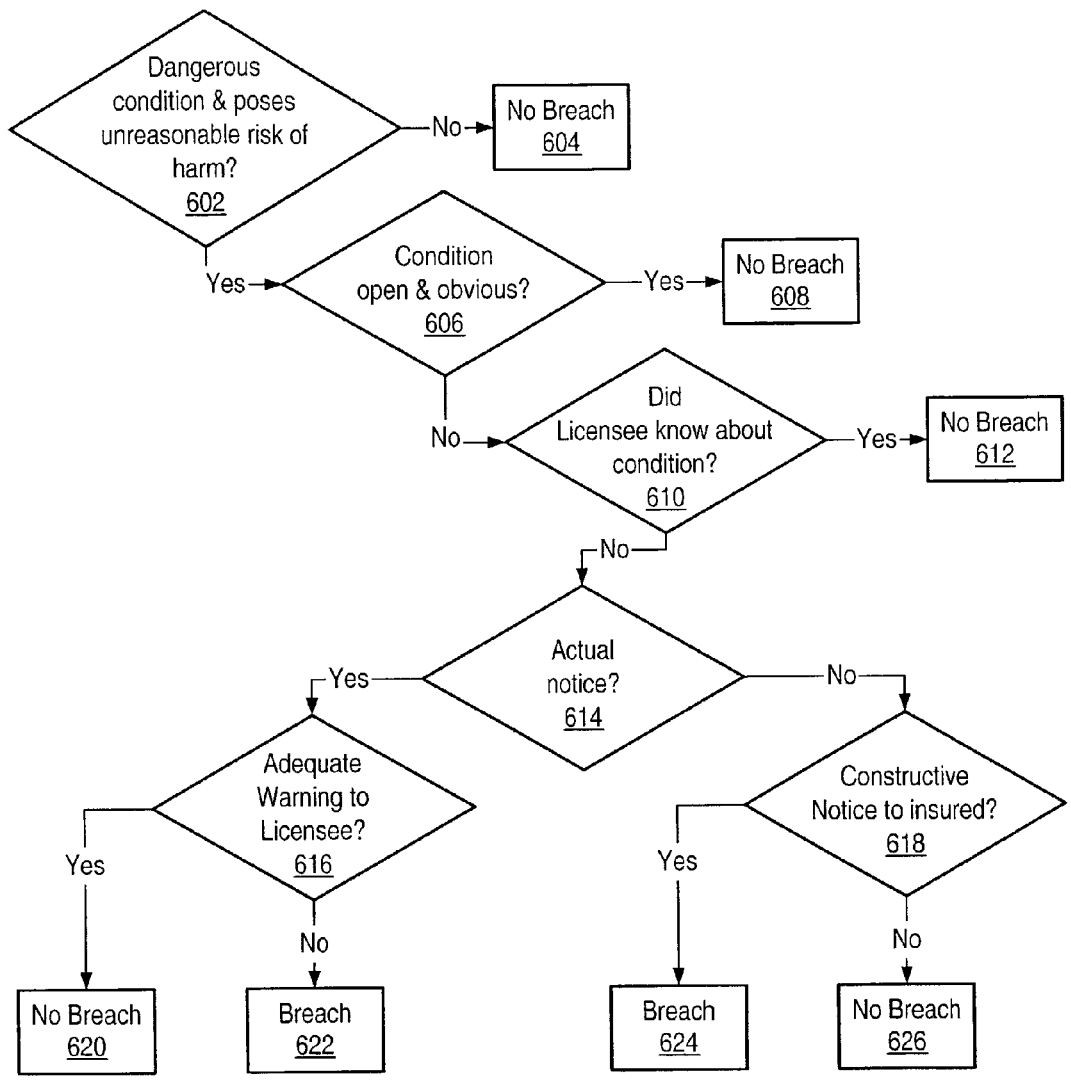
FIG. 6 is a flow chart illustrating determination of breach of duty for a licensee according to one embodiment.
Figure 7:
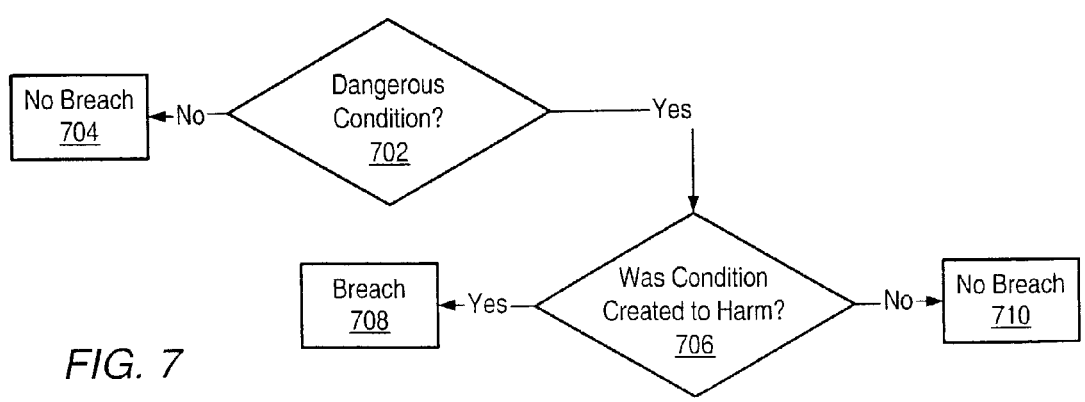
FIG. 7 is a flow chart illustrating determination of breach of duty for a trespasser according to one embodiment.

Decision point 308 in FIG. 3 may include determining whether or not there was a breach of duty by the insured from at least one of the characteristics. The duties owed by an insured to a claimant may be compared to the standard of care exercised by the insured to determine breach of duty. If there was no breach of any duties owed to the claimant by the insured, then there may be no premises liability. FIGS. 5, 6, and 7 are flow charts that illustrate the determination of breach of duty of an insured to claimants of different claimant status. Tables 8, 9, and 10 are tables of questions that correspond to FIGS. 5, 6, and 7. Step 309 indicates that there is no liability if there is no breach of duty. If breach of duty is found at decision point 308, causation may be determined at decision point 310 from at least one of the characteristics. Causation may include both cause in fact and proximate cause.

Step 311 indicates that there may be no liability if there is no causation. If causation is found at decision point 310, then the insured may be negligent, as shown by step 312.

In step 314, the applicability and contribution of one or more defenses of the insured against the claimant may be determined from at least one of the characteristics. In addition, the applicability of one or more bars to recovery by the claimant may be determined in step 314. Table 17 lists some defenses and bars to recovery. FIGS. 9 to 19 illustrate the application of some of the defenses. One or more valid defenses may result in the application of either contributory or comparative negligence doctrine to the claimant.

In step 316, the liability of the insured to the claimant may be calculated. In jurisdictions where comparative negligence applies, the liability of the insured may be reduced or eliminated by applying the defenses. In addition, applying any one of the bars to recovery may eliminate liability.

The initial step in a method of premises liability estimation, as shown by step 302 in FIG. 3, may be to provide characteristics relating to the accident. In one embodiment, the characteristics may include the insured type, accident type, premises type, and jurisdiction. Table 1 lists examples of the insured type, accident type, premises type, and jurisdiction. The insured type may be residential, commercial, or public. The number of units in a residence may determine whether a rental residence is residential or commercial.

TABLE 1

SELECTED CHARACTERISTICS FOR PREMISES LIABILITY

| Characteristic | Types |
| --- | --- |
| Insured | Residential, single-family homeowner |
|  | Residential tenant |
|  | Residential landlord |
|  | Commercial owner |
|  | Commercial tenant |
|  | Commercial landlord |
|  | Public owner |
|  | Public tenant |
|  | Public landlord |
| Accident | Slip |
|  | Trip |
|  | Fall |
|  | Security |
|  | Falling objects |
|  | Attractive nuisance |
|  | Vicious animals |
|  | Toxic exposure |
|  | Revolving door |
| Premises | Floor |
|  | Stairway |
|  | Sidewalk |
|  | Fixture (e.g., bathtub) |
|  | Doors |
|  | Pool |
|  | Yard |
|  | Driveway |
|  | Deck |
|  | Parking lot |
|  | Ramp |
|  | Landscaping |
|  | Unimproved Land |
|  | Parks and Recreation Areas |
| Jurisdiction | 50 U.S. States |
|  | U.S. territories |
|  | Foreign States |

In one embodiment, characteristics may also include a description of the accident, accident scene, claimant, injury, and other information specific to the accident or accident scene. Characteristics may be obtained as answers to a series of investigative questions. One or more of the characteristics may be used to determine claimant status, duties owed by insured to claimant, breach of duty, causation, defenses, and/or bars. In one embodiment, investigative questions developed for the Manson Training Flipchart may be used for a slip, trip, or fall accident. Slip, trip, or fall accidents may occur on a floor, a stairway, or a sidewalk. For example, Manson investigative questions may include the following:

For slip, trip or fall accidents on a floor, examples of investigative question that may be asked include:

A. Regarding the Accident
1. Date?
2. Time?
3. What was the exact location of the accident on the premises?
4. Does the insured own or rent the premises?
5. What is the name and address of the injured person?
   a) What is the injured person's relationship to the insured?
   b) Why was the injured person on the premises?
   c) Was the injured person familiar with the premises?
6. Describe movements of the injured person from the entrance onto the premises to the accident location.
7. Describe how the incident occurred.
8. Determine the exact location on the premises where the incident occurred.
9. Describe the condition complained of.
10. What type of flooring was involved?
    a) How was the flooring cleaned and maintained?
    b) When was the flooring last cleaned, and by whom?
11. Is the area inspected regularly?
    a) What is the inspection procedure?
12. What caused the condition?
    If water or another liquid caused the condition:
      a) Describe the liquid (e.g., consistency, smell, color, etc.).
      b) How did the liquid get there?
      c) Was weather a factor?
      d) Was the liquid tracked inside?
      e) How far from the outside entrance was the location of the accident?
      f) Were storm mats in place—size and composition?
      g) Did the liquid come from other than the insured premises?
      h) How long had the liquid been there?
      i) Describe the dimensions of the puddle.
      j) Were there any warning signs or barriers?
      k) Were steps taken to clean the liquid prior to the incident?
      l) Was the area well lit?
      m) Was the liquid clearly visible or obvious?
      n) When was area last inspected before the accident?
    If a foreign object caused the condition:
      a) Describe the foreign object (e.g., size, consistency, etc.).
      b) Describe the location of the foreign object.
      c) Was anyone aware of the foreign object?
      d) How long had the foreign object been there?
      e) Were any steps taken to alleviate the dangerous condition?
      f) Were any warning signs or barriers in place?
      g) Where did the foreign object come from?
    If the premises was a store:
      a) Is the substance (e.g., liquid or foreign object) natural to the insured business?
      b) Are there any sweeping records—what is the store's procedure?
      c) When was the last inspection of the area and by whom?
    If waxed floors were involved in the incident:
      a) When was the floor last waxed?
      b) By whom?
      c) With what product?
      d) Who manufactures the wax?
      e) Was wax applied according to the manufacturer's instructions?
      f) Was an independent contractor involved? If so obtain the name of the contractor.
    If floor coverings were involved in the incident:
      a) What type of floor covering (e.g., carpets, scatter rugs, paper, etc.)?
      b) What type of shoes was the injured person wearing at the time of the incident?
    If a structural defect was involved in the incident:
      a) What is the composition of the floor (e.g., wood, cement, tile, etc.)?
      b) Was the surface level or sloped?
      c) If the surface was sloped, to what degree and in what direction?
      d) Was the floor smooth, rough, or depressed?
      e) What were the measurements of the defect?
      f) Was the defect visible?
      g) Was the floor sagging or broken?
      h) How long had the defect been there?
      i) Was the insured aware of the defect?—If so, for how long?
      j) Was the injured person familiar with the defect?
      k) Did the structural defect pre-exist the insured's lease, or ownership of the premises?
      l) Had any steps been taken to alleviate the defect?—If so, describe?

B. Regarding the accident scene
1. Describe how the fall occurred.
2. Where was the injured person looking prior to the accident?
3. Was the injured person talking to anyone?
4. Was the injured person carrying anything?
5. Was the injured person in a hurry?
6. Was the injured person walking or running?
7. What type of shoes was the injured person wearing?
   a) Describe heels and soles of the injured person's shoes.
8. Were any children or animals with the injured person?
9. What does the injured person allege is responsible for fall?
10. Does the injured person wear glasses or contact lenses?—If so, was the injured person wearing them at the time of the accident?

C. Regarding the claimant
1. Name and address?
2. Age?
3. Why was the claimant on the premises?

D. Regarding the injury
1. If there was an injury, describe it.
2. Identify the dates and type of treatments received by the injured person.
3. Identify doctors, hospitals, etc. that provided treatment to the injured person.
4. Is further treatment anticipated?
5. What is the occupation of the injured person?—Obtain employer, address, wages, lost time, etc.

E. Regarding other information
1. Describe what happened after the incident.
2. Were police called?

a) If so, what branch of police responded (e.g., state, local, etc.)?
b) What did they do?
3. Obtain names and addresses of witnesses.
4. Was alcohol or medication involved in the incident?

II. For slip, trip, or fall accidents on a stairway, examples of investigative question that may be asked include:

A. Regarding the accident
1. Date?
2. Time?
3. What was the exact location of the accident on the premises?
4. What is the injured person's relationship to the insured?
5. Was the injured person familiar with the premises?
   a) Why was the injured person on the premises?
6. Describe the movements of the injured person from the entrance onto the premises to the accident location.
7. Describe how the incident occurred.
8. If weather was a factor, obtain details of the weather conditions.
9. Was the injured person going up or down stairs?
   a) Was the injured person running, walking, and/or carrying anything?
10. Were lights on?
11. What type of shoes was the injured person wearing?
12. Were any children or animals with the injured person?
13. How did the injured person fall?
14. Where was the injured person looking prior to the fall?
15. Was the injured person talking to anyone just prior to fall?
16. Does the injured person wear glasses or contact lenses? If so, was the injured person wearing the glasses or contact lenses at the time of the incident?

B. Regarding the accident scene
1. Describe the stairway.
   a) Number of steps?
   b) Width of the steps?
   c) Number of landings?
   d) Size of the treads?
   e) Height of the risers?
   f) Composition of steps (e.g., wood, concrete, marble, etc.)?
   g) Was there a covering on steps?
      1. Carpeting, linoleum, rubber treads, nosing?
      2. What was the condition of the covering?
   h) What was the condition of the steps?
2. Were there any defects on the steps?—If so, describe the defect(s).
3. Did the stairway have handrails?
4. Was the stairway steep, straight, curved?
5. Was the stairway a common passageway?—If so, who uses it?
6. Describe the lighting in the stairway (e.g., natural, artificial, adequacy).
7. Were there any obstructions on the stairs?—If so, describe the obstructions.
8. If there was a defect or obstruction, how long had it existed?
9. Had any steps been taken to alleviate the problem?
10. Does the insured rent or own the premises?

C. Regarding the claimant
1. Name and address?
2. Age?
3. Why was the claimant on the premises?

D. Regarding the injury
1. If there was an injury, describe it.
2. Identify the dates and type of treatments received by the injured person.
3. Identify doctors, hospitals, etc. that provided treatment to the injured person.
4. Is further treatment anticipated?
5. What is the occupation of the injured person?—Obtain employer, address, wages, lost time, etc.?

E. Regarding other information
1. Describe what happened after the incident.
2. Were police called?
   a) If so, what branch of police responded (e.g., state, local, etc.)?
   b) What did they do?
3. Obtain names and addresses of witnesses.
4. Was alcohol or medication involved in the incident?

III. For slip, trip, or fall accidents that involve a sidewalk, examples of investigative questions that may be asked include:

A. Regarding the accident
1. Date?
2. Time?
3. What was the exact location of the accident on the premises?
4. Does the insured own or rent the premises?
5. Name and address of the injured person?
   a) What is the injured person's relationship to the insured?
   b) Why was the injured person on the premises?
   c) Was the injured person familiar with the premises?
6. Describe the movements of the injured person from the entrance onto the premises to the accident location.
7. Description of how the incident occurred.
8. Describe the injured person's footwear.
9. Was the injured person walking, running, and/or carrying anything?
10. Was the injured person arriving at or leaving the premises?
11. Was any warning given of the dangerous condition?
12. What happened immediately after the accident?

B. Regarding the accident scene
1. Where is the sidewalk in question?
2. What is the composition of the sidewalk (e.g., brick, stone, cement, dirt, etc.)?
3. What is the general condition of the sidewalk (e.g., any defects)?
4. Is the sidewalk privately or publicly owned?
5. Describe the slope of the sidewalk.
6. If ice was involved:
   a) Where did the water come from?
      1. Drain spout?
      2. Eaves?
      3. Plumbing?
      4. Drains or pipes?
      5. Melting snow?
      6. Did the insured know of the leak? If so, for how long?
         a) Were any steps taken to fix the leak?
7. If snow was involved:
   a) When did the snow start and stop falling?
   b) How deep was the snow?
   c) Describe the consistency of the snow.
   d) Did the snow cover ice?
   e) Was entire the sidewalk covered?
   f) Had the sidewalk been cleaned?
      1. By whom?
      2. When?

3. Describe how the sidewalk was cleaned.
   4. How was the snow piled?
   5. Who had the duty to remove the snow?
   6. Do any local ordinances address who is responsible for clearing of snow?
   7. Were there any agreements with outside vendors to clear the snow?—If so, obtain the details and contracts.
  g) Was any sanding done?
   1. By whom?
   2. How much?

C. Regarding the claimant
1. Name and address?
2. Age?
3. Why was the claimant on the premises?

D. Regarding the injury
1. If there was an injury, describe it.
2. Identify the dates and type of treatments received by the injured person.
3. Identify doctors, hospitals, etc. that provided treatment to the injured person.
4. Is further treatment anticipated?
5. What is the occupation of the injured person?—Obtain employer, address, wages, lost time, etc.

E. Regarding other information
1. Obtain names and addresses of witnesses.
2. Was alcohol or medication involved in the incident?

Table 2 illustrates relationships between premises types and insured types according to one embodiment. Generally, premises types may be placed into three categories: residential, commercial, or public. Table 2 also shows the application of slip, trip, or fall accidents to each of the premises according to one embodiment. Floors, fixtures, stairs, pools, and ramps may be applicable to interior slip, trip, and fall accidents. All premises listed may be applicable to exterior slip, trip, or fall accidents with the exception of doors, which may apply only to trip accidents.

TABLE 3

TYPES OF DANGEROUS CONDITIONS

| Type of Dangerous Condition | Examples |
| --- | --- |
| Natural Conditions | Snow |
|  | Slush |
|  | Water from rain |
|  | Ice |
|  | Leaves |
|  | Mud |
|  | Gravel/Stones |
|  | Sand |
|  | Dirt |
| Foreign Substances | Liquid: oil, water, soda |
|  | Solid: foods |
| Condition of Land | Hole |
|  | Crevice |
|  | Crack |
|  | Depression |
|  | Change in elevation |
|  | Steep surface |
|  | Obstruction |
| Condition of Structure | Inherently slippery surface |
|  | Crack |
|  | Crevice |
|  | Uneven surface |
|  | Floor covering |
|  | Change in elevation |
|  | Steep surface |
|  | Tread/riser defect |
|  | Waxed Flooring |
|  | Obstruction |
|  | Railing |

Determination of claimant status, breach of duty, causation, defenses, and bars may require the evaluation of one or more decision points. Examples of such decision points are show in flow charts in FIGS. 4 to 19. In some embodiments, one or more algorithms may be used to evaluate a decision point. The algorithms may also be represented by flow charts.

TABLE 2

RELATIONSHIP AND APPLICATION OF PREMISES TYPES

| Premises Type | Insured | | | Interior | | | Exterior | | |
| --- | --- | --- | --- | --- | --- | --- | --- | --- | --- |
|  | Res | Com | Public | Trip | Slip | Fall | Trip | Slip | Fall |
| Floor | X | X | X | X | X | X | X | X | X |
| Fixture | X | X | X | X | X | X | X | X | X |
| Stairs | X | X | X | X | X | X | X | X | X |
| Doors | X | X | X | X |  |  | X |  |  |
| Pool | X | X | X | X | X | X | X | X | X |
| Yard | X |  |  |  |  |  | X | X | X |
| Driveway | X | X | X |  |  |  | X | X | X |
| Deck | X | X | X |  |  |  | X | X | X |
| Parking lot |  | X | X |  |  |  | X | X | X |
| Sidewalk | X | X | X |  |  |  | X | X | X |
| Ramp | X | X | X | X | X | X | X | X | X |
| Landscaping | X | X | X |  |  |  | X | X | X |
| Unimproved Land | X | X | X |  |  |  | X | X | X |
| Parks/Rec Areas |  | X | X |  |  |  | X | X | X |

A dangerous condition on a premises may result in injury to a claimant. Table 3 list several types of dangerous conditions and examples of each that may exist on one or more premises listed in Table 1.

As described herein, characteristics of the accident may be obtained as answers to the investigative questions. In one embodiment, answers to investigative questions may be gathered by a claims adjuster at the accident scene and/or other locations. The answers may be entered in a data entry screen on a computer system. In some embodiments, the data entry screen may be tailored to the analyses shown in the flow charts in FIGS. 4 to 19. For instance, an entry may correspond to one or more of the decision points in the flow charts. The entry corresponding to the investigative question "Why was the injured person on the premises?" may be tailored to decision points 406 and 410 in FIG. 4, for example.

In certain embodiments, the data entry screen may be adapted to evaluating algorithms for decision points. For example, characteristics obtained from answers to a series of investigative questions relating to a dangerous condition (e.g., questions 9, 10, 12a, 12i, 12l, 12m of the Manson investigative questions) may be used in an algorithm for decision points 502 and 504 in FIG. 5.

In one embodiment, a method of determining claimant status for an accident may include providing to a computer system a set of characteristics for the accident. The characteristics of the accident may then be evaluated. The claimant status may be determined from the characteristics of the accident. After the characteristics of an accident have been provided (see point 302 of FIG. 3) the claimant status may be determined. FIG. 4 is a flow diagram illustrating the determination of claimant status according to one embodiment. Decision point 402 assesses whether the jurisdiction distinguishes between an invitee, a licensee, and a trespasser. If not, the claimant status may be general claimant, as shown in step 404.

Table 4 is a table of claimant status by state. A "Yes" next to a state in the table indicates that a state recognizes variations in claimant status (e.g., invitee, licensee, trespasser, etc.). A "No" next to a state in the table indicates that a state recognizes no variation in claimant status. Claimants in states with no variation may be referred to as "general claimants." In a state that does not recognize variations in claimant status, any entrant to a premises is owed the same duty of care. In one embodiment, general claimant status is equivalent to invitee status.

TABLE 4

CLAIMANT STATUS BY STATE

| State | Variation in Claimants |
| --- | --- |
| Alabama | Yes |
| Alaska | No |
| Arizona | No |
| Arkansas | Yes |
| California | No |
| Colorado | No |
| Connecticut | Yes |
| Delaware | No |
| Florida | Yes |
| Georgia | Yes |
| Hawaii | No |
| Idaho | Yes |
| Illinois | No |
| Indiana | Yes |
| Iowa | Yes |
| Kansas | Yes |
| Kentucky | Yes |
| Louisiana | No |
| Maine | No |
| Maryland | Yes |
| Massachusetts | No |
| Michigan | Yes |
| Minnesota | No |
| Mississippi | Yes |
| Missouri | Yes |
| Montana | Yes |

TABLE 4-continued

CLAIMANT STATUS BY STATE

| State | Variation in Claimants |
| --- | --- |
| Nebraska | Yes |
| Nevada | No |
| New Hampshire | No |
| New Jersey | Yes |
| New Mexico | Yes |
| New York | No |
| North Carolina | Yes |
| North Dakota | No |
| Ohio | Yes |
| Oklahoma | Yes |
| Oregon | Yes |
| Pennsylvania | Yes |
| Rhode Island | No |
| South Carolina | Yes |
| South Dakota | Yes |
| Tennessee | No |
| Texas | Yes |
| Utah | Yes |
| Vermont | Yes |
| Virginia | Yes |
| Washington | Yes |
| West Virginia | Yes |
| Wisconsin | No |
| Wyoming | No |

If the jurisdiction recognizes variations in claimant status, the claimant status may be determined. Decision point 406 assesses whether the claimant had express or implied permission to be on the premises. "Express permission" may refer to permission directly and distinctly stated or expressed rather than implied or left to inference. A claimant may have "implied permission" if the claimant believed he/she had permission to enter the premises and if the insured knew claimant was on the premises. If the claimant had neither express nor implied permission, then step 408 indicates that the claimant may be a trespasser.

The method may proceed to decision point 410 if the claimant had either express or implied permission. Decision point 410 assesses whether claimant was on the premises for the insured's benefit. If the answer to decision point 410 is yes, then the claimant status may be an invitee, as shown by step 412. If the answer to decision point 410 is no, the method may proceed to decision point 414 which assesses the insured type. If the insured type is public or commercial, decision point 416 assesses the purpose for which the claimant was on the premises. If the claimant was on the premises for the purpose for which premises is held open to the public, then the claimant may be an invitee, as indicated by step 418. If the claimant was not on the premises for the purpose for which premises is held open to the public, then the claimant may be a licensee, as indicated by step 420.

If the premises type at decision point 414 is residential, then decision point 422 assesses whether claimant was on premises for social, companionship, diversion, or enjoyment of hospitality. If the answer to decision point 422 is yes, then step 424 indicates that the claimant may be a social guest. If the claimant was not on the premises for social reasons, then decision point 426 assesses if the claimant was on the premises primarily for his or her for own benefit. If not, then the claimant may be an invitee, as indicated by decision point 428. If the claimant was on the premises primarily for his or her for own benefit, then the claimant may be a licensee, as indicated by step 430.

In one embodiment, a method of estimating premises liability may include determining duties owed by an insured to a claimant (see FIG. 3, point 306). The duties owed may be determined by claimant status. For example, a claimant status may be associated with one or more duties. Table 5 lists exemplary duties that may be owed by an insured to various claimants in two jurisdictions according to one embodiment.

TABLE 5

DUTIES OWED TO CLAIMANTS BY CLAIMANT STATUS IN TWO JURISDICTIONS

| Jurisdiction | Claimant Status | Duties owed by insured to claimant |
|---|---|---|
| Pennsylvania | Invitee | Exercise reasonable care in the maintenance of the premises for his safety. Warn the invitee of any dangerous conditions which are not open and obvious, and of which the possessor has knowledge. Make reasonable inspections of the premises and remedy any dangerous conditions which the inspection reveals. |
| Pennsylvania | Licensee and social guest | Exercise reasonable care in the maintenance of the premises for his safety. Warn the licensee of any dangerous conditions which are not open and obvious, and of which the possessor has knowledge. |
| Pennsylvania | Trespasser | Do not intentionally harm trespasser. |
| New York | All Parties: General Claimant | Exercise reasonable care in the maintenance of the premises for his safety. Warn the visitor of any dangerous conditions which are not open and obvious, and of which the possessor has knowledge. Make reasonable inspections of the premises and remedy any dangerous conditions which the inspection reveals. |

The duties owed by an insured to a given claimant may depend upon the jurisdiction. As shown in Table 4, some states do not recognize variations in claimant status. For example, Table 5 shows that Pennsylvania recognizes variations in claimant status, while New York does not. The duties owed to an invitee, a licensee, a social guest, and a trespasser in Pennsylvania are shown in Table 5. An insured owes an invitee three distinct duties that include maintenance of the premises, warning the invitee of dangerous conditions on the premises, and inspecting the premises. In New York, the insured owes the same duties that are owed to a Pennsylvania invitee to all entrants on a premises.

Generally, an insured may owe maintenance of the premises and warning of dangerous conditions on the premises to a licensee or social guest. The insured may owe no duty, however, to a licensee or social guest to inspect or fix the premises. In addition, the insured may only have a duty not to intentionally harm a trespasser. In some jurisdictions, duties to a trespasser vary. Criteria for what constitutes each of these duties may also vary between jurisdictions.

Table 6 includes a list of premises types categorized by frequency of accidents and amount of traffic according to one embodiment. Table 5 shows that an insured may have a duty to make reasonable inspections of a premises. In one embodiment, the categories in Table 6 may be used to evaluate the timely inspection frequency for a given premises. As used herein, a "timely inspection frequency" refers to the inspection frequency necessary to meet the standard of care of reasonable inspections indicated in Table 5. For example, the higher the traffic and the higher the frequency of accidents of a particular premises, the greater the timely inspection frequency for the premises. Thus, a grocery store produce department may be expected to have more frequent inspections than other departments within the same grocery store. Likewise, an office building or school may reasonably be expected to have less frequent inspections than a convenience store. In some jurisdictions there may be no requirement to inspect a private residence.

TABLE 6

PREMISES TYPES CATEGORIZED BY FREQUENCY OF ACCIDENTS AND AMOUNT OF TRAFFIC

| | High traffic | Moderate traffic | Low Traffic |
|---|---|---|---|
| High Frequency | Grocery: Fresh produce dept Restaurant: Fast food Restaurant: Other Restaurant: Food court/ Concession Convenience store | | |
| Moderate Frequency | Grocery: Other dept Discount store Mall: Common area Small retail/Service Department store Laundromat Hotel/Motel Hardware/Home improvement Airport Bus/Train terminal Theater | | |
| Low Frequency | Park | Office building Apartment building Condominium complex Recreational facility (health/fitness club; YMCA) Parking area/facility Church School | Private residence |

In one embodiment, each duty owed may be analyzed and compared to the standard of care exercised by the insured to determine whether or not there was a breach of duty. If the standard of care exercised by the insured is less than the standard of care required, there may be a breach of duty. In one embodiment, duties owed may be examined to determine whether or not they have been transferred by contract to a third party.

In one embodiment, a method of determining breach of duty in premises liability may include evaluating the characteristics of an accident that were provided to a computer system. The breach of duty may be determined from the evaluated characteristics.

Table 7 provides a summary of decision points that may be used for evaluating characteristics according to one embodiment. The decision points may be divided into three categories: those relating to the dangerous condition, those that relate to the insured, and those that relate to the claimant. In Table 7, actual notice and constructive notice refer to whether the insured had notice of the dangerous condition. Opportunity to warn or remedy refers to whether the insured had opportunity to warn the claimant of the dangerous condition or remedy the dangerous condition. Adequate warning refers to whether the insured provided adequate warning of the dangerous condition to the claimant. Remedied refers to whether the insured remedied the dangerous condition. Created to harm refers to whether the insured intentionally created the dangerous condition that harmed or injured the claimant. Knowledge of dangerous condition refers to whether the claimant had knowledge of the dangerous condition.

TABLE 7

SUMMARY OF DECISION POINTS FOR DETERMINING BREACH OF DUTY

| Type | Decision Point |
|---|---|
| Condition | Dangerous condition |
|  | Poses unreasonable risk of harm |
|  | Open and obvious |
| Insured | Actual notice |
|  | Constructive notice |
|  | Opportunity to warn or remedy |
|  | Adequate warning |
|  | Remedied |
|  | Created to harm |
| Claimant | Knowledge of dangerous condition |

FIG. 5 is a flow chart illustrating determination of breach of duty for an invitee according to one embodiment. Decision point 502 assesses whether there is a dangerous condition on the premises. If there was not, then there may be no breach, as indicated at step 503. If there was a dangerous condition, decision point 504 may assess whether the dangerous condition was open and obvious. If the dangerous condition was open and obvious, then there may be no breach, as indicated at step 506. If the dangerous condition was not open and obvious, then decision point 508 assesses whether the insured had actual notice of the dangerous condition. If the insured did not have actual notice, then decision point 510 assesses whether the insured had constructive notice. Step 512 indicates that there may be breach of duty if the insured had constructive notice. Step 514 indicates there may be no breach if there was no constructive notice. If the insured had actual notice of the dangerous condition at decision point 508, decision point 516 assesses whether the insured had opportunity to warn the claimant or remedy the dangerous condition. If there was no opportunity, then there may be no breach, as indicated by step 518. If there was an opportunity to warn or remedy, decision point 520 assesses if the dangerous condition was remedied. Step 522 indicates that there may be no breach if the dangerous condition was remedied. However, decision point 524 assesses if the insured provided an adequate warning to the claimant of the dangerous condition if the dangerous condition was not remedied. If an adequate warning was given, then there may be no breach, as indicated by step 526. Step 528 indicates that there may be a breach if an adequate warning was not given.

FIG. 6 is a flow chart illustrating determination of breach of duty for a licensee according to one embodiment. Decision point 602 assesses whether there was a dangerous condition and whether it posed an unreasonable risk of harm. Step 604 indicates that there may be no breach if the answer to decision point 602 is no. If there was a dangerous condition that posed an unreasonable risk of harm, then decision point 606 assesses if the dangerous condition was open and obvious. Step 608 indicates that there may be no breach if the dangerous condition was open and obvious. If the dangerous condition was not open and obvious, then decision point 610 assesses whether the licensee knew about the dangerous condition. If the licensee did know, then there may be no breach, as indicated by step 612. If the licensee did not know about the dangerous condition, then decision point 614 assesses if the insured had actual notice of the dangerous condition. If there was actual notice, then decision point 616 assesses if there was adequate warning to the licensee. If there was adequate warning, then there may be no breach, as indicated by step 620. Step 622 indicates that there may be a breach of duty if there was no adequate warning.

If there was no actual notice of the dangerous condition to the insured, then decision point 618 assesses if there was constructive notice of the dangerous condition to the insured. If there was, then there may be a breach, as step 624 indicates. Step 626 indicates that there may be no breach if there was no constructive notice of the dangerous condition to the insured.

FIG. 7 is a flow chart illustrating determination of breach of duty for a trespasser according to one embodiment. Decision point 702 assesses if there was a dangerous condition on the premises. If there was not, then there may be no breach as indicated by step 704. If there was a dangerous condition, then decision point 706 may ask if the dangerous condition was created to harm. If the answer is yes, there may be a breach, as indicated by step 708. Step 710 indicates that there may be no breach if the dangerous condition was not created to harm.

Table 8 includes investigative questions relating to characteristics of an accident for determining breach of duty in a floor slip, trip, or fall accident according to one embodiment. The columns in Table 8 correspond to the decision points of FIGS. 5, 6, and 7. Table 8 includes general questions about the accident and accident scene. An "X" in a column indicates that the answer to that investigative question may be useful for evaluating the decision point corresponding to that column. Table 8 also includes investigative questions specific to dangerous conditions that may have caused the accident. For example, Table 8 includes investigative questions relating to water or liquid, a foreign object, or a structural defect that may have been on the floor. Table 8 also includes investigative questions relating to an accident in a store.

TABLE 8

INVESTIGATIVE QUESTIONS ABOUT CHARACTERISTICS FOR DETERMINING BREACH OF DUTY FOR A FOR A FLOOR SLIP, TRIP, OR FALL ACCIDENT

| | Decision Point | | | | | | | | | |
|---|---|---|---|---|---|---|---|---|---|---|
| Questions | Dangerous condition | Poses unreasonable risk of harm | Condition Open & Obvious | Actual Notice | Constructive Notice | Opportunity to warn or remedy | Knowledge of dangerous condition | Remedied | Adequate Warning | Created To Harm |
| General- | | | | | | | | | | |
| Exact location of accident on premises | X | X | X | X | X | | | | | |

TABLE 8-continued

INVESTIGATIVE QUESTIONS ABOUT CHARACTERISTICS FOR DETERMINING BREACH OF DUTY FOR A FOR A FLOOR SLIP, TRIP, OR FALL ACCIDENT

| Questions | Dangerous condition | Poses unreasonable risk of harm | Condition Open & Obvious | Actual Notice | Con-structive Notice | Opportunity to warn or remedy | Knowledge of dangerous condition | Remedied | Adequate Warning | Created To Harm |
|---|---|---|---|---|---|---|---|---|---|---|
| Condition complained of | X | X | X | X | | X | X | | | |
| Type of flooring involved | X | X | X | X | | | | | | |
| Is area inspected regularly | | | | | X | | | | | |
| Cause of the condition | X | X | X | X | | | | X | X | X |
| Where was claimant looking prior to fall | | | X | | | X | X | | | |
| Was claimant talking to anyone | | | X | | | X | X | | | |
| Was claimant carrying anything | | | X | | | X | X | | | |
| Was claimant in a hurry | | | X | | | X | X | | | |
| Was claimant walking or running | | | X | | | X | X | | | |
| What is claimant alleging is cause of accident | X | X | X | | | | | | | X |
| Water or Liquid | | | | | | | | | | |
| Liquid consistency | X | X | X | X | | | | | X | |
| How did it get there | X | X | X | X | | | | | X | X |
| Was weather a factor | X | X | X | X | | | X | | X | X |
| Was water tracked inside | X | X | X | X | | | X | | X | X |
| Were storm mats in place | X | X | X | X | | | | | X | |
| Did liquid come from other than insured | X | X | X | X | | | | | X | X |
| How long had liquid been there | X | X | X | X | X | X | | | X | X |
| Dimensions of puddle | X | X | X | X | X | | | | X | |
| Any warning signs or barriers | X | X | X | X | X | X | X | X | X | X |
| Were steps taken to clean before incident | X | X | X | X | X | X | | X | X | X |
| Was area well lit | X | X | X | X | X | | | | X | X |
| Was liquid clearly visible | X | X | X | X | X | X | X | | X | X |
| Foreign Object | | | | | | | | | | |
| Size and consistency | X | X | X | X | X | | | | X | X |
| Describe location of item | X | X | X | X | X | | | | X | X |
| Anyone aware of foreign object | X | X | X | X | X | X | X | | X | X |
| How long had object been there | X | X | X | X | X | | | X | X | X |
| Any steps taken to eliminate dangerous condition | X | X | X | X | X | | | X | X | X |
| Any warning signs or barriers | X | X | X | X | X | X | X | X | X | X |
| Store | | | | | | | | | | |
| Is Substance natural to insured's business | X | X | X | X | X | X | X | | X | X |
| What is store's procedure about cleaning | X | X | X | X | X | | | X | X | X |
| When was last inspection and who inspected | X | X | X | X | X | X | | X | X | X |
| Waxed Floor | | | | | | | | | | |
| When waxed | X | X | X | X | X | | | | X | X |
| Waxed by whom | X | X | X | X | X | | | | X | X |

TABLE 8-continued

INVESTIGATIVE QUESTIONS ABOUT CHARACTERISTICS FOR DETERMINING BREACH OF DUTY FOR A FOR A FLOOR SLIP, TRIP, OR FALL ACCIDENT

| Questions | Dangerous condition | Poses unreasonable risk of harm | Condition Open & Obvious | Actual Notice | Constructive Notice | Opportunity to warn or remedy | Knowledge of dangerous condition | Remedied | Adequate Warning | Created To Harm |
|---|---|---|---|---|---|---|---|---|---|---|
| Waxed with what product | X | X | X | X | X | | | | X | |
| Applied according to manufacturer's instructions | X | X | X | X | X | | | X | X | X |
| Structural Defect | | | | | | | | | | |
| Composition of floor | X | X | X | X | X | X | | | X | |
| Surface level or sloped | X | X | X | X | X | X | | | X | |
| If sloped, how much | X | X | X | X | X | | | | X | |
| Was floor smooth, rough, or depressed | X | X | X | X | X | | | | X | |
| What were measurements of defect | X | X | X | X | X | | X | | X | |
| Was defect visible | X | X | X | X | X | | X | | X | X |
| Floor sagging or broken | X | X | X | X | X | | | | X | |
| How long has defect been there | | | | X | X | X | | | X | X |
| Was insured aware of defect | | | | X | X | X | | X | X | X |
| Was claimant aware of defect | | | X | | | X | X | | X | X |
| Had steps been taken to alleviate defect | | | | X | X | | | X | X | X |

Table 9 includes investigative questions about characteristics for determining breach of duty in a stairway slip, trip, or fall accident according to one embodiment. The columns in Table 9 correspond to the decision points of FIGS. 5, 6, and 7. An "X" in a column indicates that the answer to that investigative question may be useful for evaluating the decision point corresponding to that column.

TABLE 9

INVESTIGATIVE QUESTIONS ABOUT CHARACTERISTICS FOR DETERMINING BREACH OF DUTY FOR A STAIRWAY SLIP, TRIP, OR FALL ACCIDENT

| Questions | Dangerous condition | Poses unreasonable risk of harm | Condition Open & Obvious | Actual Notice | Constructive Notice | Opportunity to warn or remedy | Knowledge of dangerous condition | Remedied | Adequate Warning | Created To Harm |
|---|---|---|---|---|---|---|---|---|---|---|
| Describe Stairway | X | X | X | X | X | X | X | | | |
| Any defect on steps-describe | X | X | X | X | X | X | X | | X | X |
| Handrails | X | X | X | | | X | X | | | |
| Was stairway steep, straight, or curved | X | X | X | X | X | X | X | | X | X |
| Describe lighting-natural, artificial, adequacy | X | X | X | X | X | X | X | | X | X |
| Were there any obstructions on stair-describe | X | X | X | X | X | X | X | | X | X |
| How long has obstruction existed | | | | X | X | X | | | X | X |
| Any steps to eliminate obstruction | | | | | X | X | | X | X | X |
| Claimant familiar with premises | | | X | | | X | X | | X | |

TABLE 9-continued

INVESTIGATIVE QUESTIONS ABOUT CHARACTERISTICS FOR DETERMINING BREACH OF DUTY FOR A STAIRWAY SLIP, TRIP, OR FALL ACCIDENT

| Questions | Dangerous condition | Poses unreasonable risk of harm | Condition Open & Obvious | Actual Notice | Constructive Notice | Opportunity to warn or remedy | Knowledge of dangerous condition | Remedied | Adequate Warning | Created To Harm |
|---|---|---|---|---|---|---|---|---|---|---|
| Obtain details if weather a factor | | | | | X | X | X | | X | |
| Was light on | X | X | X | X | X | X | X | | X | X |
| Where looking prior to fall | | | X | | | X | X | | | |
| Talking to anyone just prior to fall | | | X | | | X | X | | | |
| Does claimant wear glasses-wearing at time | | | | | | X | X | | | |

Table 10 includes investigative questions about characteristics for determining breach of duty in a sidewalk slip, trip, or fall accident according to one embodiment. The columns in Table 10 correspond to the decision points of FIGS. 5, 6, and 7. An "X" in a column indicates that the answer to that investigative question may be useful for evaluating the decision point corresponding to that column. Table 10 includes general investigative questions about the accident and accident scene and specific investigative questions concerning the condition of the sidewalk. For example, Table 10 includes investigative questions relating to ice and snow that may have been on the sidewalk.

TABLE 10

INVESTIGATIVE QUESTIONS ABOUT CHARACTERISTICS FOR DETERMINING BREACH OF DUTY FOR A SIDEWALK SLIP, TRIP, OR FALL ACCIDENT

| Questions | Dangerous condition | Poses unreasonable risk of harm | Condition Open & Obvious | Actual Notice | Constructive Notice | Opportunity to warn or remedy | Knowledge of dangerous condition | Remedied | Adequate Warning | Created To Harm |
|---|---|---|---|---|---|---|---|---|---|---|
| General- | | | | | | | | | | |
| Where is sidewalk in question | X | X | X | | X | X | X | | | |
| What is composition of sidewalk | X | X | X | X | X | X | X | | X | |
| General condition of sidewalk-defects | X | X | X | X | X | X | X | | X | X |
| Describe slope of sidewalk | X | X | X | X | X | X | X | | X | X |
| Ice | | | | | | | | | | |
| Where did water come from | | | X | X | X | X | X | | X | X |
| How long did insured know of leak | | | | X | X | X | | | X | X |
| Snow | | | | | | | | | | |
| When did snow start and stop | X | X | | X | X | X | X | | X | |
| Depth of snow | X | X | X | X | X | X | X | | X | |
| Consistency of snow | X | X | X | X | X | X | X | | X | |
| Did snow cover ice | X | X | X | X | X | X | X | | X | |
| Was entire sidewalk covered | X | X | X | X | X | X | X | | X | |
| Was sidewalk cleaned | X | X | X | X | X | X | X | | X | X |
| Cleaned by whom/when | X | X | X | X | X | X | X | | X | |
| Describe how cleaned | X | X | X | | X | | | | X | X |
| How was snow piled | X | X | X | X | X | X | X | | X | X |

In one embodiment, a method of determining causation of a breach of duty by an insured may include providing to a- computer system a set of characteristics relating to the accident. The method may include determining whether the breach of duty was both a cause in fact and a proximate cause of a claimant's harm from at least one of the characteristics.

Figure 8A:
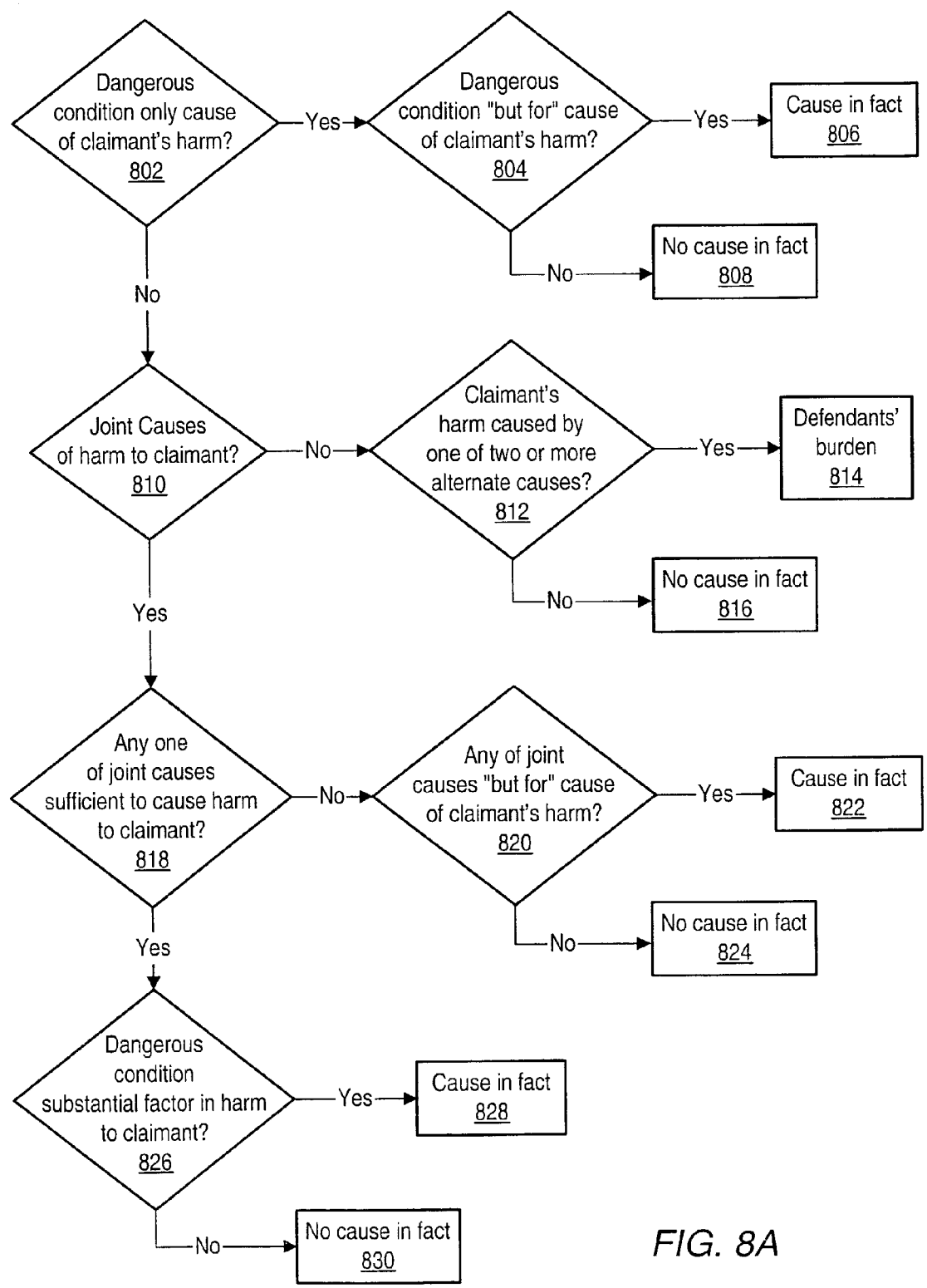
FIG. 8a is a flow chart illustrating the determination of cause in fact according to one embodiment.

In certain embodiments, cause in fact may be determined by one or more decision points that evaluate at least one of the characteristics. Cause in fact may be associated with one or more combinations of answers to the one or more decision points. FIG. 8A is a flow chart illustrating the determination of cause in fact according to one embodiment. Decision point 802 is an assessment of whether the dangerous condition was the only cause of claimant's harm. If it was, then the "but for" test is applied at decision point 804. The "but for" test determines whether a dangerous condition may be considered a cause in fact of the claimant's harm by asking if the harm would not have occurred but for the dangerous condition. If the assessment at decision point 804 is yes, then the dangerous condition may be a cause in fact of the claimant's harm, as indicated by step 806. Step 808 indicates that the dangerous condition may not be a cause in fact of the claimant's harm when the "but for" test fails at decision point 804.

In one embodiment, there may be causes in addition to the dangerous condition that may have caused the claimant's harm. If the dangerous condition is not the only cause of the claimant's harm, the there may be joint or alternate causes. As used herein, the term "joint causes" refers to causes that may combine or concur to bring about the claimant's harm. None of the joint causes standing alone may be sufficient to cause the claimant's harm. Alternatively, any of the joint causes alone may be sufficient to cause the claimant's harm. As used herein, the term "alternate causes" refers to causes that do not combine to cause the claimant's harm. Any one of two or more alternate causes may have been sufficient to cause the claimant's harm. Generally, it is uncertain which of the alternate causes may be the cause in fact of the claimant's harm.

Decision point 810 in FIG. 8A assesses whether there may be joint causes that combine to bring about the claimant's harm. If not, then decision point 812 assesses whether claimant's harm may be caused by one of two or more alternate causes. If decision point 812 is positive, then the burden of proof shifts to the defendants, i.e., the insured and the other defendants responsible for the other alternate causes, as indicated by step 814. Each of the defendants may be required to show that their respective causes are not the cause in fact of the claimant's harm. In an embodiment of a computer-implemented method of assessing liability, a computer system may provide an output indicating that a negotiated agreement may be desirable if the method reaches step 814. None of the alternate causes may be a cause in fact if decision point 812 is negative, as indicated by step 816.

If there are joint causes of harm to the claimant, then decision point 818 assesses whether any one of the joint causes may have been sufficient to cause harm to the claimant. If not, decision point 820 assesses whether any of the joint causes is a "but for" cause of the claimant's harm. If decision point 820 identifies any of the joint causes as "but for" causes of the claimant's harm, then cause in fact may be established with regard to those joint causes, as indicated by step 822. Step 824 indicates that none of the joint causes may be the cause in fact if none of the joint causes is a "but for" cause.

At decision point 818, if any one of the joint causes may be sufficient to cause harm to the claimant, then decision point 826 may apply the "substantial factor test." The "substantial factor test" may assess whether the dangerous condition is a substantial factor in causing the claimant's harm. Step 828 indicates that if the dangerous condition was a substantial factor, then the dangerous condition may be a cause in fact. If the dangerous condition was not a substantial factor, then step 830 indicates that the dangerous condition may not be a cause in fact.

In an alternative embodiment, an expert claims adjuster may determine cause in fact from an evaluation of the facts and circumstances of the accident.

Table 11 includes investigative questions relating to characteristics of an accident for determining cause in fact in a floor slip, trip, or fall accident according to one embodiment. The columns in Table 11 correspond to decision points in FIG. 8a. An "X" in a column indicates that the answer to that investigative question may be useful for evaluating the decision point corresponding to that column. Table 11 includes general investigative questions about the accident and accident scene. Table 11 also includes investigative questions specific to dangerous conditions that may have caused the accident. For example, Table 11 includes investigative questions relating to water or liquid, foreign object, or structural defect that may have been on the floor. Table 11 also includes investigative questions relating to a slip, trip, or fall accident in a store.

TABLE 11

INVESTIGATIVE QUESTIONS ABOUT CHARACTERISTICS FOR DETERMINING CAUSE IN FACT FOR A FLOOR SLIP, TRIP, OR FALL ACCIDENT

| | Decision Points | | | | | | |
|---|---|---|---|---|---|---|---|
| Questions | Dangerous condition only cause of claimant's harm | Dangerous condition but for cause of claimant's harm | Joint causes of harm to claimant | Claimant's harm caused by at least one alternate cause | Any one of joint causes sufficient to cause harm to claimant | Any of joint causes but for cause of claimant's harm | Dangerous condition substantial factor in harm to claimant |
| General- | | | | | | | |
| Exact location of accident on premises | X | X | X | | | | |
| Condition complained of | X | X | X | | | | |
| Cause of the condition | X | | X | X | | | |

TABLE 11-continued

INVESTIGATIVE QUESTIONS ABOUT CHARACTERISTICS FOR
DETERMINING CAUSE IN FACT FOR A FLOOR SLIP, TRIP, OR FALL ACCIDENT

| Questions | Dangerous condition only cause of claimant's harm | Dangerous condition but for cause of claimant's harm | Joint causes of harm to claimant | Claimant's harm caused by at least one alternate cause | Any one of joint causes sufficient to cause harm to claimant | Any of joint causes but for cause of claimant's harm | Dangerous condition substantial factor in harm to claimant |
|---|---|---|---|---|---|---|---|
| Where was claimant looking prior to fall | X | X | X | X | | | X |
| Was claimant talking to anyone | X | | X | X | | | |
| Was claimant carrying anything | X | X | X | X | X | X | X |
| Was claimant in a hurry | X | X | X | X | X | X | X |
| Was claimant walking or running | X | X | X | X | X | X | X |
| Water or Liquid | | | | | | | |
| How did it get there | X | | X | | | | |
| Was weather a factor | X | | X | X | | | |
| Was water tracked inside | X | | X | X | | | |
| Were storm mats in place | X | | X | X | | | |
| Did liquid come from other than insured | X | | X | X | | | |
| How long had liquid been there | X | X | | | | | |
| Dimensions of puddle | | X | | | X | X | X |
| Was area well lit | | | X | X | | | |
| Was liquid clearly visible | | X | | | | | |
| Foreign Object | | | | | | | |
| Size and consistency | | X | | | X | | X |
| Describe location of item | X | X | | | | | |
| Store | | | | | | | |
| When was last inspection and who inspected | X | | X | X | | | |
| Waxed Floor | | | | | | | |
| Waxed by whom | X | | X | X | | | |
| Waxed with what product | X | X | X | X | X | X | X |
| Applied according to manufacturer's instructions | X | X | X | X | X | X | X |
| Structural Defect | | | | | | | |
| Composition of floor | X | X | X | X | | | |
| Surface level or sloped | X | X | X | X | | | X |
| If sloped, how much | X | X | X | X | | | X |
| Was floor smooth, rough, or depressed | | X | | | | | |
| What were measurements of defect | X | X | | | | | |
| Was defect visible | X | | X | X | | | |
| Floor sagging or broken | | X | | | | | |
| Was claimant aware of defect | X | | | X | X | | |
| Had steps been taken to alleviate defect | X | | X | X | | | |

Table 12 includes investigative questions about characteristics for determining cause in fact in a stairway slip, trip, or fall accident according to one embodiment. The columns in Table 12 correspond to decision points in FIG. 8A. An "X" in a column indicates that the answer to that investigative question may be useful for evaluating the decision point corresponding to that column.

TABLE 12

INVESTIGATIVE QUESTIONS ABOUT CHARACTERISTICS FOR DETERMINING CAUSE IN FACT FOR A STAIRWAY SLIP, TRIP, OR FALL ACCIDENT

| Questions | Dangerous condition only cause of claimant's harm | Dangerous condition but for cause of claimant's harm | Joint causes of harm to claimant | Claimant's harm caused by at least one alternate cause | Any one of joint causes sufficient to cause harm to claimant | Any of joint causes but for cause of claimant's harm | Dangerous condition substantial factor in harm to claimant |
|---|---|---|---|---|---|---|---|
| Describe Stairway | | X | X | X | | | |
| Any defect on steps-describe | | X | | | | | |
| Handrails | | X | X | X | | | |
| Was stairway steep, straight or curved | | X | X | X | | | |
| Describe lighting-natural, artificial, adequacy | X | X | X | X | | | |
| Were there any obstructions on stair-describe | X | X | X | X | X | X | X |
| Obtain details if weather a factor | X | | X | X | | | |
| Was light on | X | X | X | X | | | |
| Where looking prior to fall | X | | X | X | | | |
| Talking to anyone just prior to fall | X | | X | X | | | |
| Does claimant wear glasses-wearing at time | X | | X | X | | | |

Table 13 includes investigative questions about characteristics for determining cause in fact in a sidewalk slip, trip, or fall accident according to one embodiment. The columns in Table 13 correspond to decision points in FIG. 8A. An "X" in a column indicates that an investigative question may be useful for evaluating the decision point corresponding to that column. Table 13 includes general investigative questions about the accident and accident scene and specific investigative questions concerning the condition of the sidewalk. For example, Table 13 includes investigative questions relating to ice and snow that may have been on the sidewalk.

TABLE 13

INVESTIGATIVE QUESTIONS ABOUT CHARACTERISTICS FOR DETERMINING CAUSE IN FACT FOR A SIDEWALK SLIP, TRIP, OR FALL ACCIDENT

| Questions | Dangerous condition only cause of claimant's harm | Dangerous condition but for cause of claimant's harm | Joint causes of harm to claimant | Claimant's harm caused by at least one alternate cause | Any one of joint causes sufficient to cause harm to claimant | Any of joint causes but for cause of claimant's harm | Dangerous condition substantial factor in harm to claimant |
|---|---|---|---|---|---|---|---|
| General- | | | | | | | |
| Where is sidewalk in question | X | | X | X | | | |
| What is composition of sidewalk | X | X | X | X | | | |
| General condition of sidewalk-defects | X | | X | X | | | |
| Describe slope of sidewalk | X | X | X | X | | | X |

TABLE 13-continued

INVESTIGATIVE QUESTIONS ABOUT CHARACTERISTICS FOR DETERMINING CAUSE IN FACT FOR A SIDEWALK SLIP, TRIP, OR FALL ACCIDENT

| | Decision Points | | | | | | |
|---|---|---|---|---|---|---|---|
| Questions | Dangerous condition only cause of claimant's harm | Dangerous condition but for cause of claimant's harm | Joint causes of harm to claimant | Claimant's harm caused by at least one alternate cause | Any one of joint causes sufficient to cause harm to claimant | Any of joint causes but for cause of claimant's harm | Dangerous condition substantial factor in harm to claimant |
| Ice | | | | | | | |
| Where did water come from | X | | X | X | | | |
| How long did insured know of leak | X | X | | | | | |
| Snow | | | | | | | |
| When did snow start and stop | X | | X | X | | | |
| Depth of snow | | X | | | | | |
| Consistency of snow | | X | | | | | |
| Did snow cover ice | X | X | X | X | | | |
| Was entire sidewalk covered | | X | | | | | |
| Cleaned by whom/when | X | | X | X | | | |
| Describe how cleaned | X | | X | X | | | |
| How was snow piled | X | | X | X | | | |

Generally, the acts and/or omissions of an insured may be a proximate cause for all harmful results that are the normal incidents of and within the increased risk caused by the insured's acts and/or omissions. The test for proximate cause may be based on foreseeability. As used herein, the term "foreseeability" refers to the reasonable anticipation of the possible results of an action or condition. For example, foreseeability in premises liability may be the reasonable anticipation of the harm to a claimant resulting from a dangerous condition on a premises.

Figure 8B:
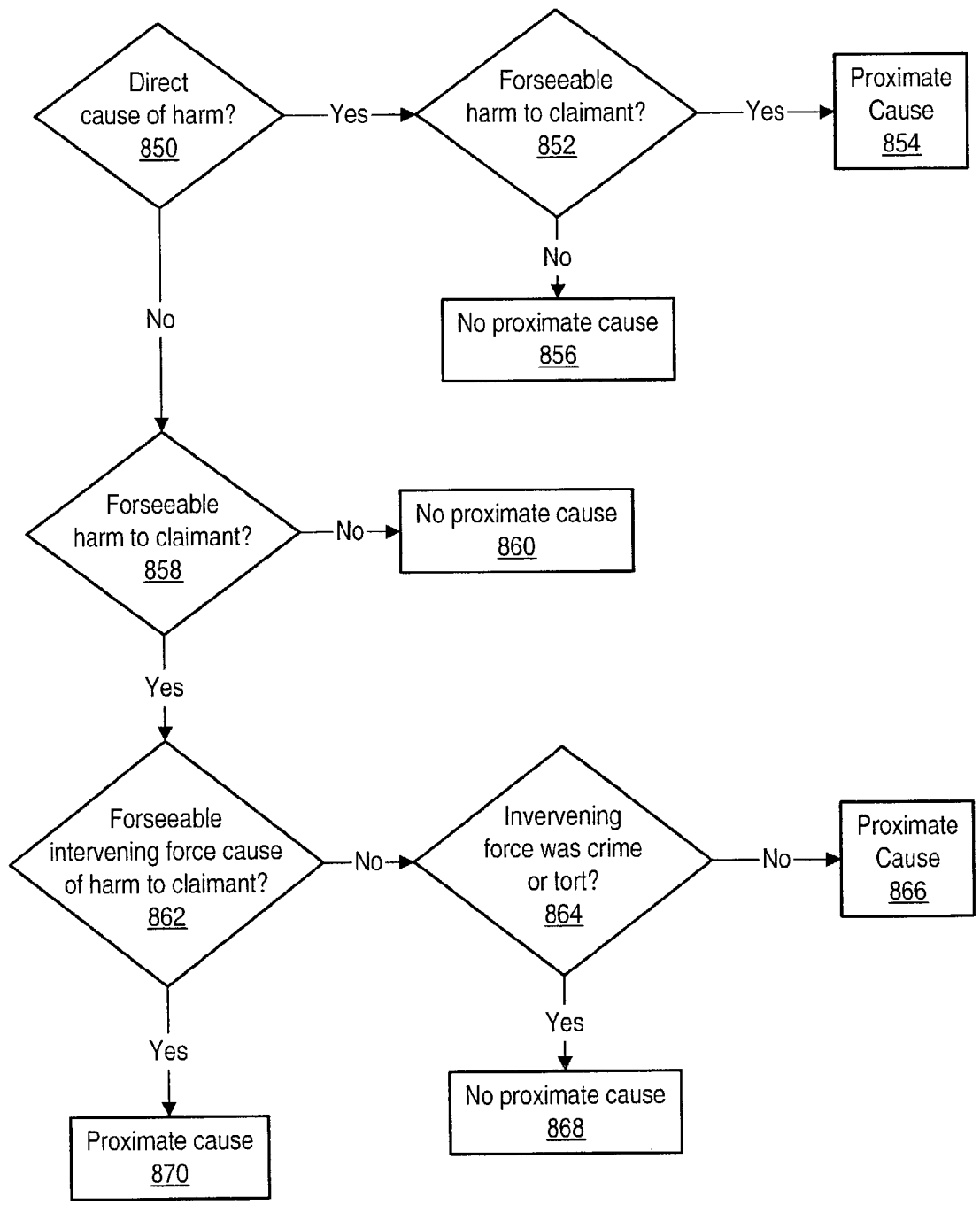
FIG. 8b is a flow chart illustrating the determination of proximate cause according to one embodiment.

In certain embodiments, proximate cause may be determined from one or more decision points by evaluating at least one of the characteristics of the accident. The proximate cause may be associated with one or more combinations of answers to the one or more decision points. FIG. 8B is a flow chart illustrating the determination of proximate cause in premises liability according to one embodiment. Decision point 850 assesses whether the dangerous condition on the insured's premises was a "direct cause" of the claimant's harm. As used herein, a "direct cause" case refers to one in which the facts may present an uninterrupted chain of events from the time of acts or omissions of the insured that may be negligent to the time of the claimant's harm. In a direct cause case, there is no intervening force. As used herein, the term "intervening force" refers to an event that occurs between the acts or omissions of the insured that may be negligent and the claimant's harm. If the answer to decision point 850 is yes, then decision point 852 assesses whether the claimant's harm was foreseeable. Step 854 indicates that proximate cause may exist if the harm was foreseeable. If a harmful result was at all foreseeable from the dangerous condition, the unusual manner in which the claimant's harm occurred or the unusual timing of cause and effect may not be relevant to assessing proximate cause. Alternatively, if the harmful results were unforeseeable, then step 856 indicates that there may be no proximate cause. An unforeseeable harmful result may be an entirely different type of harm that would be expected to result from the dangerous condition.

If the answer at decision point 850 is no, then the dangerous condition may be an indirect cause of claimant's harm. As used herein, an "indirect cause" case is one in which the facts indicate that a harmful force may have come into motion after the time of the acts or omissions of an insured that may be negligent. The harmful force may have then combined with the acts or omissions of the insured to cause injury to the claimant. Such a harmful force may be referred to as an intervening force. Decision point 858 assesses whether there was foreseeable harm to the claimant. If there was not, then there may be no proximate cause, as indicated by step 860. Generally, intervening forces that produce unforeseeable harm may be considered unforeseeable or superseding. As used herein, a "superseding force" is defined as a force that may break the causal connection between the acts or omissions of the insured that may be negligent and the claimant's harm. The superseding force may become the direct immediate cause of the claimant's harm. In addition, there may still be no proximate cause even for foreseeable intervening forces that produce unforeseeable harm.

If the harm to the claimant is assessed to be foreseeable at decision point 858, the foreseeability of the intervening force is assessed at decision point 862. Step 870 indicates that there may be proximate cause if the answer to decision point 862 is yes. If the intervening force was unforeseeable, then decision point 864 assesses whether the intervening force was a crime or tort. If not, then there may be proximate cause, as indicated by step 866. Step 868 indicates that there may be no proximate cause if the intervening force was a crime or tort.

In an alternative embodiment, an expert claims adjuster may determine cause in fact and/or proximate cause from an evaluation of the facts and circumstances of the accident.

Table 14 includes investigative questions relating to characteristics of an accident for determining proximate cause in a floor slip, trip, or fall accident according to one embodiment. The columns in Table 14 correspond to decision points in FIG. 8B. An "X" in a column indicates that the answer to that question may be useful for evaluating the decision point corresponding to that column. Table 14 includes general investigative questions about the accident and accident scene. Table 14 also includes investigative questions specific to dangerous conditions that may have caused the slip, trip, or fall accident. For example, Table 14 includes investigative questions relating to water or liquid, foreign objects, or structural defects that may have been on the floor. Table 14 also includes investigative questions relating to a slip, trip, or fall accident in a store.

TABLE 14

INVESTIGATIVE QUESTIONS ABOUT CHARACTERISTICS FOR DETERMINING PROXIMATE CAUSE FOR A FLOOR SLIP, TRIP, OR FALL ACCIDENT

| Questions | Decision Points | | | |
|---|---|---|---|---|
| | Direct cause of harm | Foreseeable harm to claimant | Foreseeable intervening force cause of harm to claimant | Intervening force was crime or tort |
| General- | | | | |
| Exact location of accident on premises | X | X | X | |
| Condition complained of | X | X | | |
| Type of flooring involved | X | X | X | |
| Cause of the condition | X | X | X | X |
| Where was claimant looking prior to fall | X | X | | |
| Was claimant talking to anyone | X | | | |
| Was claimant carrying anything | X | | | |
| Was claimant in a hurry | X | X | | |
| Was claimant walking or running | X | X | X | |
| What is claimant alleging is cause of fall | X | | X | X |
| Water or Liquid | | | | |
| Liquid consistency | X | X | X | |
| How did it get there | X | X | X | |
| Was weather a factor | X | X | X | |
| Was water tracked inside | X | X | X | |
| Were storm mats in place | X | X | X | |
| Did liquid come from other than insured | X | X | X | |
| How long had liquid been there | X | | | |
| Dimensions of puddle | X | | | |
| Any warning signs or barriers | X | X | X | |
| Were steps taken to clean before incident | X | | X | |
| Was area well lit | X | X | X | |
| Was liquid clearly visible | X | | X | |
| Foreign Object | | | | |
| Size and consistency | X | X | | |
| Describe location of item | X | X | | |
| Any steps taken to eliminate dangerous condition | X | X | X | |
| Any warning signs or barriers | X | X | X | |
| Store | | | | |
| Is Substance natural to insured's business | X | X | X | X |

TABLE 14-continued

INVESTIGATIVE QUESTIONS ABOUT CHARACTERISTICS FOR DETERMINING PROXIMATE CAUSE FOR A FLOOR SLIP, TRIP, OR FALL ACCIDENT

| Questions | Decision Points | | | |
|---|---|---|---|---|
| | Direct cause of harm | Foreseeable harm to claimant | Foreseeable intervening force cause of harm to claimant | Intervening force was crime or tort |
| What is store's procedure about cleaning | X | | | |
| When was last inspection and who inspected | X | | X | X |
| Waxed Floor | | | | |
| When waxed | X | X | | |
| Waxed by whom | | | X | X |
| Waxed with what product | X | | X | X |
| Applied according to manufacturer's instructions | X | | X | X |
| Structural Defect | | | | |
| Composition of floor | X | X | | |
| Surface level or sloped | X | X | | |
| If sloped, how much | X | X | | |
| Was floor smooth, rough or depressed | X | X | | |
| What were measurements of defect | X | X | X | |
| Was defect visible | X | X | X | X |
| Floor sagging or broken | X | X | X | X |
| Was claimant aware of defect | X | | X | |
| Had steps been taken to alleviate defect | X | | X | X |

Table 15 includes investigative questions about characteristics for determining proximate cause in a stairway accident according to one embodiment. The columns in Table 15 correspond to decision points in FIG. 8B. An "X" in a column indicates that the answer to that investigative question may be useful for evaluating the decision point corresponding to that column.

TABLE 15

INVESTIGATIVE QUESTIONS ABOUT CHARACTERISTICS FOR DETERMINING PROXIMATE CAUSE FOR A STAIRWAY SLIP, TRIP, OR FALL ACCIDENT

| Questions | Decision Points | | | |
|---|---|---|---|---|
| | Direct cause of harm | Foreseeable harm to claimant | Foreseeable intervening force cause of harm to claimant | Intervening force was crime or tort |
| Describe Stairway | X | X | X | |
| Any defect on steps-describe | X | X | | |
| Handrails | X | X | | |
| Was stairway steep, straight, or curved | X | X | | |
| Describe lighting-natural, artificial, adequacy | X | X | X | |
| Were there any | X | X | X | |

TABLE 15-continued

INVESTIGATIVE QUESTIONS ABOUT CHARACTERISTICS
FOR DETERMINING PROXIMATE CAUSE FOR A STAIRWAY
SLIP, TRIP, OR FALL ACCIDENT

| | Decision Points | | | |
|---|---|---|---|---|
| Questions | Direct cause of harm | Foreseeable harm to claimant | Foreseeable intervening force cause of harm to claimant | Intervening force was crime or tort |
| obstructions on stair-describe | | | | |
| Any steps to eliminate obstruction | X | | X | X |
| Claimant familiar with premises | X | | X | |
| Obtain details if weather a factor | X | X | X | |
| Was light on | X | X | X | |
| Where looking prior to fall | X | | X | |
| Talking to anyone just prior to fall | X | | X | |
| Does claimant wear glasses-wearing at time | X | | X | |

Table 16 includes investigative questions about characteristics for determining proximate cause in a sidewalk slip, trip, or fall accident according to one embodiment. The columns in Table 16 correspond to decision points in FIG. 8B. An "X" in a column indicates that the answer to that investigative question may be useful for evaluating the decision point corresponding to that column. Table 16 includes general investigative questions about the accident and accident scene and specific investigative questions concerning the condition of the sidewalk. For example, Table 16 includes investigative questions relating to ice and snow that may have been on the sidewalk.

TABLE 16

INVESTIGATIVE QUESTIONS ABOUT CHARACTERISTICS
FOR DETERMINING PROXIMATE CAUSE FOR A SIDEWALK
SLIP, TRIP, OR FALL ACCIDENT

| | Decision Points | | | |
|---|---|---|---|---|
| Questions | Direct cause of harm | Foreseeable harm to claimant | Foreseeable intervening force cause of harm to claimant | Intervening force was crime or tort |
| General- | | | | |
| Where is sidewalk in question | X | X | X | |
| What is composition of sidewalk | X | X | X | |
| General condition of sidewalk-defects | X | X | | |
| Describe slope of sidewalk | X | X | | |
| Ice | | | | |
| Where did water come from | X | X | X | X |
| How long did insured know of leak | | X | | |

TABLE 16-continued

INVESTIGATIVE QUESTIONS ABOUT CHARACTERISTICS
FOR DETERMINING PROXIMATE CAUSE FOR A SIDEWALK
SLIP, TRIP, OR FALL ACCIDENT

| | Decision Points | | | |
|---|---|---|---|---|
| Questions | Direct cause of harm | Foreseeable harm to claimant | Foreseeable intervening force cause of harm to claimant | Intervening force was crime or tort |
| Snow | | | | |
| When did snow start and stop | X | X | X | |
| Depth of snow | X | | | |
| Did snow cover ice | X | X | | |
| Was entire sidewalk covered | X | | | |
| Was sidewalk cleaned | X | | | |
| Cleaned by whom/when | X | | X | |
| Describe how cleaned | X | X | X | |
| How was snow piled | X | X | X | |

In one embodiment, the liability assessed to the insured when the conditions of negligence are met may be 100%. Alternatively, the liability to the insured may be assessed at less than 100%. In an embodiment, assignment of a portion of liability to the claimant may be based on the manner in which duty was breached. For example, FIG. 5 shows that breach of duty to an invitee may be found when there is either actual notice or constructive notice of the dangerous condition to the insured. Therefore, a portion of the liability may be assigned to the claimant when there is constructive notice rather than actual notice.

In one embodiment, a method of estimating a contribution of a defense to premises liability may include providing to a computer system a set of characteristics relating to an accident. The contribution of the defense may be determined from the characteristics of the accident. One or more decision points may be used to evaluate at least one of the characteristics. An estimate of an effect on liability may be associated with one or more combinations of answers to the decision points. The effect on liability of the defense may be determined from the answers to the decision points.

Table 17 lists defenses according to one embodiment. One or more defenses may be applied to shift liability from the insured to the claimant if the claimant is found to be negligent for a condition or action on a premises.

TABLE 17

DEFENSES TO NEGLIGENCE

| Defenses | Alcohol or drug use |
|---|---|
| | Alternate path |
| | Claimant created dangerous condition |
| | Choice of paths rule |
| | Disability |
| | Failure to use due care |
| | Failure to heed warning |
| | Forgetfulness |
| | Implied assumption of risk |
| | Improper lookout |
| | Knowledge of danger requirement |
| | Open and obvious |
| | Plain view doctrine |

TABLE 17-continued

DEFENSES TO NEGLIGENCE

Step in the dark
Youth

Figure 9:
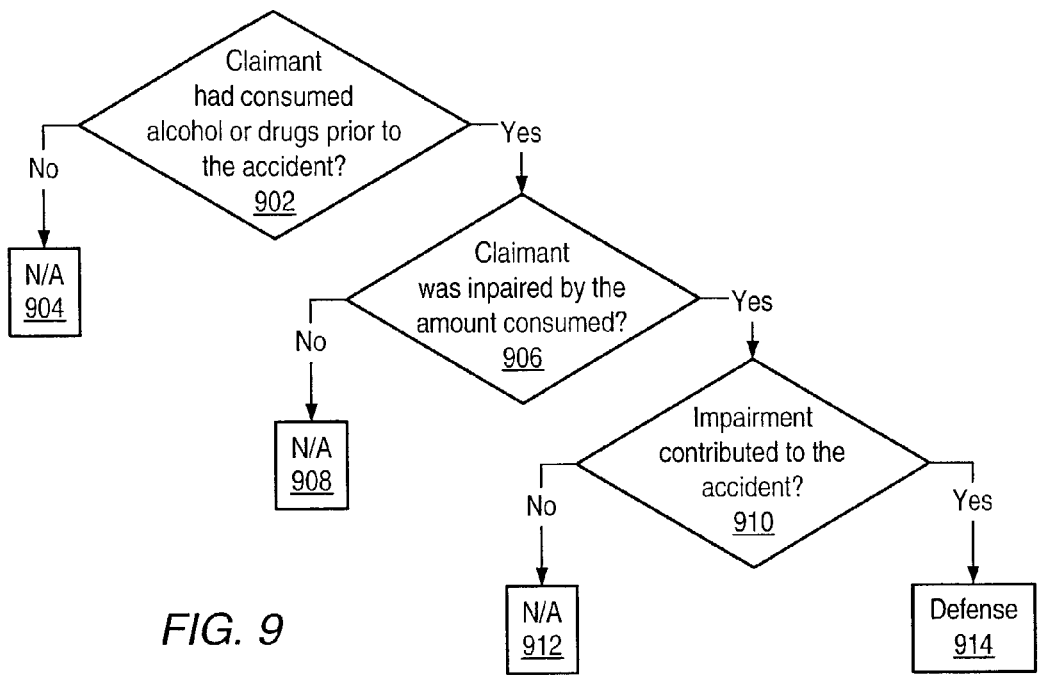
FIG. 9 is a flow chart illustrating the application of the alcohol and drug use defense according to one embodiment.

As used herein, the defense of "alcohol or drug use" may be defined as intoxication by means of any substance, which may prevent a person from recognizing a dangerous condition. FIG. 9 is a flow chart illustrating the application of the alcohol or drug use defense according to one embodiment. Decision point 902 assesses whether the claimant had consumed alcohol or drugs prior to the accident. If the claimant had not consumed alcohol or drugs prior to the accident, then the defense is not applicable, as indicated by step 904. If the claimant had consumed alcohol or drugs prior to the accident, then decision point 906 asks whether the claimant was impaired by the amount of alcohol or drugs consumed. If the claimant was not impaired, then the defense may not be applicable, as indicated by step 908. If the claimant was impaired, then decision point 910 asks whether the impairment contributed to the accident. If impairment did not contribute to the accident, then the defense may not be applicable, as indicated at step 912. Step 914 indicates that the defense may apply if the impairment did contribute to the accident.

For example, a claimant may consume a large quantity of alcohol and prescription muscle relaxants. The claimant may then decide to visit the insured. While visiting the insured the claimant may fall on wet steps to the insured's deck. The claimant may have been able to avoid the accident if not for the alcohol and drugs. If the insured is found to be negligent, the insured's liability may be reduced or eliminated due to the fact that the claimant was intoxicated.

Figure 10:
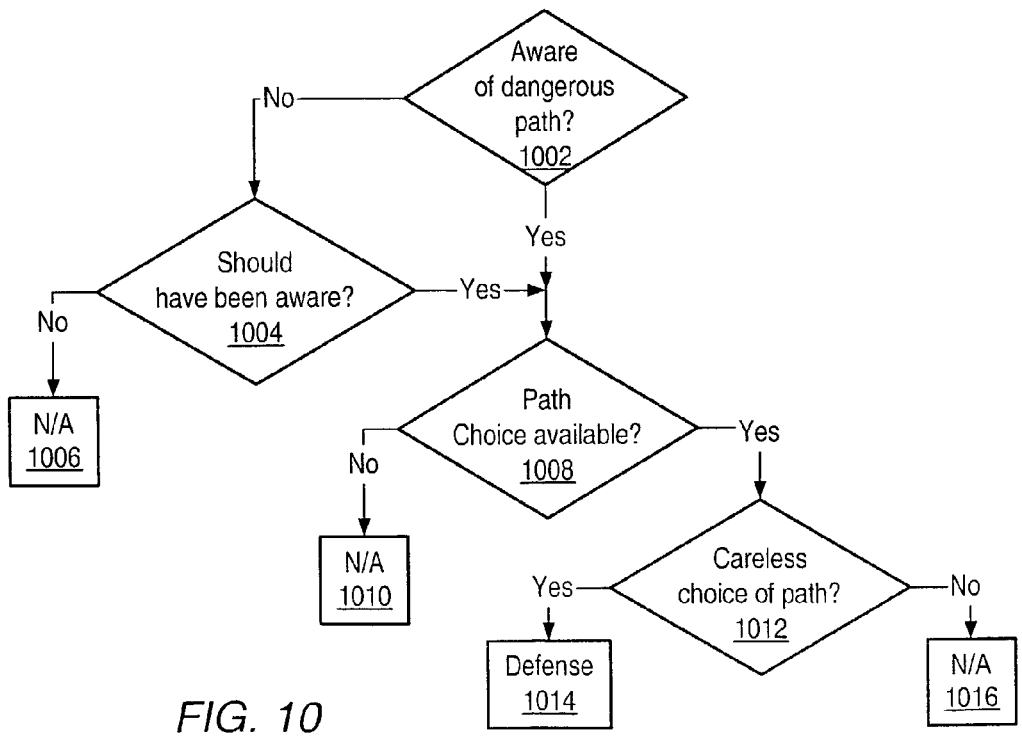
FIG. 10 is a flow chart illustrating the application of the failure to use alternate path defense according to one embodiment.

The "failure to use alternate path" defense may apply when a claimant chose to use an unsafe path when a safe path was clearly available. In the law of negligence, when more than one path is available, an ordinary reasonable prudent person will use the safest path. FIG. 10 is a flow chart for determining the application of the failure to use alternate path defense according to one embodiment. Decision point 1002 assesses whether the claimant was aware of the dangerous or unsafe path. If the claimant was not aware, then decision point 1004 assesses whether the claimant should have been aware of the dangerous path. If not, then the defense may not be applicable, as indicated at step 1006. If the claimant was aware of the dangerous path or should have been aware of the dangerous path then decision point 1008 assesses whether a path choice was available. If there was no choice of path, then the defense may not apply, as indicated by step 1010. If a path choice was available, decision point 1012 assesses whether there was a careless choice. If there was a careless choice of path, then the defense may be applicable, as indicated by step 1014. The defense may not apply if the choice of path was not careless, as indicated by step 1016.

For example, the failure to use alternate path defense may apply when a claimant chooses to take a shortcut between parked cars in a snow and/or ice covered parking lot even though a cleared sidewalk was available close by. Another example may be a claimant that walked through an area where something was spilled on the floor, when the claimant could have walked through a safe area.

The "claimant created dangerous condition" defense may apply when the claimant created or caused the dangerous condition that resulted in the claimant's injury. For example, if the claimant spilled a glass of water and later walked through the water resulting in a slip, the "claimant created dangerous condition" defense may apply.

The "choice of paths" defense may apply when there are two ways of accomplishing something that needs to be done. Generally, one of the ways may be safe and the other may be unsafe. The defense may apply when a claimant chooses the unsafe way. The reasonable selection of a route of travel may be part of a claimant's duty to exercise reasonable care for his or her own safety.

Generally, the choice of paths defense may require evidence of a safe course, a dangerous course, and facts that would put a reasonable person on notice of the danger or actual knowledge of the danger. An invitee may not be required to choose the safest course across the landowner's property. However, if an invitee voluntarily departs from the route designated and maintained by the landowner for the invitee's safety and convenience, such as a walk or path, the degree of caution required by the invitee's duty of care may be heightened by an increased risk resulting from that choice.

In some jurisdictions, claimants with a physical disability may be required to put forth a greater effort for their safety than one not disabled. Claimants with disabilities may be charged with knowledge of their physical condition. Generally, disabled claimants may be required to avoid dangerous conditions, even if such conditions may be safe for a person of average health and strength. The test of negligence for a disabled or elderly person may be the conduct of an ordinarily prudent person of the same physical condition or age. In some instances, pregnant women may also be required to put forth a greater effort for their safety.

In general, a claimant's age and physical condition may affect the claimant's ability to detect dangers, to hear warnings, and to reach means of support. These characteristics of the claimant may be considered when evaluating negligence. For example, a blind person who proceeds without any aid such as a cane, a seeing-eye dog, or companions may be contributorily negligent as a matter of law. However, a blind person who proceeds carefully with the aid of a cane and companions may not be held contributorily negligent as a matter of law. A blind invitee who uses his or her cane properly by tapping the ground or floor ahead of him or her may not be negligent for failure to discover a particular defect by the use of the cane.

Figure 11:
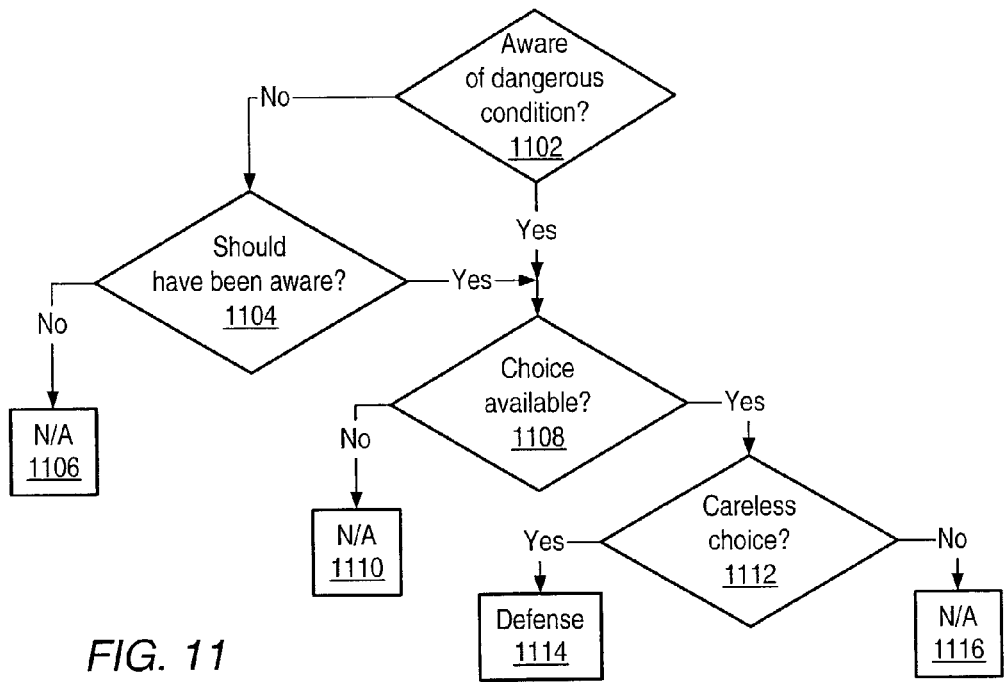
FIG. 11 is a flow chart illustrating the application of the failure to use due care defense according to one embodiment.

The "failure to use due care" defense may apply when a claimant failed to use a degree of care that the ordinary reasonable prudent person should have used in the same or similar circumstances. FIG. 11 is a flow chart illustrating the general application of the failure to use due care defense according to one embodiment. Decision point 1102 assesses whether the claimant was aware of the dangerous condition. If the claimant was not aware, then decision point 1104 assesses whether the claimant should have been aware of the dangerous condition. If not, then the defense may not be applicable, as indicated at step 1106. If the claimant was aware of the dangerous condition or should have been aware of the dangerous condition, then decision point 1108 assesses if a choice was available. If there was no choice, then the defense may not apply, as indicated by step 1110. Decision point 1112 assesses whether there was a careless choice if a choice was available. If there was a careless choice, then the defense may be applicable, as indicated by decision point 1114. The defense may not apply if the choice was not careless, as indicated by step 1116.

In one embodiment, the failure to use due care defense may apply to the claimant's choice of clothing in a given situation. The applicability of the defense may depend on whether the claimant's choice of clothing in any way contributed to the accident. If the claimant's choice of clothing did contribute, then the defense may apply.

Figure 12:
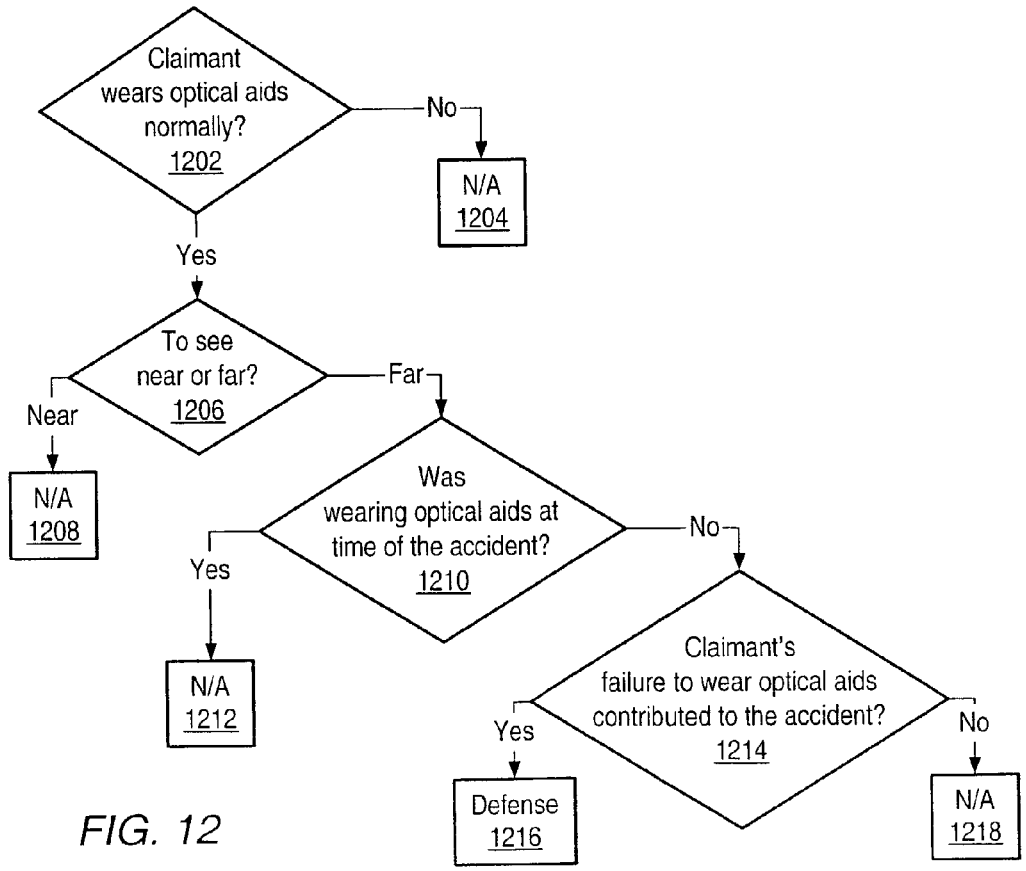
FIG. 12 is a flow chart illustrating the application of the failure to use due care defense to defective vision according to one embodiment.

In certain embodiments, the failure to use due care defense may be applied in situations in which the claimant has impaired vision. FIG. 12 is a flow chart illustrating the application of the failure to use due care defense to impaired vision according to one embodiment. Decision point 1202 assesses if the claimant wears optical aids (e.g., glasses or contacts) normally. If not, then the defense may not apply, as indicated by step 1204. If the claimant does use an optical aid, decision point 1206 assesses whether the claimant wears optical aids to see "near" or "far." The defense may not be applicable if the answer is "near," as indicated by step 1208. Decision point 1210 assesses whether claimant was wearing optical aids at the time of the accident if the answer to decision point 1206 is "far." Step 1212 indicates that the defense may not apply if the answer to decision point 1210 is yes. If the claimant was not wearing optical aids at the time of the accident, decision point 1214 assesses whether the claimant's failure to wear optical aids contributed to the accident. If so, then step 1216 indicates that the defense may apply. If the claimant's failure to wear optical aids did not contribute, step 1218 indicates that the defense may not be applicable.

Figure 13:
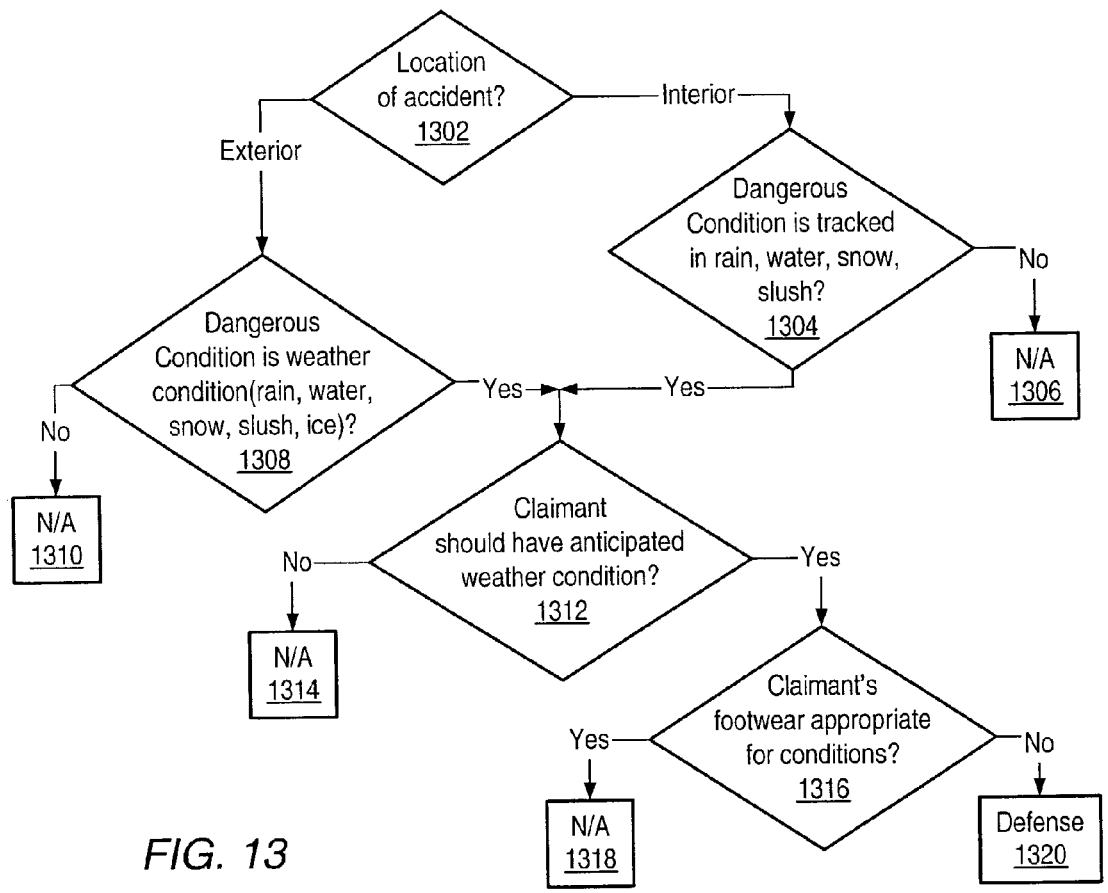
FIG. 13 is a flow chart illustrating the application of the failure to use due care defense to claimant's improper footwear according to one embodiment.

In one embodiment, the failure to use due care defense may be applied to situations in which a claimant's injury may be due to improper footwear worn by the claimant. FIG. 13 is a flow chart illustrating the application of the failure to use due care defense to claimant's improper footwear according to one embodiment. Decision point 1302 assesses the location of the accident. As shown in FIG. 13, the location of the accident may be interior or exterior. If the location is interior, then decision point 1304 assesses if the hazard includes tracked in rain, water, snow, or slush. Step 1306 indicates that the defense may not apply if the answer to decision point 1304 is no. If the hazard includes tracked in rain, water, snow, or slush then decision point 1312 assesses whether the claimant should have anticipated the weather condition. If not, then step 1314 indicates that the defense may not apply. Decision point 1316 asks whether the claimant's footwear was appropriate for the conditions if the claimant should have anticipated the weather condition. Step 1318 indicates that the defense may not apply if the claimant's footwear was appropriate. Step 1320 indicates that the defense may apply if the footwear was not appropriate.

Furthermore, if the location of the accident at decision point 1302 is exterior, then decision point 1308 assesses whether the hazard includes a weather condition such as rain, water, snow, slush, or ice. If not, then step 1310 indicates that the defense may not apply. If the hazard includes a weather condition, then the method reaches decision point 1312 and continues as described previously.

Figure 14:
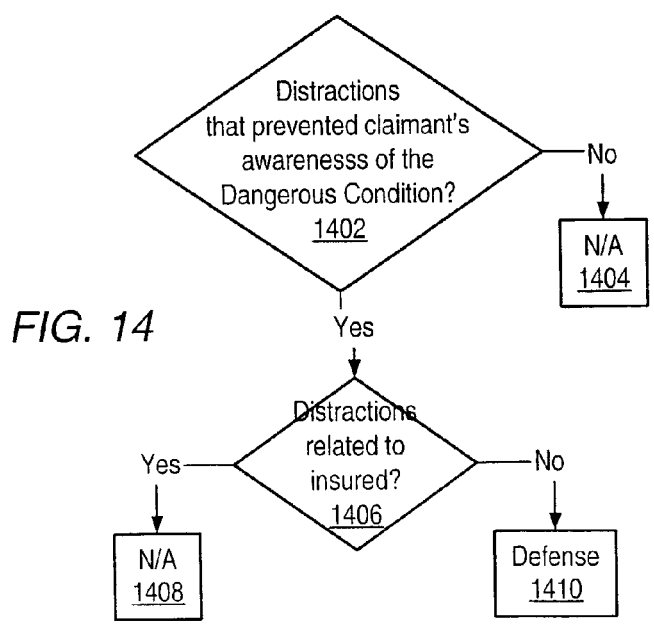
FIG. 14 is a flow chart illustrating the application of the failure to use due care defense to claimant's inattention according to one embodiment.

In one embodiment, the failure to use due care defense may be applied to situations in which claimant's injury may be due to claimant's inattention. FIG. 14 is a flow chart illustrating the application of the failure to use due care defense to claimant's inattention according to one embodiment. Decision point 1402 assesses if there were distractions that prevented claimant's awareness of the dangerous condition. Step 1404 indicates that the defense may not apply if there were no distractions. If there were distractions, decision point 1406 assesses what the source of the distraction was related to the insured. The defense may not apply if the source of the distraction was related to the insured, as indicated by step 1408. If the source was not related to the insured, the defense may apply, as shown by step 1410.

As used herein, a "distraction" refers to a fact, condition, or circumstance that may divert the attention of an ordinarily prudent person from discovering or seeing an existing dangerous condition. Generally, when a claimant does not discover and avoid an obvious premises defect, the claimant may be held to be contributorily negligent as a matter of law. However, this rule may not apply when there is a distraction. The distraction may only excuse the insured's fault and may not create fault on the part of the insured.

For example, the most commonly recognized type of distraction may be a display or advertisement. However, some displays of common goods may not be so distracting as to excuse temporary inattentiveness. A person looking at a display may be required to exercise reasonable care. Merely being in a store does not constitute a distraction. Another person walking normally is not recognized as a legal distraction. The distraction theory may not apply when the distraction was self-induced or when the object was in plain view. Furthermore, a distraction applies only in contributory negligence jurisdictions. In comparative negligence jurisdictions, distraction has been incorporated into the comparative negligence scheme.

Figure 15:
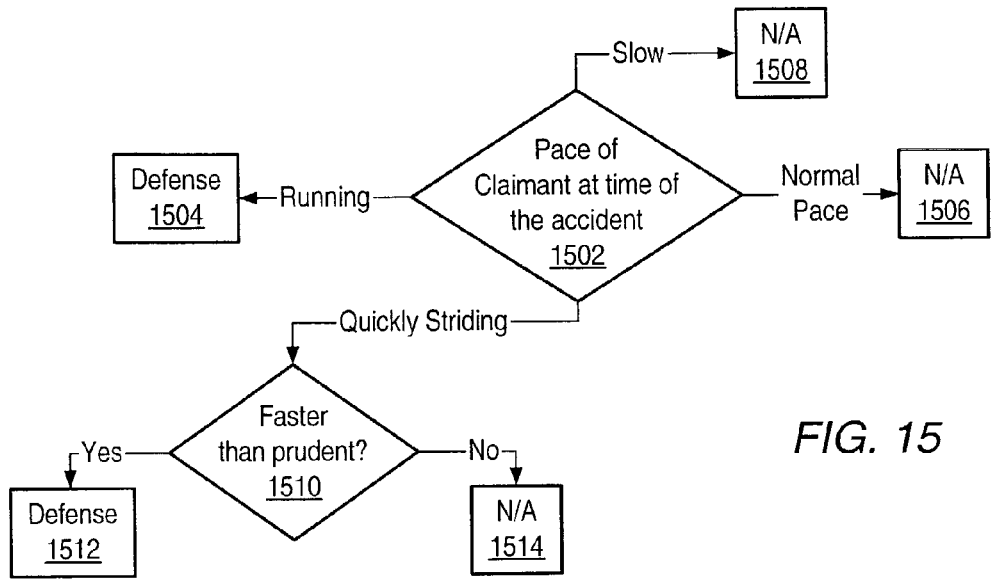
FIG. 15 is a flow chart illustrating the application of the failure to use due care defense to claimant's pace according to one embodiment.

In one embodiment, the failure to use due care defense may be applied in a situation in which claimant's movements were too fast for conditions. FIG. 15 is a flow chart illustrating the application of the failure to use due care defense to the claimant's pace according to one embodiment. Decision point 1502 assesses the pace of the claimant at the time of the accident. FIG. 15 provides four choices for the pace: running, quickly striding, normal pace, and slow. If the pace was running, then step 1504 indicates that the defense may apply. The defense may not apply if the pace is normal or slow, as steps 1506 and 1508 indicate, respectively. If the pace was quickly striding, then decision point 1510 assesses whether the pace was faster than prudent. If the pace was faster than prudent, then step 1512 shows that the defense may apply. If the pace was not faster than prudent, then step 1514 shows that the defense may not apply.

Figure 16:
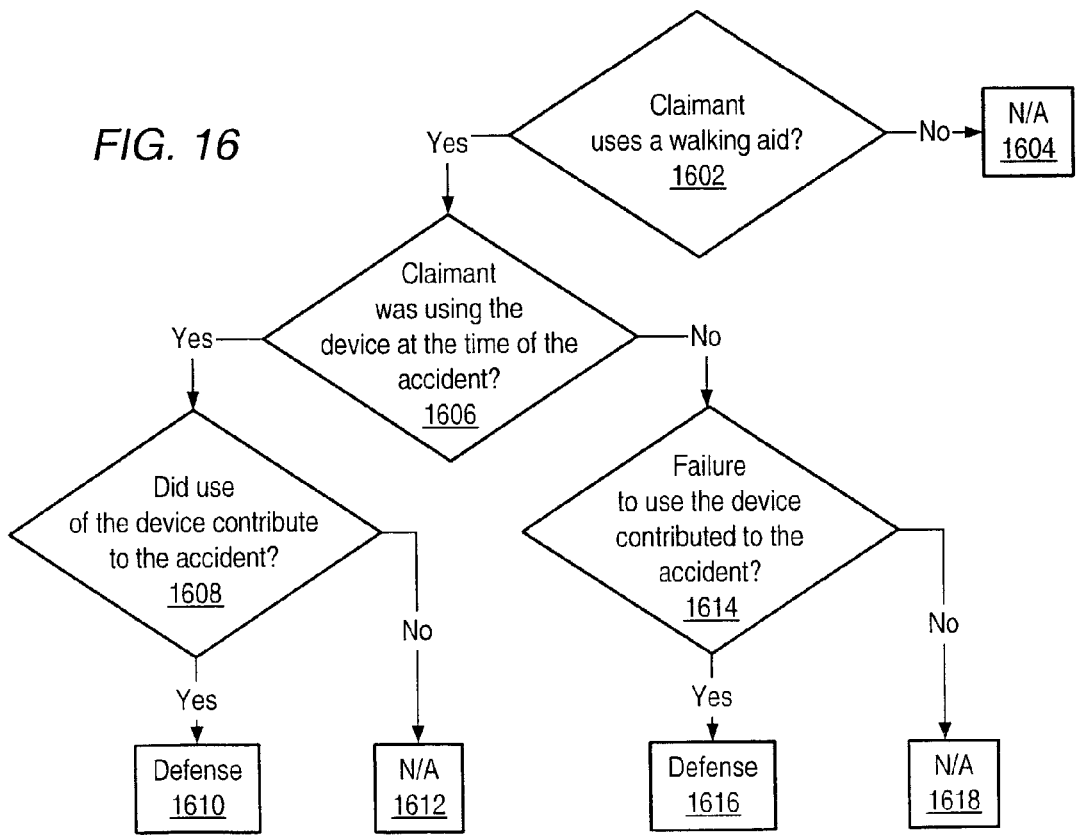
FIG. 16 is a flow chart illustrating the application of the failure to use due care defense to claimant's walking aid according to one embodiment.

In one embodiment, the failure to use due care defense may be applied in situations relating to a claimant's walking aid. FIG. 16 is a flow chart illustrating the application of the failure to use due care defense to the claimant's use of a walking aid according to one embodiment. Decision point 1602 assesses whether the claimant normally uses a walking aid. A walking aid may include a prosthetic device. If the claimant does not normally use a walking aid, step 1604 indicates that the defense may not apply. If the claimant does normally use a walking aid, then decision point 1606 assesses if the claimant was using the device at the time of the accident. If so, decision point 1608 assesses whether the use of the device contributed to the accident. If use of the device did contribute, then the defense may apply as shown by step 1610. Step 1612 shows that the defense may not apply if use of the device did not contribute to the accident.

Decision point 1614 assesses whether failure to use the device contributed to the accident if the claimant was not using the device at the time of the accident. If failure to use the device contributed to the accident, then the defense may apply, as shown by step 1616. Step 1618 indicates that the defense may not apply if the failure to use the device did not contribute.

The failure to heed warning defense may apply when the claimant was adequately warned of the dangerous condition and the claimant continued with the action that was the cause of the accident. A specific warning regarding the dangerous condition is required for the failure to heed warning defense, unlike the assumption of risk defense.

Figure 17:
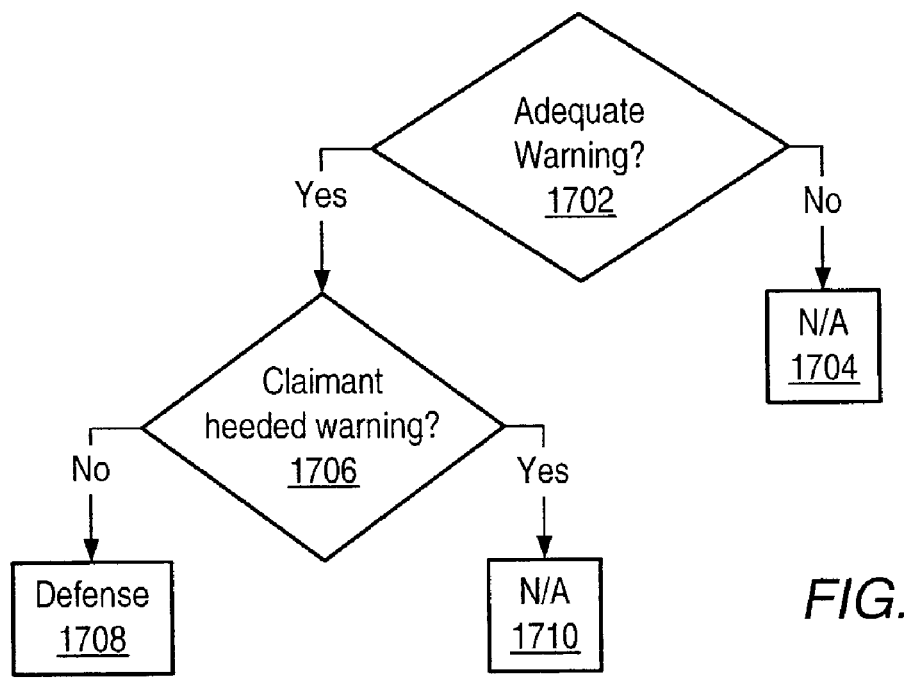
FIG. 17 is flow chart illustrating the application of the failure to heed warning defense according to one embodiment.

FIG. 17 is a flow chart illustrating the application of the failure to heed warning defense according to one embodiment. Decision point 1702 assesses whether the claimant received adequate warning of the dangerous condition. Generally, a warning may have to be explicit to qualify as adequate. An adequate warning may be one that is understandable and one that meets the requirements of the jurisdiction. If the warning was not adequate, then the defense may not be applicable, as indicated by step 1704. If the warning was adequate, decision point 1706 assesses whether the claimant heeded the warning. If the claimant failed to heed the warning, then step 1708 indicates that the defense may apply. A claimant may have failed to heed a warning if the claimant received, understood, and ignored the warning. In one embodiment, the warning may be required to be specific (e.g., directed to the hazard in question). Step 1710 indicates that the defense may not be applicable if the claimant heeded the warning.

An example of a situation in which the failure to heed warning defense may apply may include a claimant running on a slippery floor that had a sign warning of the dangerous condition. Another example may include a claimant who after being told that a retaining rope was needed, failed to use one and fell.

In one embodiment, "forgetfulness" of a known danger may be a defense. Forgetfulness may be distinguishable from being distracted from the danger. For example, forgetfulness of a known danger, without any distraction, may not excuse failure to exercise reasonable care for one's own safety.

Figure 18:
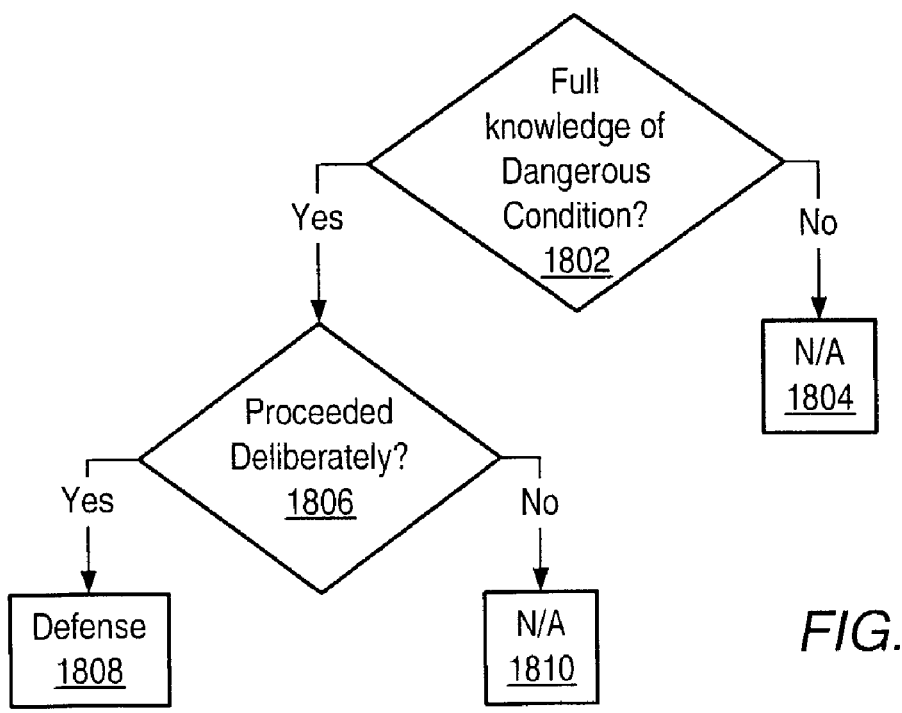
FIG. 18 is a flow chart illustrating the application of the implied assumption of risk defense according to one embodiment.

In one embodiment, the implied assumption of risk defense may apply when a claimant is aware of a dangerous condition or activity, but voluntarily exposes himself/herself to the dangerous condition or participates in the activity. FIG. 18 is a flow chart illustrating the application of the implied assumption of risk defense according to one embodiment. Decision point 1802 assesses whether the claimant had full knowledge of the dangerous condition. If the claimant did not have full knowledge of the dangerous condition, then the defense may not be applicable as indicated by step 1804. If the claimant did have full knowledge of the dangerous condition, decision point 1806 assesses whether the claimant proceeded deliberately. As used herein, "proceeded deliberately" may be defined as the claimant proceeding with full knowledge of the existence of a risk and appreciation of the extent of the danger and voluntarily exposing himself/herself to that danger. If the claimant proceeded deliberately, step 1808 indicates that the defense may be applicable. If the claimant did not proceed deliberately, step 1810 indicates that the defense may not apply.

Tables 18 and 19 provide evaluations of the claimant's knowledge of the dangerous condition and premises. The evaluations may provide an estimate of the degree to which the implied assumption of risk influences liability. Table 18 may evaluate the claimant's familiarity with the premises by considering four characteristics of the claimant: whether the claimant had ever been on the premises before, whether the claimant had ever noticed the dangerous condition, how often the claimant is on the premises, and temporal proximity of the claimant's visits to premises. Table 19 evaluates the claimant's familiarity with the dangerous condition with three considerations: whether the claimant had ever noticed the dangerous condition, how often the claimant is on the premises, and temporal proximity of the claimant's visits to premises. Expert claims adjusters may assign estimates of the effect on liability of an implied assumption of risk defense based on various familiarity determinations.

TABLE 18

FAMILIARITY WITH PREMISES

| Ever been on premises | Ever noticed dangerous condition | How often | Temporal Proximity | Familiarity Determination |
|---|---|---|---|---|
| No | — | — | — | Not |
| Yes | No | — | — | Not |
| Yes | Yes | Once | — | Somewhat |
| Yes | Yes | More than twice | More than 3 mo | Somewhat |
| Yes | Yes | More than twice | Less than 3 mo | Familiar |
| Yes | Yes | Many | — | Very |

TABLE 19

FAMILIARITY WITH DANGEROUS CONDITION

| Ever noticed condition | How often | Temporal Proximity | Familiarity Determination |
|---|---|---|---|
| No | — | — | Not |
| Yes | Once | — | Somewhat |
| Yes | More than twice | More than 3 mo | Somewhat |
| Yes | More than twice | Less than 3 mo | Familiar |
| Yes | Many | — | Very |

Examples of situations where the implied assumption of risk defense may apply may include attending a baseball game and sitting in the lower section in the stadium/arena, participating in a "full contact" football game, participating in a wrestling match, installing a satellite dish on a sloped roof, cleaning windows on a tall building, or walking on an ice rink in regular shoes.

In one embodiment, the improper lookout, open and obvious, or plain view doctrine defenses may apply if the claimant fails to observe where the claimant is going so as to avoid an obvious dangerous condition. In general, an entrant to a premises has a legal duty to look where he or she is going in order to observe obvious dangerous conditions on the premises. These defenses may depend on evaluation of the visibility, the lighting, the contrast of a dangerous condition with its surroundings, the size of the dangerous condition, the claimant's familiarity with the dangerous condition, and any obstructions of the dangerous condition. The improper lookout, open and obvious, and plain view doctrine defenses may be distinguished by the degree of obviousness of a dangerous condition. In general, a lower degree of obviousness may be required for application of the improper lookout defense than for the open and obvious defense. Generally, the open and obvious defense may require a lower degree of obviousness than the plain view doctrine defense.

Generally, a proprietor has a duty to keep a premises safe for invitees. However, the claimant may be required to avoid the effect of an insured's negligence if one of two conditions is met. First, the effect may become apparent through the exercise of ordinary care by the claimant. Second, the claimant should have learned of the effect through the exercise of ordinary care. For example, a claimant may not recover for a slip and fall on a foreign substance if the substance was apparent to the claimant or if by the exercise of ordinary care the claimant should have learned of it. However, a claimant's duty to keep a lookout for dangers may not be absolute or unlimited. For example, a claimant may not be negligent in failing to look out for dangers or defects where an ordinarily prudent person would have no reason to apprehend danger.

When applying the improper lookout defense, the degree of lookout required of a claimant may depend on the type of premises involved. A claimant may not be required to continuously look for dangerous conditions. For example, a person in a commercial building may not be required to use the same degree of lookout as on a public street.

Figure 19:
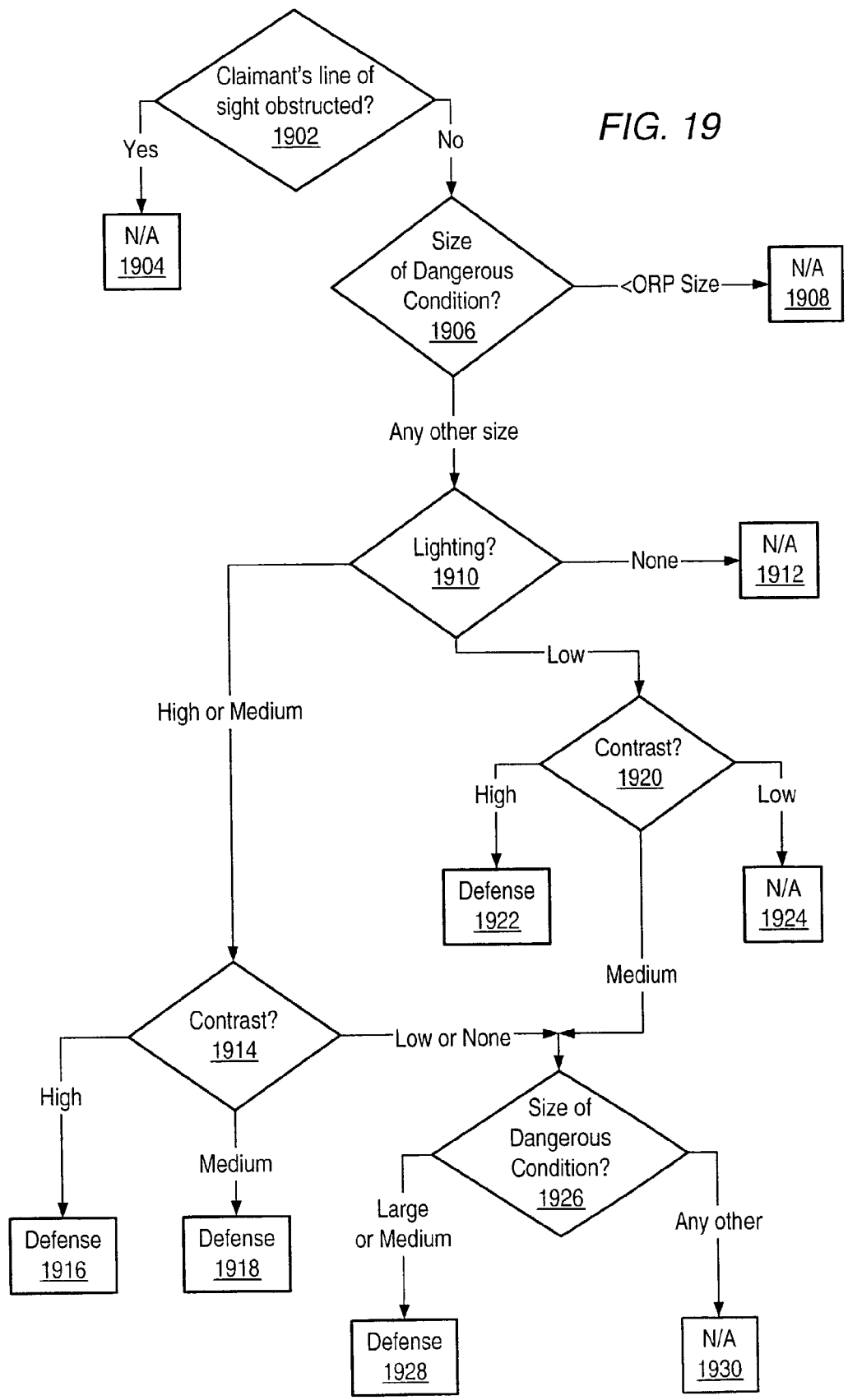
FIG. 19 is a flow chart illustrating the application of the failure to keep lookout defense according to one embodiment.

FIG. 19 is a flow chart illustrating the application of the failure to keep lookout defense according to one embodiment. Decision point 1902 assesses whether the claimant's line of sight was obstructed. If the claimant's line of sight was obstructed, then the dangerous condition could not have been apparent so the defense may not be applicable, as shown by step 1904. If the claimant's line of sight was not obstructed, the size of the dangerous condition is assessed at decision point 1906.

In one embodiment, size may be defined with respect to the perception of an ordinary, reasonable, prudent (ORP) person. An ORP may not be expected to see a dangerous condition that is smaller than a particular size, the "ORP" size. For example, the ORP size may be between about 2 inches and about 3 inches, in some embodiments. In other embodiments, the ORP size may be between about 3 and about 5 inches. In another embodiment, the ORP size may be less than about 2 inches. Size may also be divided into several categories to aid in the evaluation of a defense. In an embodiment, size may be divided into small, medium, and large categories. For example, "small" may be defined as less than or equal to about 4 inches. "Medium" may be defined as greater than about 4 inches, but less than about 12 inches. "Large" may be defined as greater than about 12 inches.

At decision point 1906, if the size of the dangerous condition is less than the ORP size, then the defense may not be applicable, as shown by step 1908. If the dangerous condition is greater than or equal to the ORP size, decision point 1910 assesses the lighting. Step 1912 indicates that if there is no lighting the defense may not apply. If the lighting is low, decision point 1920 assesses contrast. The term "contrast" refers to the difference in color or brightness between the dangerous condition and its surroundings. Step 1924 indicates that the defense may not be applicable if the contrast is low. If the contrast is medium, decision point 1926 assesses the size of the dangerous condition. Step 1922 indicates that the defense may apply if the contrast is high.

In addition, if at decision point 1910 the lighting is high or medium, decision point 1914 assesses contrast. If the contrast is high or medium, then steps 1916 and 1918 indicate that the defense may apply. Decision point 1926 assesses the size of the dangerous condition if the contrast is low or none under high or medium lighting conditions or if the contrast is medium under low lighting conditions. The defense may apply if the size of the dangerous condition is large or medium, as indicated by step 1928. If the size of the dangerous condition is small, step 1930 indicates that the defense may not apply.

In one embodiment, "plain view doctrine" defense may reduce or eliminate a claimant's recovery from an insured. The plain view doctrine imposes a duty on a person to look where the person is walking and to see large objects in plain view. The large objects may be required to be where they are customarily placed and expected to be. In an embodiment, the open and obvious defense also requires a claimant to look where the claimant is walking and to see obvious objects in plain view.

As in the improper lookout defense, if the claimant's line of sight was obstructed, then the open and obvious defense may not apply. If the line of sight was not obstructed, then the open and obvious defense may apply if the dangerous condition was clearly visible. Whether a dangerous condition is clearly visible may depend on its size, the lighting, and the contrast of the condition with its surroundings. For example, the dangerous condition may be clearly visible when the improper lookout defense applies for an object greater than or equal to the ORP size in FIG. 19. In an embodiment, a dangerous condition may be a large object or obstruction.

Examples of dangerous conditions that may be considered open and obvious may include a light pole (due to size, visibility, and eye level view), a column (due to size, visibility, and eye level view), orange cone (due to contrast, moderate size), blinking light (due to contrast), and a painted curb (due to contrast). Examples of dangerous conditions that may not be considered open and obvious may include wet stairs, spilled food or drinks on a floor having a similar color as the spilled food or drink, a partially obscured object, an obscured or hidden sidewalk defect, or obscured or hidden ice (e.g., ice covered by water or snow).

In some embodiments, even if the large object or obstruction is clearly visible, the plain view doctrine may not apply if the object or obstruction is not in a customary location. For example, the plain view doctrine may apply when a claimant falls into a conversation pit in a well-lit library, the steps into the pit are multicolored, and there is a railing around the pit. Another example is a waiter spilling a bowl of red sauce on white flooring in a well-lit restaurant in an open area. The open and obvious defense may apply if the claimant saw the accident and walks through the area and slips in the sauce.

The "knowledge of danger" defense may apply when the claimant had knowledge of the danger or defect that caused the injury. For example, an invitee may be found to have been negligent if the invitee is injured by an obvious defect. The claimant may be expected to have observed and avoided the defect in the exercise of reasonable care under the circumstances. The requirement of observing and avoiding the defect may apply in situations in which the claimant should have appreciated the danger the defect presented.

Daily and commonplace use may raise a presumption of knowledge, or constructive knowledge, on the part of a person using defective premises. Similarly, repeated visits to a premises over a period of time may create an inference that the injured person should have known of the existence of the dangerous condition. The claimant's previous experience with the same kind of premises in which the claimant was injured may also create a presumption of knowledge of the type of dangerous conditions to be expected.

The presence of the claimant in the defective premises before the accident may not preclude the claimant from recovery due to injuries received in the defective premises. Recovery may be possible unless his or her failure to observe the defect amounts to a lack of care which an ordinarily prudent person would exercise under the circumstances.

An invitee has a right to rely on a premises owner to exercise reasonable care to keep a premises in a reasonably safe condition. The right to rely on the owner may vary with the nature of the premises. For example, one who enters a commercial premises may be entitled to expect that the owner has made greater preparations to secure the safety of visitors than for a private residence. A customer on a business premises may assume that the proprietor will exercise reasonable care to ascertain the condition of the premises. In addition, the customer may also assume that if the proprietor discovers any dangerous condition, the proprietor may either correct the condition and make it reasonably safe or give warning of the dangerous condition.

In one embodiment, a claimant may not have the right to rely on the owner of a premises when a claimant fails to avoid a defective or dangerous condition that the claimant knows or should have known about. A customer may not have the right to proceed blindly through a business premises in disregard of obvious dangers. However, there are exceptions to applying the right to rely on owner defense. For example, a claimant's lack of attention or forgetfulness may be excused by a distraction. Another exception is that the claimant may not appreciate the risks of encountering the dangerous condition in spite of knowing of the condition.

In one embodiment, the "step in the dark rule" may apply when a claimant is in an unfamiliar situation in which darkness renders the use of eyesight ineffective to define surroundings. In such a situation, a claimant may not be justified in proceeding further without first finding out where he/she is going and what may be the obstructions to safe progress. However, a claimant may be justified in proceeding under stressful circumstances. Darkness by itself may be a warning to proceed either with extreme caution or not at all. Proceeding in the dark requires greater care than walking in light. A characterization of reasonable care in the darkness depends on all the circumstances of the case.

The step in the dark rule and its variations may not apply in several situations. These situations may include: where the claimant is familiar with the premises, when the darkness may not be considered impenetrable, when the claimant does not follow a path of his or her own choosing, when the claimant takes reasonable precautions to light the way or otherwise to insure his or her safety, when the claimant has a right to assume that the area over which he or she travels is free of defects and obstructions, when the circumstances are such that an ordinary prudent person may be lulled into a false sense of safety, and when there has been a negligent failure to illuminate a structure which is dangerous in darkness, and such failure created additional dangerous conditions unknown to the claimant.

The step in the dark rule merely raises an inference of lack of prudence and ordinary care on the claimant's part. The inference of negligence may not be made if conflicting evidence as to the intentional nature of the step in the dark, the lighting conditions and degree of darkness, the nature and appearance of the premises, and other circumstances exist to disprove a voluntary, deliberate step into unknown darkness.

In one embodiment, "youth" may be used by the claimant as a defense against contributory or comparative negligence. Very young children, generally less than 7 years old, may not be guilty of contributory negligence. Children of an intermediate age, generally 7 to 14, may be presumed incapable of negligence. However, the presumption may be rebuttable. The capacity for negligence of a child of an intermediate age is generally determined by the facts of a situation. Older children may be presumed to be capable of negligence.

If a child has the legal capacity for negligence, the relevant facts in determining whether the child was negligent may include his or her age, maturity, intelligence, training, discretion, and alertness. The child may not be held to the same standard of care as an adult. The child may be required to exercise the same degree of care for his or her own safety as ordinarily exercised by children of the same age, capacity, discretion, knowledge, and experience.

In most states, a parent's negligence may not be imputed to a very young child to bar or reduce the child's recovery against a third party. However, a parent's individual claim, for example, medical expenses resulting from the child's injury, may be reduced or barred by the parent's negligence.

Table 20 lists exemplary bars to recovery according to one embodiment. A bar to recovery may be applied to eliminate the recovery of the claimant.

TABLE 20

BARS TO RECOVERY

| Bars to recovery | Express assumption of risk<br>Inherently dangerous condition or activity<br>Governmental Immunity<br>Notice statutes<br>Statutes of limitations |
|---|---|

In one embodiment, "express assumption of risk" may bar a claimant from recovering from an insured. In express assumption of risk, a claimant that expressly agrees to accept a risk of harm caused by an insured's negligent or reckless conduct may not recover for such harm. Express assumption of risk may not apply if the agreement is invalid due to being contrary to public policy. For example, the owner of a roller rink may require patrons to sign an agreement that holds the owner harmless for any injuries that patrons may incur while using the rink. Such an agreement may be invalid because it may be contrary to public policy.

In certain embodiments, a claimant may be barred from recovering from an insured if the claimant is injured while participating in an inherently dangerous activity. An "inherently dangerous condition or activity" may be described as an activity in which danger is inherent at all times. The danger may be so inherent that special precautions may be required to prevent injury.

In one embodiment, "governmental immunity" may bar a claimant from recovering from an insured that is a governmental entity. Governmental immunity may be a bar under the Political Sub-Division Tort claims Act. The Act may negate liability for a governmental agency or municipality. For example, a governmental body may make itself immune. For example, the claimant may be barred from recovery if a political entity is engaged in an administrative or policy activity. However, the claimant may have a right of action against a political entity if the entity is engaged in what would normally be considered a business activity. In addition, political immunity may not apply if the care, custody, and control of premises are in the possession of the local agency. A trespasser may be barred from recovery from a governmental entity.

In one embodiment, the scope of the immunity may change by jurisdiction. For example, in Pennsylvania a claimant may be required to first establish the dangerous condition that created a reasonably foreseeable risk. The claimant may then be required to show that the local agency responsible for the dangerous condition had actual notice or could reasonably be charged with notice of the dangerous condition. The notice may be required to be at a sufficient time prior to the event so that measures might be taken to protect against the dangerous condition.

In one embodiment, notice statutes may bar a claimant from recovering from an insured party. "Notice Statutes" may require a claimant to file notice of a claim with a municipality before initiating suit. A municipality must have received prior written notice of the dangerous condition. For example, in New York State, notice must be filed within 90 days of the date of claimant's harm.

In one embodiment, a Statute of Limitation may bar recovery of a claimant from an insured. As used herein, a "Statute of Limitation" is the time within which a claimant must file suit according to statute. A Statute of Limitation for infants may begin at the age of majority. A Statute of Limitation for filing suit against municipalities may be shortened.

In one embodiment, the total liability assessed to the insured and the claimant may be estimated by considering the negligence of the insured and defenses and bars that apply to the claimant. If no defenses or bars apply, the total liability of the insured is equal to the liability of the insured due to negligence. If one or more bars apply, the claimant may not recover any damages.

The calculation of liability depends upon whether a jurisdiction adheres to the contributory or comparative negligence doctrine if one or more defenses apply. In a contributory negligence jurisdiction, the applicability of one or more defenses acts as a complete bar to recovery by the claimant.

However, in a jurisdiction that follows comparative negligence, the applicability of one or more defenses may reduce the liability of an insured rather than act as a complete bar to recovery. In one embodiment, a defense may have an estimate of the effect on liability associated with various determinations of the applicability of the defense. For example, the failure to use due care defense applied to the claimant's pace has five possible combinations of answers to the decision points in the embodiment depicted in FIG. 15. Steps 1506, 1508, and 1514 represent three outcomes in which the defense may not apply. The effect on liability associated with these outcomes may be 0%. Steps 1504 and 1512 represent outcomes in which the defense may apply. Steps 1504 and 1512 may be associated with a nonzero estimate of liability.

In one embodiment, each of the outcomes in which a defense applies may be associated with the same effect on liability. Alternatively, the outcomes may be associated with a different effect on liability. For example, the outcome in step 1504 may be associated with a higher estimate of liability than the outcome in step 1512. The claimant may have a greater culpability at step 1504 than at step 1512 because it is more dangerous to run than it is to quickly stride. Experienced claims adjusters may determine the estimates of liability for the combinations of outcomes. For example, the liability estimate at step 1504 may be 20% and the liability estimate at step 1512 may be 10%.

Adjusting the liability based one or more defenses may be done in a number of ways depending on the jurisdiction. For example, a direct shift of liability may be used in a comparative negligence jurisdiction. In a comparative negligence jurisdiction, a portion of the liability assessed to the insured may be shifted to the claimant based on the applicability of one or more defenses. In an embodiment, the effect on liability of all of the defenses may be additive. That is, if two defenses apply with an effect on liability of 20% each, then a total of 40% of the liability may be shifted to the claimant. In other embodiments, effects on liability of certain defenses may not be directly additive. That is, if a particular combination of defenses apply, the resulting liability shift may be greater than or less than the liability shift that would result from addition of the effect on liability associated with each defense. For example, if an open and obvious defense has an effect on liability of 30% and an impaired vision defense has an effect on liability of 15%, the total liability shift that results may only be 40% since the two defenses are not entirely independent of one another. Likewise, in some instances, the total liability shift may be greater than the sum of the individual effects on liability. If the total effect of the defenses on liability is greater than 100%, then the liability of the insured may be 0%.

Table 21 includes investigative questions about characteristics relating to determining defenses and bars according to one embodiment. The columns in Table 20 correspond to defenses and bars listed in Table 17. An "X" in a column indicates that an investigative question may apply to the defense or bar in the column.

TABLE 21

INVESTIGATIVE QUESTIONS ABOUT CHARACTERISTICS RELATING TO DEFENSES AND BARS FOR FLOOR, STAIRWAY, OR SIDEWALK SLIP, TRIP, OR FALL ACCIDENTS

| Questions | Defenses | | | | | | | | | | | | |
|---|---|---|---|---|---|---|---|---|---|---|---|---|---|
| | Improper lookout | Open and obvious (plain view doctrine) | Failure to use due care | Failure to choose alternate path | Alcohol or Drug use | Implied assumption of risk | Failure to heed warning | Claimant created condition or defect | Governmental Immunity | Notice statutes | Statutes of limitations | Express assumption of risk (e.g. a "hold harmless" clause) | Inherently dangerous condition or activity |
| Floor Accidents | | | | | | | | | | | | | |
| Date | | | | | | | | | | X | X | | |
| Time | | X | | | | | | | | | | | |
| Exact location of accident on premises | X | X | X | X | | X | | X | | | | | X |
| Why claimant on premises | | | | | | X | | X | | | | X | X |
| Claimant familiar with premises | X | X | X | X | | X | X | | | | | X | X |
| Describe movements from entrance onto premises to accident location | X | X | X | X | | | X | | | | | | |

TABLE 21-continued

INVESTIGATIVE QUESTIONS ABOUT CHARACTERISTICS RELATING TO DEFENSES AND BARS FOR FLOOR, STAIRWAY, OR SIDEWALK SLIP, TRIP, OR FALL ACCIDENTS

| Questions | Defenses | | | | | | | | | | | | |
|---|---|---|---|---|---|---|---|---|---|---|---|---|---|
| | Improper lookout | Open and obvious (plain view doctrine) | Failure to use due care | Failure to choose alternate path | Alcohol or Drug use | Implied assumption of risk | Failure to heed warning | Claimant created condition or defect | Governmental Immunity | Notice statutes | Statutes of limitations | Express assumption of risk (e.g. a "hold harmless" clause) | Inherently dangerous condition or activity |
| Determine exact location on premises where incident occurred | X | X | X | X | | X | | X | | | | | X |
| Describe condition complained of | | | | | | | | | | | | | |
| What caused the condition | X | X | X | X | X | X | X | X | | | | | X |
| Where was claimant looking prior to fall | X | X | X | X | | | X | | | | | | |
| Was claimant talking to anyone | X | X | X | X | | | X | | | | | | |
| Was claimant carrying anything | X | X | X | X | | | X | X | | | | | X |
| Was claimant in a hurry | X | X | X | X | | | X | X | | | | | |
| Was claimant walking or running | X | X | X | X | | X | X | X | | | | | X |
| Type of shoes claimant was wearing | | X | | | | X | X | X | | | | | |
| Any children or animals with person | X | X | X | X | | | X | | | | | | |
| Does claimant wear glasses-wearing at time | X | X | X | X | | X | X | X | | | | | X |
| Stairways | | | | | | | | | | | | | |
| Any defect on steps-describe | X | X | X | X | | X | | X | | | | | X |
| Handrails | | | X | X | | | | | | | | | |
| Was stairway steep, straight or curved | X | X | X | X | | | | | | | | | X |
| Describe lighting-natural, artificial, adequacy | X | X | X | X | | | | | | | | | |
| Were there any obstructions on stair-describe | X | X | X | X | | X | | X | | | | | X |
| If weather factor, obtain details of weather conditions | X | X | X | X | | X | | | | | | | X |
| Was claimant going up or down stairs | X | X | X | X | | | X | | | | | | |
| Was claimant running, walking, carrying anything | X | X | X | X | | X | X | X | | | | | X |

TABLE 21-continued

INVESTIGATIVE QUESTIONS ABOUT CHARACTERISTICS RELATING TO DEFENSES AND BARS FOR FLOOR, STAIRWAY, OR SIDEWALK SLIP, TRIP, OR FALL ACCIDENTS

| Questions | Defenses | | | | | | | | | | | | |
|---|---|---|---|---|---|---|---|---|---|---|---|---|---|
| | Improper lookout | Open and obvious (plain view doctrine) | Failure to use due care | Failure to choose alternate path | Alcohol or Drug use | Implied assumption of risk | Failure to heed warning | Claimant created condition or defect | Governmental Immunity | Notice statutes | Statutes of limitations | Express assumption of risk (e.g. a "hold harmless" clause) | Inherently dangerous condition or activity |
| Describe lighting-natural, artificial, adequacy | X | X | X | X | | | | | | | | | |

A claims organization may employ an experienced claims adjuster using a knowledge acquisition utility to determine liability, defenses, and/or bars associated with a given set of characteristics of an accident. For example, a claims organization may employ an experienced claims adjuster using a knowledge acquisition utility to provide estimates of liability associated with various sets of characteristics of an accident. The estimates of liability may include estimates of the effect on liability of various defenses and/or bars.

In some embodiments, a user of a system for estimating liability may be provided with a legal reference screen. The legal reference screen may provide the user with legal information for a jurisdiction in which the accident occurred. The legal information may be pertinent to determining liability in the accident. In an embodiment, the legal reference information may be accessed from a subscription legal reference service, such as the Westlaw legal information service, available from West Group of St. Paul, Minn. For example, access to information pertaining to governmental immunity, joint and several liability, assumption of risk, statutes of limitations, notice statutes, building codes, Americans with Disabilities Acts standards, and/or case law may be provided.

Various embodiments further include receiving or storing instructions and/or data implemented in accordance with the foregoing description upon a carrier medium. Suitable carrier media include storage media or memory media such as magnetic or optical media, e.g., disk or CD-ROM, as well as signals such as electrical, electromagnetic, or digital signals conveyed via a communication medium such as networks 102 and/or 104 shown in FIG. 1 and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method of estimating a contribution of a defense to premises liability, comprising:
   providing to a computer system a set of characteristics of a premises accident that has actually occurred, the premises accident giving rise to premises liability of a landowner or possessor of the premises to a party injured in the premises accident as a result of at least one condition that existed on a premises;
   estimating, from at least one of the characteristics of the accident that has actually occurred, the contribution of two or more defenses to the premises liability of the landowner or possessor of the premises to a party injured in the premises accident as a result of the at least one condition that existed on the premises while the injured party was on the premises, the estimated contribution of at least one of the two or more defenses to premises liability being expressed as a proportion of liability; and
   estimating a premises liability of the landowner or possessor to the party injured in the premises accident, wherein estimating the premises liability includes the computer system performing an adjustment to the premises liability based on the estimated contribution of at least two of the defenses to premises liability, the estimated premises liability being expressed as a proportion of a total liability for the premises accident, wherein at least two of the defenses are not independent of one another, wherein the adjustment to premises liability based on the estimated contribution of the at least two defenses is greater than or less than the adjustment that would result from adding the individual contributions of the at least two defenses.

2. The method of claim 1, wherein the estimated contribution of the two or more defenses to premises liability is expressed as a percentage.

3. The method of claim 1, wherein the estimated contribution of at least one of the defenses to premises liability is expressed as a range of percentage liability.

4. The method of claim 1, wherein at least one of the defenses to premises liability is selected from the group consisting of: a failure to keep a proper lookout defense, an open and obvious defense, a plain view doctrine defense, a failure to use due care defense, a failure to choose an alternate path defense, a claimant under the influence defense, an implied assumption of risk defense, a failure to heed warning defense, a claimant created the condition or defect defense, a right to rely on owner defense, a knowledge of danger requirement defense, a forgetfulness defense, a distraction defense, a choice of paths rule defense, a disability defense, a youth defense, and a step in the dark defense.

5. The method of claim 1, wherein estimating the contribution of at least two of the defenses to premises liability comprises determining the contribution of a failure to use due care defense, wherein determining the contribution of the failure to use due care defense comprises determining whether a claimant was aware of a hazard.

6. The method of claim 1, wherein estimating the contribution of at least one of the defenses to premises liability comprises determining the contribution of a failure to use due care defense, wherein determining the contribution of the failure to use due care defense comprises determining whether the claimant should have been aware of a hazard.

7. The method of claim 1, wherein estimating the contribution of at least one of the defenses to premises liability comprises determining the contribution of a failure to use due care defenses, wherein determining the contribution of the failure to use due care defense comprises determining whether an alternate path choice was available to the claimant.

8. The method of claim 1, wherein estimating the contribution of at least one of the defenses to premises liability comprises determining the contribution of a failure to use due care defense, wherein determining the contribution of the failure to use due care defense comprises determining whether a claimant made a careless choice.

9. The method of claim 1, wherein estimating the contribution of at least one of the defenses to premises liability comprises determining the contribution of an alternate path defense, wherein determining the contribution of the alternate path defense comprises determining whether a claimant against the landowner or possessor of the premises was aware of a hazard on the premises.

10. The method of claim 1, wherein estimating the contribution of at least one of the defenses to premises liability comprises determining the contribution of an alternate path defense, wherein determining the contribution of the alternate path defense comprises determining whether a claimant against the landowner or possessor of the premises should have been aware of a hazard on the premises.

11. The method of claim 1, wherein estimating the contribution of at least one of the defenses to premises liability comprises determining the contribution of an alternate path defense, wherein determining the contribution of the alternate path defense comprises determining whether an alternate path choice was available to a claimant.

12. The method of claim 1, wherein estimating the contribution of at least one of the defenses to premises liability comprises determining the contribution of an alternate path defense, wherein determining the contribution of the alternate path defense comprises determining whether a claimant made a careless choice of path.

13. The method of claim 1, wherein estimating the contribution of at least one of the defenses to premises liability comprises determining the contribution of an implied assumption of risk defense, wherein determining the contribution of the implied assumption of risk defense comprises determining whether a claimant against the landowner or possessor of the premises had full knowledge of a hazard on the premises.

14. The method of claim 1, wherein estimating the contribution of at least one of the defenses to premises liability comprises determining the contribution of an implied assumption of risk defense, wherein determining the contribution of the implied assumption of risk defense comprises determining whether a claimant proceeded deliberately.

15. The method of claim 1, wherein estimating the contribution of at least one of the defenses to premises liability comprises determining the contribution of a failure to heed warning defense, wherein determining the contribution of the failure to heed warning defense comprises determining whether a claimant against the landowner or possessor of the premises had adequate warning of a dangerous condition on the premises.

16. The method of claim 1, wherein estimating the contribution of at least one of the defenses to premises liability comprises determining the contribution of a failure to heed warning defense, wherein determining the contribution of the failure to heed warning defense comprises determining whether a claimant heeded the warning.

17. The method of claim 1, wherein estimating the contribution of at least one of the defenses to premises liability comprises determining the contribution of a failure to keep a proper lookout defense, wherein determining the contribution of the failure to keep a proper lookout defense comprises determining whether a dangerous condition on the premises was apparent or whether a claimant against the landowner or possessor of the premises saw the dangerous condition.

18. The method of claim 1, wherein estimating the contribution of at least one of the defenses to premises liability comprises determining the contribution of an open and obvious defense with respect to a dangerous condition on the premises, wherein determining the contribution of the open and obvious defense comprises determining lighting at a location of the accident.

19. The method of claim 1, wherein estimating the contribution of at least one of the defenses to premises liability comprises determining the contribution of an open and obvious defense with respect to a dangerous condition on the premises, wherein determining the contribution of the open and obvious defense comprises determining contrast of the dangerous condition.

20. The method of claim 1, wherein estimating the contribution of at least one of the defenses to premises liability comprises determining the contribution of an open and obvious defense with respect to a dangerous condition on the premises, wherein determining the contribution of the open and obvious defense comprises determining size of the dangerous condition.

21. The method of claim 1, wherein estimating the contribution of at least one of the defenses to premises liability comprises determining the contribution of an open and obvious defense with respect to a dangerous condition on the premises, wherein determining the contribution of the open and obvious defense comprises determining whether the dangerous condition on the premises was obstructed, or whether an obstruction was large.

22. The method of claim 1, wherein estimating the contribution of at least one of the defenses to premises liability comprises determining the contribution of a claimant created condition or defect defense, wherein determining the contribution of the claimant created condition or defect defense comprises determining whether a claimant against the landowner or possessor of the premises was solely or partially responsible for a dangerous condition or defect on the premises.

23. The method of claim 1, wherein estimating the contribution of at least one of the defenses to premises liability comprises determining the contribution of a right to rely on owner defense, wherein determining the contribution of the right to rely on owner defense comprises determining whether the premises is commercial or residential, whether a claimant against the landowner or possessor of the premises failed to avoid a defective or dangerous condition on the premises of which the claimant knew or should have known.

24. The method of claim 1, wherein estimating the contribution of at least one of the defenses to premises liability comprises determining the contribution of a right to rely on owner defense, wherein determining the contribution of the right to rely on owner defense comprises determining whether a claimant against the landowner or possessor of the premises failed to avoid a defective or dangerous condition on the premises of which the claimant knew or should have known.

25. The method of claim 1, wherein estimating the contribution of at least one of the defenses to premises liability comprises determining the contribution of a right to rely on owner defense, wherein determining the contribution of the right to rely on owner defense comprises determining whether there was a distraction.

26. The method of claim 1, wherein determining the contribution of at least one of the defenses to premises liability comprises determining the contribution of a right to rely on owner defense, wherein determining the contribution of the right to rely on owner defense comprises determining whether a claimant against the landowner or possessor of the premises did not appreciate the risks of a dangerous condition on the premises.

27. The method of claim 1, wherein determining the contribution of at least one of the defenses to premises liability comprises determining the contribution of a knowledge of danger requirement defense, wherein determining the contribution of the knowledge of danger requirement defense comprises determining whether a defect on the premises was patent or obvious.

28. The method of claim 1, wherein determining the contribution of at least one of the defenses to premises liability comprises determining the contribution of a knowledge of danger requirement defense, wherein determining the contribution of the knowledge of danger requirement defense comprises determining whether a claimant against the landowner or possessor of the premises visited a location of the accident for daily and commonplace use.

29. The method of claim 1, wherein estimating the contribution of at least one of the defenses to premises liability comprises determining the contribution of a knowledge of danger requirement defense, wherein determining the contribution of the knowledge of danger requirement defense comprises determining whether a claimant against the landowner or possessor of the premises had made repeated visits the location of the accident.

30. The method of claim 1, wherein estimating the contribution of at least one of the defenses to premises liability comprises determining the contribution of a knowledge of danger requirement defense, wherein determining the contribution of the knowledge of danger requirement defense comprises determining whether a claimant against the landowner or possessor of the premises had previous experience with premises of the same kind as a premises at which the accident took place.

31. The method of claim 1, wherein estimating the contribution of at least one of the defenses to premises liability comprises determining the contribution of a forgetfulness defense, wherein determining the contribution of the forgetfulness defense comprises determining whether a claimant against the landowner or possessor of the premises had knowledge of a dangerous condition on the premises.

32. The method of claim 1, wherein estimating the contribution of at least one of the defenses to premises liability comprises determining the contribution of a forgetfulness defense, wherein determining the contribution of the forgetfulness defense comprises determining whether a distraction was present at a location of the accident.

33. The method of claim 1, wherein estimating the contribution of at least one of the defenses to premises liability comprises determining the contribution of a distraction defense, wherein determining the contribution of the distraction defense comprises determining whether a condition or circumstance diverted a claimant's attention.

34. The method of claim 1, wherein estimating the contribution of at least one of the defenses to premises liability comprises determining the contribution of a choice of paths rule defense, wherein determining the contribution of the choice of paths rule defense comprises determining whether a claimant against the landowner or possessor of the premises selected an unsafe path on the premises.

35. The method of claim 1, wherein estimating the contribution of at least one of the defenses to premises liability comprises determining the contribution of a choice of paths rule defense, wherein determining the contribution of the choice of paths rule defense comprises determining whether there was evidence of a safe course on the premises.

36. The method of claim 1, wherein estimating the contribution of at least one of the defenses to premises liability comprises determining the contribution of a choice of paths rule defenses, wherein determining the contribution of the choice of paths rule defense comprises determining whether there was evidence of a dangerous course on the premises.

37. The method of claim 1, wherein estimating the contribution of at least one of the defenses to premises liability comprises determining the contribution of the choice of paths rule defense, wherein determining the contribution of the choice of paths rule defense comprises determining whether there was evidence of facts which would put a reasonable person on notice of danger.

38. The method of claim 1, wherein estimating the contribution of at least one of the defenses to premises liability comprises determining the contribution of a choice of paths rule defense, wherein determining the contribution of the choice of paths rule defense comprises determining whether a claimant had actual knowledge of danger.

39. The method of claim 1, wherein estimating the contribution of at least one of the defenses to premises liability comprises determining the contribution relating to a disability defense, wherein determining the contribution relating to the disability defense comprises determining whether a claimant had a physical disability.

40. The method of claim 1, wherein estimating the contribution of at least one of the defenses to premises liability comprises determining the contribution relating to a disability defense, wherein determining the contribution relating to the disability defense comprises determining whether a claimant was frail or elderly.

41. The method of claim 1, wherein estimating the contribution of at least one of the defenses comprises determining the contribution relating to a disability defense, wherein determining the contribution relating to the disability defense comprises determining whether a claimant was pregnant.

42. The method of claim 1, wherein estimating the contribution of at least one of the defenses to premises liability comprises determining the contribution relating to a disability defense, wherein determining the contribution relating to the disability defense comprises determining whether a claimant put forth appropriate effort to protect the claimant's safety.

43. The method of claim 1, wherein estimating the contribution of at least one of the defenses to premises liability comprises determining the contribution relating to a disability defense, wherein determining the contribution relating to the disability defense comprises determining whether a claimant avoided a position likely to be dangerous to the claimant in light of the claimant's disability.

44. The method of claim 1, wherein estimating the contribution of at least one the defenses to premises liability comprises determining the contribution of a youth defense, wherein determining the contribution of the youth defense comprises determining an age of a claimant.

45. The method of claim 1, wherein estimating the contribution of at least one of the defenses to premises liability comprises determining the contribution of a youth defense, wherein determining the contribution of the youth defense comprises determining maturity of a claimant.

46. the method of claim 1, wherein estimating the contribution of at least one of the defenses to premises liability comprises determining the contribution of a youth defense, wherein determining the contribution of the youth defense comprises determining intelligence of a claimant.

47. The method of claim 1, wherein estimating the contribution of at least one of the defenses to premises liability comprises determining the contribution of a youth defense, wherein determining the contribution of the youth defense comprises determining training of a claimant.

48. The method of claim 1, wherein estimating the contribution of at least one of the defenses to premises liability comprises determining the contribution of a youth defense, wherein determining the contribution of the youth defense comprises determining discretion of a claimant.

49. The method of claim 1, wherein estimating the contribution of at least one of the defenses to premises liability comprises determining the contribution of a youth defense, wherein determining the contribution of the youth defense comprises determining alertness of a claimant.

50. The method of claim 1, wherein estimating the contribution of at least one of the defenses to premises liability comprises determining the contribution of a youth defense, wherein determining the contribution of the youth defense comprises determining whether a claimant has the capacity for negligence.

51. The method of claim 1, wherein estimating the contribution of the at least one of the defenses to premises liability comprises determining the contribution of a youth defense, wherein determining the contribution of the youth defense comprises determining whether a claimant exercised a degree of care for his or her own safety as ordinarily exercised by children of the same age.

52. The method of claim 1, wherein estimating the contribution of at least one of the defenses to premises liability comprises determining the contribution of a youth defense, wherein determining the contribution of the youth defense comprises determining whether a claimant exercised a degree of care for his or her own safety as ordinarily exercised by children with the same capacity for negligence.

53. The method of claim 1, wherein estimating the contribution of at least one of the defenses to premises liability comprises determining the contribution of a youth defense, wherein determining the contribution of the youth defense comprises determining whether a claimant exercised a degree of care for his or her own safety as ordinarily exercised by children with the same discretion.

54. The method of claim 1, wherein estimating the contribution of at least one of the defenses to premises liability comprises determining the contribution of a youth defense, wherein determining the contribution of the youth defense comprises determining whether a claimant exercised a degree of care for his or her own safety as ordinarily exercised by children with the same experience.

55. The method of claim 1, wherein estimating the contribution of at least one of the defenses to premises liability comprises determining the contribution of an alternate path defense, wherein determining the contribution of the alternate path defense comprises determining whether darkness rendered use of eyesight ineffective to define a claimant's surroundings.

56. The method of claim 1, wherein estimating the contribution of at least one of the defenses to premises liability comprises determining the contribution of an alternate path defense, wherein determining the contribution of the alternate path defense comprises determining whether a claimant's actions were justified.

57. The method of claim 1, wherein estimating the contribution of at least one of the defenses to premises liability comprises determining the contribution of an alternate path defense, wherein determining the contribution of the alternate path defense comprises determining whether any special stress of circumstances inhibited a claimant from finding out obstructions to his or her safe progress.

58. The method of claim 1, wherein estimating the contribution of at least one of the defenses to premises liability comprises determining the contribution of an alternate path defense, wherein determining the contribution of the alternate path defense comprises determining whether a claimant was familiar with the premises.

59. The method of claim 1, wherein the estimated contribution to the two or more defenses to premises liability is estimated from knowledge obtained from experienced claims adjusters.

60. A system, comprising:
a CPU;
a data memory coupled to the CPU; and
a system memory coupled to the CPU, wherein the system memory is configured to store one or more computer programs executable by the CPU, and wherein the computer programs are executable to implement a method for estimating a contribution of a defense to premises liability, the method comprising:
providing to a computer system a set of characteristics of a premises accident that has actually occurred, the premises accident giving rise to premises liability of a landowner or possessor of the premises to a party injured in the premises accident as a result of at least one condition that existed on a premises; and
estimating, from at least one of the characteristics of the accident that has actually occurred, the contribution of two or more defenses to the premises liability of the landowner or possessor of the premises to a party injured in the premises accident as a result of the at least one condition that existed on the premises while the injured party was on the premises, the estimated contribution of at least one of the two or more defenses to premises liability being expressed as a proportion of liability; and
estimating a premises liability of the landowner or possessor to the party injured in the premises accident, wherein estimating the premises liability includes performing an adjustment to the premises liability based on the estimated contribution of at least two of the defenses to premises liability, the estimated premises liability being expressed as a proportion of a total liability for the premises accident, wherein at least two of the defenses are not independent of one another, wherein the adjustment to premises liability based on the estimated contribution of the at least two defenses is greater than or less than the adjustment that would result from adding the individual contributions of the at least two defenses.

61. A computer readable storage medium comprising program instructions stored thereon, wherein the program instructions are computer-executable to implement a method for estimating a contribution of a defense to premises liability, the method comprising:

providing to a computer system a set of characteristics of a premises accident that has actually occurred, the premises accident giving rise to premises liability of a landowner or possessor of the premises to a party injured in the premises accident as a result of at least one condition that existed on a premises; and estimating, from at least one of the characteristics of the accident that has actually occurred, the contribution of two or more defenses to the premises liability of the landowner or possessor of the premises to a party injured in the premises accident as a result of the at least one condition that existed on the premises while the injured party was on the premises, the estimated contribution of at least one of the two or more defenses to premises liability being expressed as a proportion of liability; and estimating a premises liability of the landowner or possessor to the party injured in the premises accident, wherein estimating the premises liability includes performing an adjustment to the premises liability based on the estimated contribution of at least two of the defenses to premises liability, the estimated premises liability being expressed as a proportion of a total liability for the premises accident, wherein at least two of the defenses are not independent of one another, wherein the adjustment to premises liability based on the estimated contribution of the at least two defenses is greater than or less than the adjustment that would result from adding the individual contributions of the at least two defenses.

62. The method of claim 1, wherein estimating the premises liability includes adjusting the liability based on a jurisdiction of the premises accident.

63. The method of claim 1, wherein the adjustment to premises liability based on the estimated contribution of the at least two defenses is greater than the adjustment that would result from adding the individual contributions of the at least two defenses.

64. The method of claim 1, wherein the adjustment to premises liability based on the estimated contribution of the at least two defenses is less than the adjustment that would result from adding the individual contributions of the at least two defenses.

65. The method of claim 1, wherein estimating the contribution of at least one of the defenses comprises:
associating two or more outcomes in which one or more of the defenses applies with an effect on liability;
storing the two or more outcomes in the computer system; and
the computer system automatically determining, at one or more decision points, which one of the two or more outcomes occurred.

66. The method of claim 1, wherein estimating the contribution of at least one of the defenses comprises:
evaluating the injured party's familiarity with the premises; and
estimating an effect of an implied assumption of risk defense based on the injured party's familiarity with the premises.

67. The method of claim 66, wherein evaluating the injured party's familiarity with the premises comprises:
determining whether the injured party had ever been on the premises before;
determining whether the injured party ant had ever noticed the dangerous condition;
determining how often the injured party is on the premises;
determining temporal proximity of the injured party's visits to premises; and
assigning an estimate of the effect on liability of an implied assumption of risk defense based on at least one of the determinations.

68. The method of claim 1, wherein estimating the contribution of at least one defense comprises:
evaluating the injured party's familiarity with the dangerous condition; and
estimating an effect of an implied assumption of risk defense based on the injured party's familiarity with the dangerous condition.

69. The method of claim 68, wherein evaluating the injured party's familiarity with the dangerous condition comprises:
determining whether the injured party had ever noticed the dangerous condition;
determining how often the injured party is on the premises;
determining temporal proximity of the injured party's visits to premises; and
assigning an estimate of the effect on liability of an implied assumption of risk defense based on at least one of the determinations.

* * * * *

UNITED STATES PATENT AND TRADEMARK OFFICE
CERTIFICATE OF CORRECTION

PATENT NO.       : 7,672,860 B2                                          Page 1 of 1
APPLICATION NO.  : 10/238981
DATED            : March 2, 2010
INVENTOR(S)      : Wahlbin et al.

It is certified that error appears in the above-identified patent and that said Letters Patent is hereby corrected as shown below:

In the Claims:

Claim 7, col. 55, line 23, please delete "defenses" and substitute therefor -- defense --.

Claim 29, col. 57, line 54, please delete "had made repeated visits the" and substitute therefor -- had made repeated visits to the --.

Claim 36, col. 58, line 33, please delete "defenses" and substitute therefor -- defense --.

Claim 67, col. 62, line 26, please delete "party ant had" and substitute therefor -- party had --.

Signed and Sealed this

Fourth Day of May, 2010

David J. Kappos
*Director of the United States Patent and Trademark Office*